United States Patent [19]
Schwartz et al.

[11] Patent Number: 5,913,032
[45] Date of Patent: Jun. 15, 1999

[54] SYSTEM AND METHODS FOR AUTOMATICALLY DISTRIBUTING A PARTICULAR SHARED DATA OBJECT THROUGH ELECTRONIC MAIL

[75] Inventors: Richard Lee Schwartz, Los Altos Hills, Calif.; James Lewis Weiner, Durham, N.H.

[73] Assignee: Inprise Corporation, Scotts Valley, Calif.

[21] Appl. No.: 08/723,701

[22] Filed: Sep. 30, 1996

Related U.S. Application Data

[63] Continuation of application No. 08/223,262, Apr. 4, 1994, abandoned.

[51] Int. Cl.[6] .................................................. G06F 9/40
[52] U.S. Cl. .................. 395/200.43; 395/200.31; 395/200.33; 395/200.36; 395/200.44; 395/200.75; 395/200.76; 395/682; 395/683
[58] Field of Search ............... 395/200.31, 200.33, 395/200.68, 200.43, 614, 161, 145, 44, 200.36, 200.75, 200.76, 683, 682; 364/DIG. 1

[56] References Cited

U.S. PATENT DOCUMENTS

| | | | |
|---|---|---|---|
| 4,754,428 | 6/1988 | Schultz | 395/200.18 |
| 4,811,207 | 3/1989 | Hikita | 395/600 |
| 5,210,824 | 5/1993 | Putz | 395/145 |
| 5,212,787 | 5/1993 | Baker | 395/600 |
| 5,226,161 | 7/1993 | Khoyi | 395/650 |
| 5,257,369 | 10/1993 | Skeen et al. | 395/650 |
| 5,331,673 | 7/1994 | Elko et al. | 395/575 |
| 5,339,392 | 8/1994 | Risberg et al. | 395/161 |
| 5,421,015 | 5/1995 | Khoyi et al. | 395/650 |
| 5,574,901 | 11/1996 | Takahashi | 395/601 |
| 5,627,764 | 5/1997 | Schutzman et al. | 364/514 |
| 5,633,916 | 5/1997 | Goldhagen et al. | 379/67 |

*Primary Examiner*—Meng-Ai T. An
*Assistant Examiner*—Dzung Nguyen
*Attorney, Agent, or Firm*—John A. Smart

[57] ABSTRACT

A computer system having a facility for concurrently sharing objects or resources is described. The system includes a publish-and-subscribe facility or "Object Exchange," for facilitating sharing among workgroups. When a data object is "published" by a user ("publisher"), the object is sent from that user's computer to other computer users specified by the publisher. Those interested in the published data object (published pages) may elect to receive or "subscribe" to that data. From that point on, the publisher can choose to update the data, such as whenever the published version changes. The "subscribers" of the published pages automatically get updates. Subscribers of a spreadsheet notebook, for instance, would automatically receive pages as they are published. The Object Manager effects actions by posting messages or "forms" to either the local Object Exchange (assuming one is the publisher) or the Object Exchange of others (subscribers). Connectivity for the system is provided by the various Object Exchange engines negotiating forms. Each Object Exchange posts and retrieves forms at polling intervals (which may be set to continuous polling). By exploiting the connectivity of existing transport media (e.g., LANs), the present invention delivers workgroup computing benefits to users, but without imposing a rigid structure which restricts when and how they work.

33 Claims, 22 Drawing Sheets

SYSTEM AND METHODS FOR AUTOMATICALLY DISTRIBUTING A PARTICULAR SHARED DATA OBJECT THROUGH ELECTRONIC MAIL

This is a File Wrapper Continuation Patent Application of application Ser. No. 08/223,262, filed Apr. 4, 1994 now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data processing environments and, more particularly, to systems for accessing shared information and other resources, such as in a multi-user environment.

The first personal computers (PCs) debuted in a corporate world which was dominated by mainframes and mini-computers—computers which handled large, centralized databases for the most part and ran little or no personal productivity software. As a result, these early PCs went largely unused. With the advent of electronic spreadsheets and other personal productivity software (e.g., wordprocessors), however, individual workers were soon empowered to handle their own data processing needs, thus the PC revolution was born.

Early on in the use of PCs, much emphasis was given to autonomy—removing users from the centralized control which was the hallmark of mainframes and mini-computers. Although this increased freedom led to increased productivity gains, users soon realized that they needed services which had been provided by the large centralized systems: shared printers, electronic mail, shared databases, and easy data transfer.

A solution to this problem was forthcoming in the form of Local Area Networks (LANs). A LAN typically comprises several computers connected together as a group. At least one of the computers functions as a "server," providing network services to "clients" (other computers) connected to the network. In this manner, valuable information and resources, including programs, information tables, memory, disk space, printers, and the like, may be shared by several users.

Early LAN systems were patchwork, unreliable systems that offered little more than printer and file sharing. These systems provided no built-in messaging facilities, no database or communications services, or the like. Moreover, PC operating system software (e.g., MS-DOS) took little or no advantage of LANs. Thus throughout most of the past decade, LANs essentially functioned as large storage and printer sharing devices; their true power had yet to be exploited.

Recently, LAN vendors, such as Novell, standardized on a series of protocols and APIs (Application Programming Interfaces) which allowed software vendors to make use of the LAN operating system itself. Novell, for instance, created NetWare® Loadable Modules (NLMs) for Netware 386; Microsoft created DLLs for LAN managers. By 1990, Novell's Message Handling System (MHS) protocol was in wide use. Shortly thereafter, Microsoft published its Messaging API (MAPI) specification. With evolving LAN technology, there was a renewed impetus to get corporate data to the decision makers quickly. The way that corporations created and used information began to change.

The most popular approach employed in this new corporate data processing environment is the "client/server" model. Using a client/server database system, for instance, an end user at a personal computer (client) submits a query to the database server, either directly by using the database or indirectly by using an application. The query is sent over the network to the database server, which processes the query and returns the result. Thus, the client/server model has been recognized as a fast way for deploying database applications in the corporate world. Although client/server database applications have finally begun to exploit LAN messaging services to deliver enhanced productivity, these benefits were not quickly extended to other personal productivity software—namely, spreadsheets and wordprocessors.

As Local Area Networks proliferated, it was recognized that the connectivity that LANs provided to client/server databases could be extended to other applications. The basic approach is that of a "workgroup." The premise of workgroup computing is that by imposing a structure—usually a logical organization consisting of rules-based automatic data distribution—on network-connected PCs, a group of people working together can achieve more than if each individual set out on his or her own and used the network only when necessary.

Currently-available workgroup products are server-based, network-specific implementations. These workgroup products impose a rigid structure on those who use them and do not yield results unless entire organizations commit to them completely. Every user in a workgroup must commit to using the workgroup software in a particular fashion before productivity gains for the group may be realized.

Dynamic working relationships within organizations are constantly forming and dissolving as tasks are completed and organizational objectives evolve, however. What is needed is a workgroup solution for enabling a workgroup, without restricting how each individual user completes his or her work, or interfering in how workgroup members connect to each other. The present invention fulfills this and other needs.

SUMMARY OF THE INVENTION

The system of the present invention comprises a computer system providing an Object Exchange module for sharing data objects among application processes (both remote and local). From a user's perspective, the Object Exchange is a publish-and-subscribe facility, which facilitates sharing among workgroups. When a data object, such as one or more spreadsheet pages from a spreadsheet notebook, is "published," it is sent from a desktop computer to other computer users specified by the publisher. Those interested in the published data object (published pages) may elect to receive or "subscribe" to that data. From that point on, the publisher can choose to update the data, such as whenever the published version changes. The "subscribers" of the published pages automatically get updates. Subscribers of a spreadsheet notebook, for instance, would automatically receive pages as they are published.

The system of the present invention includes a preferred interface and methods for publishing several versions of data objects. The first time a user publishes one or more pages from a notebook, he or she establishes the publication for that notebook by making it available to one or more workgroup members. After establishing a publication for a notebook, one can then issue new versions of the publication whenever desired. The user can also clear the current publication from the active notebook and then establish a new publication, or change the subscriber list at any time. After establishing a publication for a notebook, the user can issue new versions of that publication at any time. When one issues a new version, he or she can change the publication's contents, subscriber list, or both. One can also change the subscriber list without issuing a new version.

When a user publishes, issues versions, or mails data objects, the system submits the published or mailed objects to the Object Exchange, for holding them in its outgoing queues. When the Object Exchange polls an account, it transmits all the objects—notebooks, sets of pages, or individual pages—that the user has sent to that account, and picks up all the objects that the user has received to that account since the Object Exchange last polled it. The Object Exchange holds incoming objects in the user's Object Store, ready for use. Thus the Object Store holds copies of shared data objects and, thus, behaves like a database of the shared objects sent to the user. The Object Store makes all of the user's shared objects continuously available for use in any notebook, whether or not the user is currently connected to messaging services. In a preferred embodiment, shared objects remain in the Object Exchange until deleted.

The Object Exchange is preferably implemented not as an application in itself, but as a middle link between applications and the outside world. In other words, it interacts with the operating system and messaging services to provide workgroup and communication services to applications. The Object Exchange implements an object-sharing API (Application Programming Interface) so that existing applications (clients) can issue commands to the Object Exchange to add workgroup capabilities. Communication between the Object Exchange and a client application is effected through an interprocess communication link, such as available with Windows Dynamic Data Exchange (DDE) or Object-Linking and Embedding (OLE).

The Object Exchange (through its Object Manager) effects actions by posting messages or "forms" to either the local Object Exchange (assuming one is the publisher) or the Object Exchange of others (subscribers). Connectivity for the system is provided by the various Object Exchange engines negotiating forms. Each Object Exchange posts and retrieves forms at polling intervals (which may be set to continuous polling).

Publication to potential subscribers can occur in two forms: available ("ask") subscriptions and automatic ("don't ask") subscriptions. When an object is published on an "ask" basis, announcement of an available subscription is sent to subscribers. Subscribers may "accept" or "reject" the subscription. The former reply makes the subscriber active; the latter reply removes the subscriber from the authorized list. Subscribers who accept the subscription receive versions of the object.

"Don't ask" instructs the Object Exchange to send an "automatic subscription"—that is, one that does not require consent by the subscriber. Objects of this type are announced to users in a manner similar to normal E-mail: announcement (i.e., the declaration part) of the object arrives at the in-boxes of users, without asking those users beforehand. This requires the subscriber to respond by accepting the subscription. Once the reply is processed by the publisher, subsequent issues are automatically sent.

The protocol of distributing objects is, therefore, one of negotiating forms between various Object Exchange engines. The approach affords "deferred connectivity," allowing members to contribute to the workgroup—freely exchanging data objects—without being constrained in place or time. By exploiting the connectivity of existing transport media (e.g., LANs), the present invention delivers workgroup computing benefits to users, but without imposing a rigid structure which restricts when and how they work. Users may add as much or as little structure to workgroups as is necessary for the task at hand.

Figure 1A:
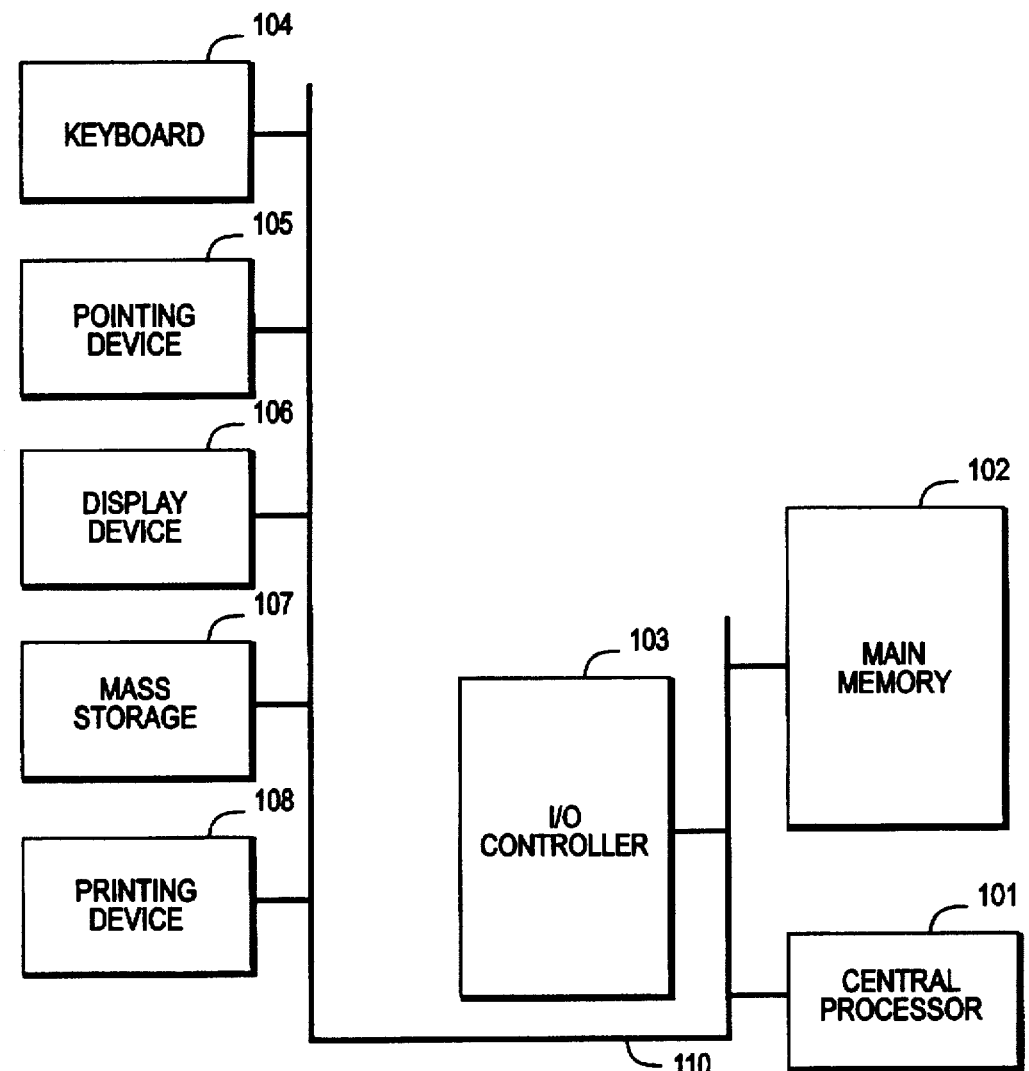
FIG. 1A is a block diagram of a computer system in which the present invention may be embodied.

GLOSSARY accounts list: List of all accounts created with OBEX, along with icons that indicate the current status of each account. The accounts list appears on the left side of OBEX window.

account name: A unique name that is given to an OBEX account when it is created. The account name appears in the account's list on the left side of OBEX window.

address: The unique electronic mail or communication system address that is used when mailing or publishing objects to other members of a workgroup.

address book: A set of files that contain addresses of other OBEX users to whom information may be distributed.

address group: A group of users within an address book. Groups may be used as distribution lists when publishing objects.

alert: An OBEX error message. OBEX generates alerts when it encounters problems polling or queuing messages to accounts.

alias: A "nickname" that may be used in place of a complete address.

automatic updating: The process by which published data automatically appears in a subscriber application.

connection script: A string of commands that enables connection with MCI Mail when direct dial in does not work. A connection script consists of commands both issued and received by OBEX.

DDE: Stands for Dynamic Data Exchange, a protocol for memory-based communication between Windows applications.

DDE client: An application that initiates a DDE conversation with a named DDE server and makes requests of it.

DDE item: A string that acts like a server-owned variable within a particular DDE topic. In OBEX, every item is classified according to how it can be used, as follows:

Action: The client can poke Action items with specified values to trigger an OBEX action.

ReadOnly: The client can request ReadOnly items, but cannot poke them.

ReadWrite: The client can both request and poke ReadWrite items.

DDE server: An application that offers services to other applications via DDE. When a server opens, it registers its server name with the DDE system, making it available to DDE client applications. When the OBEX Enabling Kit is used, OBEX is a DDE server.

DDE topic: A string defining the type of service requested (sent from the DDE client to the DDE server).

hot link: A DDE link where the DDE server sends data to the DDE client whenever the data changes.

LAN mailbox: A directory that is created on a network file server that enables the LAN to store and forward objects and messages.

mail system: Like MCI, MHS, and Windows for Workgroups, mail systems provide messaging and communication services over LANs, WANS, or telephone lines.

manual updating: The process by which published data appears in the subscriber application only when the subscriber requests an update.

messaging account: Accounts created with OBEX that enable communication with existing messaging service accounts. Messaging services include mail systems such as MCI and MHS, as well as Windows for Workgroups, cc:Mail, and a variety of LANs.

messaging service: Messaging services include mail systems such as MCI, MHS, and Windows for Workgroups, as well as E-mail programs such as cc:Mail and Microsoft Mail.

modem: A device that transmits and receives data through telephone lines. Modems modulate digital computer signals into analog signals that telephone lines can carry, and demodulate analog signals received through telephone lines back into digital signals before passing them to a computer.

OBEX™: Object Exchange module which is the agent that enables users to establish and manage ongoing publication-distribution relationships among workgroup members and applications.

object: Any data component packaged and distributed as a message. For example, spreadsheet objects can be notebooks, pages, and sets of pages. Database objects can be results of queries and tables.

object store: A private OBEX directory that stores shared objects mailed or published to the user.

poke: Set the value of an item in a DDE conversation.

polling: The process of sending out and picking up objects. OBEX polls, or contacts, an account both to transmit outgoing objects and pick up incoming ones. Accounts may be polled manually, or OBEX can poll the accounts automatically at specified intervals.

post office: A directory that contains mailbox subdirectories. OBEX uses post offices and mailboxes to let users send objects over LANs.

publishing and subscribing: When information is sent to other workgroup members, that information is published. Those who receive the information are subscribers.

primary account: When there are multiple accounts for a messaging service, one account is designated as primary. OBEX automatically queues messages into the primary account.

request: A message from a DDE client to a DDE server to send data, receive data, or execute a command.

server name: A string used by the DDE system to identify the server in a DDE dialog. For many applications, the server name is the same as the file name. For example, the server name for the application OBEX.EXE is "obex".

transport: Transports include mail systems such as MCI, MHS, and Windows for Workgroups, as well as E-mail programs such as cc:Mail and Microsoft Mail. OBEX also uses a variety of LANs to exchange messages and objects.

version: One of possibly many variations of a published object. The act of modifying published data and publishing the new data to subscribers is called issuing a new version of that publication.

version depth: The number of versions of given publication available to a subscriber. The version depth is set by the publisher.

warm link: A DDE link where the DDE server notifies the DDE client whenever data changes.

workgroup: A group of two or more people responsible for or involved with a particular task for a particular period of time.

DETAILED DESCRIPTION OF A PREFERRED EMBODIMENT

System Hardware

As shown in FIG. 1A, the present invention may be embodied on a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

Figure 1B:
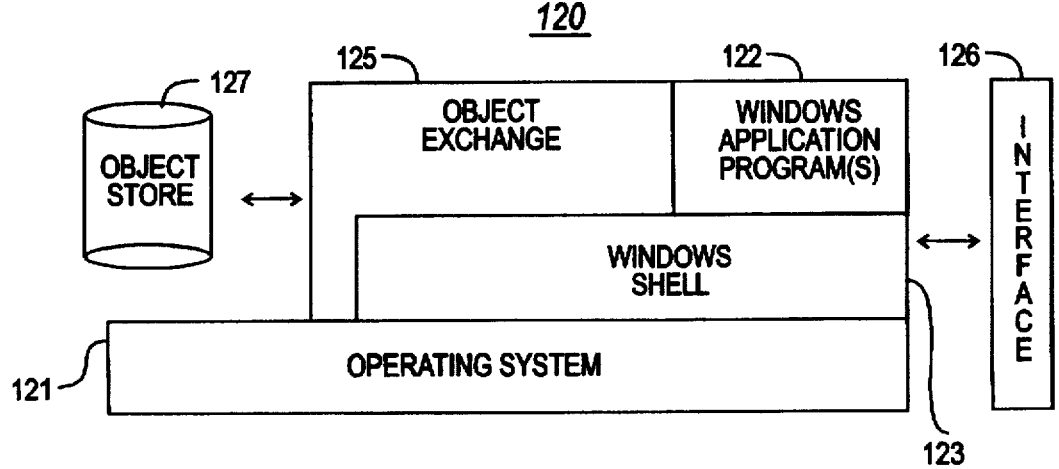
FIG. 1B is a block diagram of a software system of the present invention, which includes operating system, application software, and user interface components.

Illustrated in FIG. 1B, a computer software system 120 is provided for directing the operation of the computer system 100. Software system 120, which is stored in system memory 102 and on disk memory 107, includes a kernel or operating system 121 and a windows shell 123. One or more application programs, such as application software 122, may be "loaded" (i.e., transferred from storage 107 into memory 102) for execution by the system 100. The system 100 receives user commands and data through user interface 126; these inputs may then be acted upon by the system 100 in accordance with instructions from operating module 121 and/or application module 122. The interface 126, which is preferably a Graphical User Interface (GUI), also serves to display results, whereupon the user may supply additional inputs or terminate the session. In a preferred embodiment, operating system 121 is MS-DOS, and shell 123 is Microsoft® Windows; both are available from Microsoft Corporation of Redmond, Wash. Application(s) module 122, on the other hand, includes spreadsheet application software in a preferred embodiment (as described in further detail hereinbelow).

As shown, the system 120 also includes an Object Exchange Engine 125 of the present invention. In response to requests from client processes (e.g., applications 122), the Object Exchange 125 effects data sharing with other remote systems. For local storage, the Object Exchange 125 includes an Object Store 127—storage (typically allocated from device 107) for holding data objects to be shared. Before the Object Exchange and Object Store are described in further detail, however, other features of the present invention will first be presented.

Network Architecture

Figure 1C:
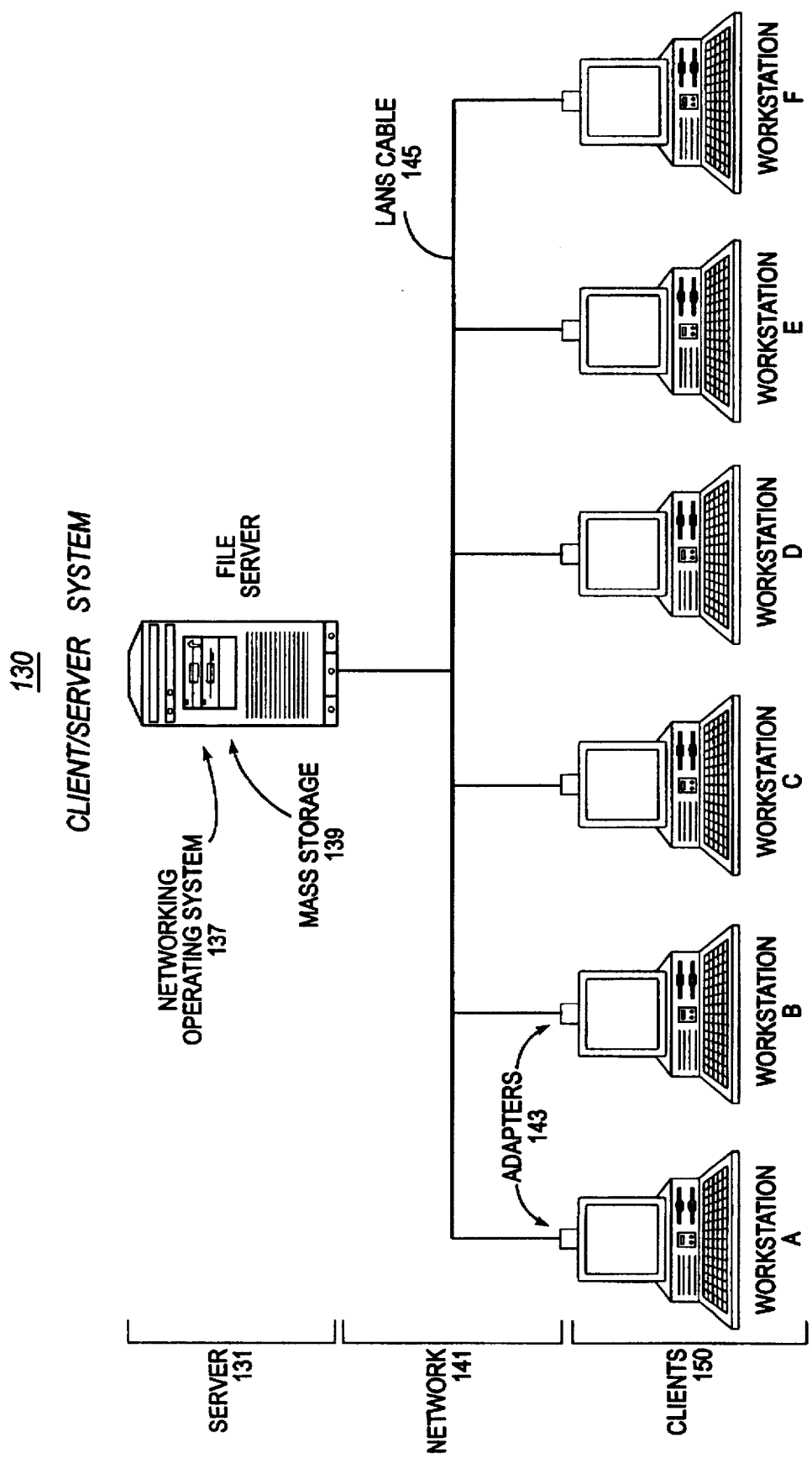
FIG. 1C is a block diagram of a multi-user computing environment, such as a client/server system connected via a Local Area Network (LAN), in which the present invention is most preferably embodied.

While the present invention is operative within a single (standalone) computer (e.g., system 100 of FIG. 1A), the present invention may be embodied in a multi-user computer system, such as the client/server system 130 of FIG. 1C. Specifically, system 130 includes a first computer or server 131 and one or more second computers or clients 150. In an exemplary embodiment, the clients or workstations 150 are connected to server 131 through a computer network 141, which may be a conventional Local Area Network (LAN). Network 141 includes cabling 145 for connecting the server and each workstation to the network. The workstations themselves will be similar to or the same as system 100; additionally, each typically includes a network connector or adapter 143 for receiving the network cable 145, as is known in the art. Server 131 may also be similar to or the same as system 100. Because the server manages multiple resources for the clients, it should preferably include a relatively faster processor, larger mass storage, and more system memory than is found on each workstation.

Overall operation of the system 130 is directed by a networking operating system 137, which may be stored in the server's system memory; in a preferred embodiment, OS 137 includes NetWare®, available from Novell of Provo, Utah. In response to requests from the clients 150, the server 131 provides various network resources and services. For instance, multiple users (e.g., workstations A, B, and C) may view a database table stored in file server storage 139, while another user (e.g., workstation E) sends a document to a network printer (not shown).

The general construction and operation of a computer network has been well documented in the technical, trade, and patent literature. For a general introduction to a Local Area Network operating under NetWare, see Freed, L. et al., *PC Magazine Guide to Using NetWare*, Ziff-Davis Press, 1991. A more detailed discussion is available in NetWare® and accompanying documentation, which is available from Novell of Provo, Utah. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. The disclosures of each of the foregoing are hereby incorporated by reference.

Interface

A. Introduction

The following description will focus on the presently preferred embodiments of the present invention, which are embodied in spreadsheet application software operative in the Microsoft® Windows environment. The present invention, however, is not limited to any particular application or any particular environment. Instead, those skilled in the art will find that the teachings of the present invention may be advantageously applied to a variety of other applications, including database management systems, wordprocessors, and the like. Moreover, the present invention may be embodied on a variety of different platforms, including Macintosh, UNIX, NextStep, and the like. The present invention is particularly advantageous when applied in those instances where data objects are to be shared. Therefore, the description of the exemplary embodiments which follows is for purposes of illustration and not limitation.

Figure 1D:
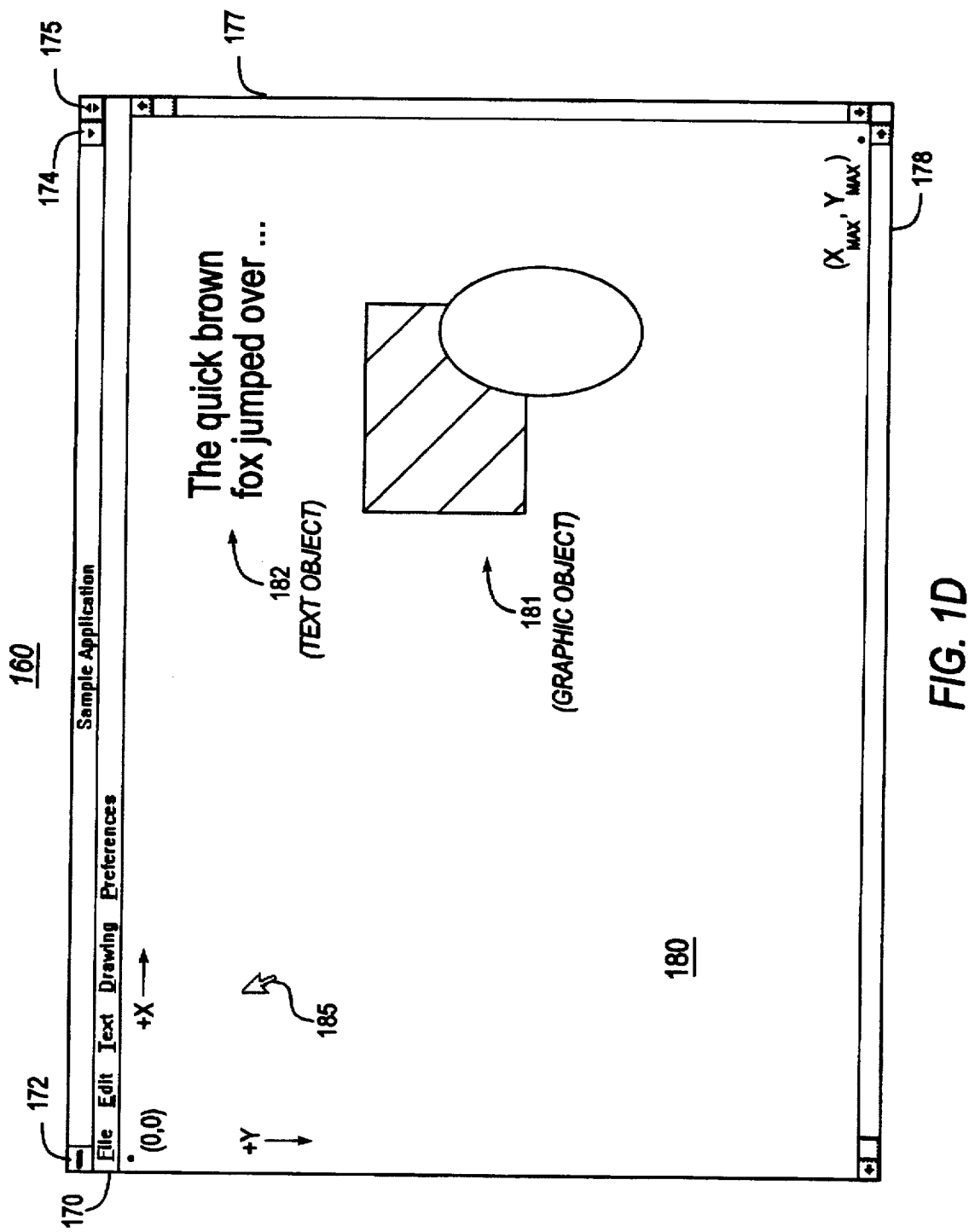
FIG. 1D is a bitmap screenshot illustrating the basic architecture and functionality of a graphical user interface in which the present invention may be embodied.

Referring now to FIG. 1D, the system 100 includes a windowing interface or workspace 160. Window 160 is a rectangular, Graphical User Interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art; see, e.g., Petzold, C., *Programming Windows*, Second Edition, Microsoft Press, 1990. The disclosures of each are hereby incorporated by reference.

B. Preferred interface

Figure 2A:
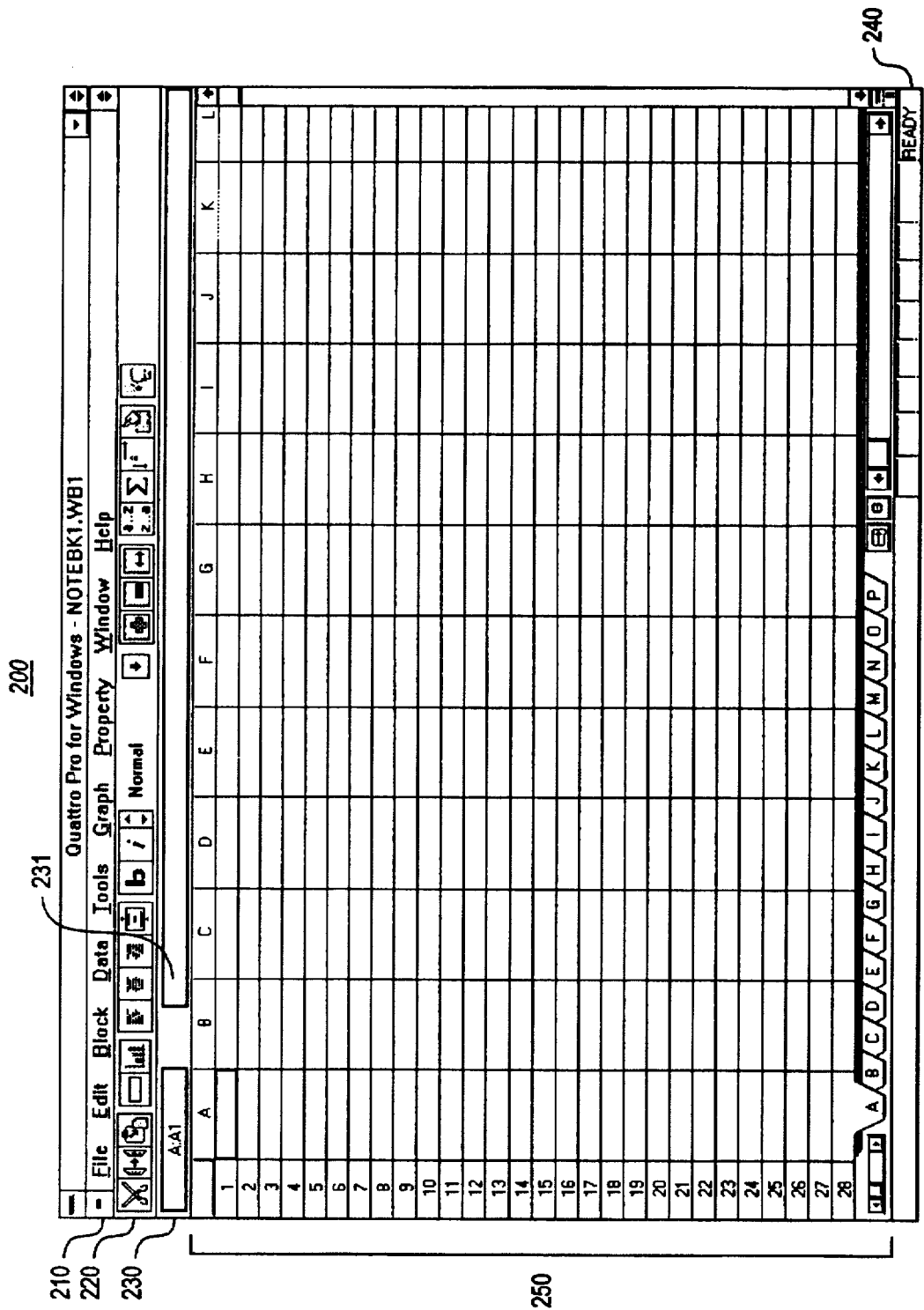
FIG. 2A is a bitmap screenshot illustrating a spreadsheet notebook interface employed in a preferred embodiment of the present invention.

Shown in FIG. 2A, a spreadsheet notebook interface employed in the preferred embodiment will now be described. The spreadsheet notebook or workbook includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pulldown menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
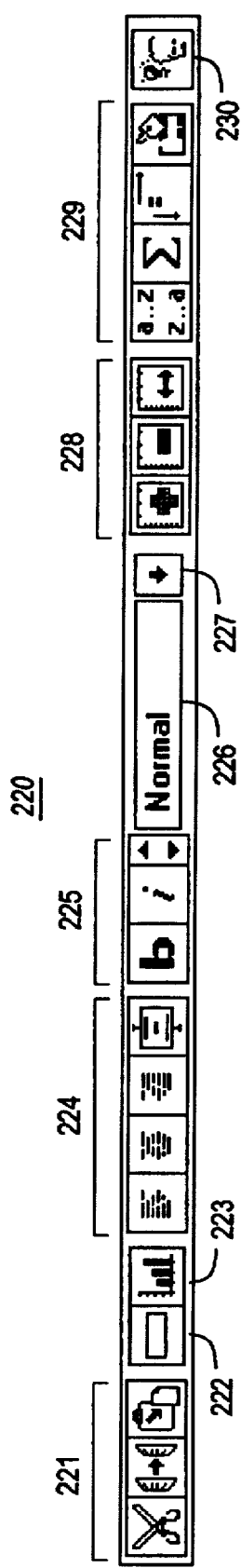
FIG. 2B is a bitmap screenshot of a toolbar component of the interface of FIG. 2A.

The toolbar 220, shown in further detail in FIG. 2B, comprises a row or palette of tools which provide a quick way for the user to choose commonly-used menu commands or properties. In an exemplary embodiment, toolbar 220 includes Cut, Copy, and Paste buttons 221, a Power Button tool 222, a Graph tool 223, Alignment buttons 224, Font buttons 225, a Style List 226 with pulldown 227, Insert/ Delete and Fit buttons 228, Action (e.g., sort, sum, and the like) buttons 229, and an "Expert" (tutor) button 230. The functions of these buttons are suggested by their names. For instance, buttons 221 cut, copy and paste data and objects to and from Windows' clipboard. The same actions are also available as corresponding commands in the Edit menu (available from menu bar 210). Tool 220 creates "power-buttons" which allow a user to run spreadsheet macros; in a specific embodiment, powerbuttons appear as floating objects in a layer above spreadsheet cells. In a similar fashion, the Graph tool 223 creates floating graphs that appear above spreadsheet cells.

The notebook, which provides an interface for entering and displaying information of interest, includes a plurality of spreadsheet pages. Each page may include conventional windowing features and operations, such as moving, resizing, and deleting. In a preferred embodiment, the notebook includes 256 spreadsheet pages and one Graphs page, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
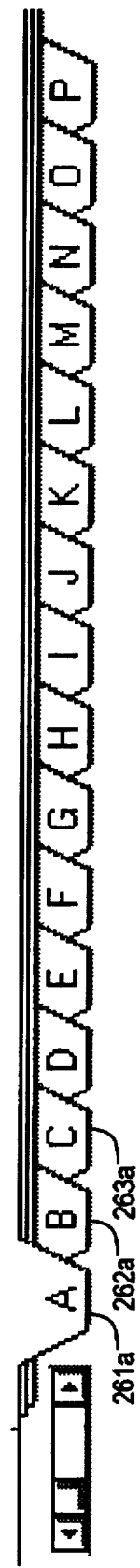
FIGS. 2C–D are bitmap screenshots illustrating page identifiers for rapidly accessing and manipulating individual pages of the notebook interface.
Figure 2D:
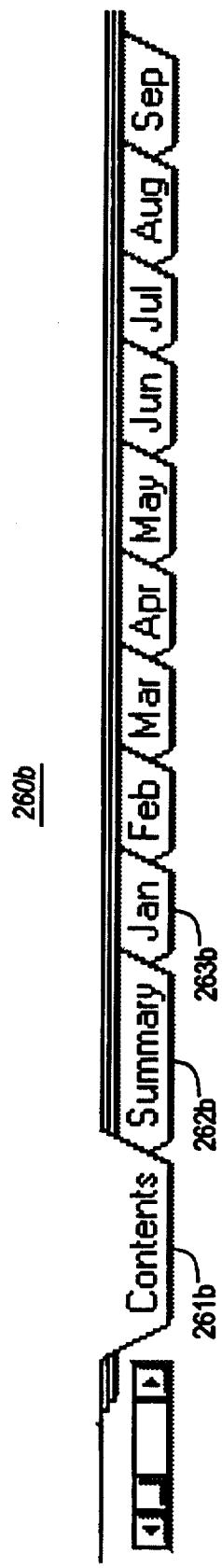

As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a bottom edge of the notebook. Each tab member may include representative indicia, such as textual or graphic labels, including user-selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers aid in the entry of spreadsheet formulas. For example, when entering a formula referring to cells on another page, the user may simply use the descriptive page name in the formula itself, thus making it easier for the user to understand the relationship of the cell(s) or information being referenced.

A general description of the features and operation of the spreadsheet notebook interface may be found in Quattro® Pro for Windows (*Getting Started, User's Guide and Building Spreadsheet Applications*), available from Borland International; additional description may be found in U.S. patent application Ser. No. 07/866,658, commonly owned by the present assignee.

Distributed Object Architecture

A. Introduction

The present invention exploits the connectivity of existing transport media (e.g., LANs, email, and the like) in order to deliver workgroup computing benefits to users, but without imposing a rigid structure which restricts when and how they work. The present invention makes sharing of data over the network or through messaging services completely transparent to the computer user, thus allowing that user to specify when and how sharing will take place.

Figure 3A:
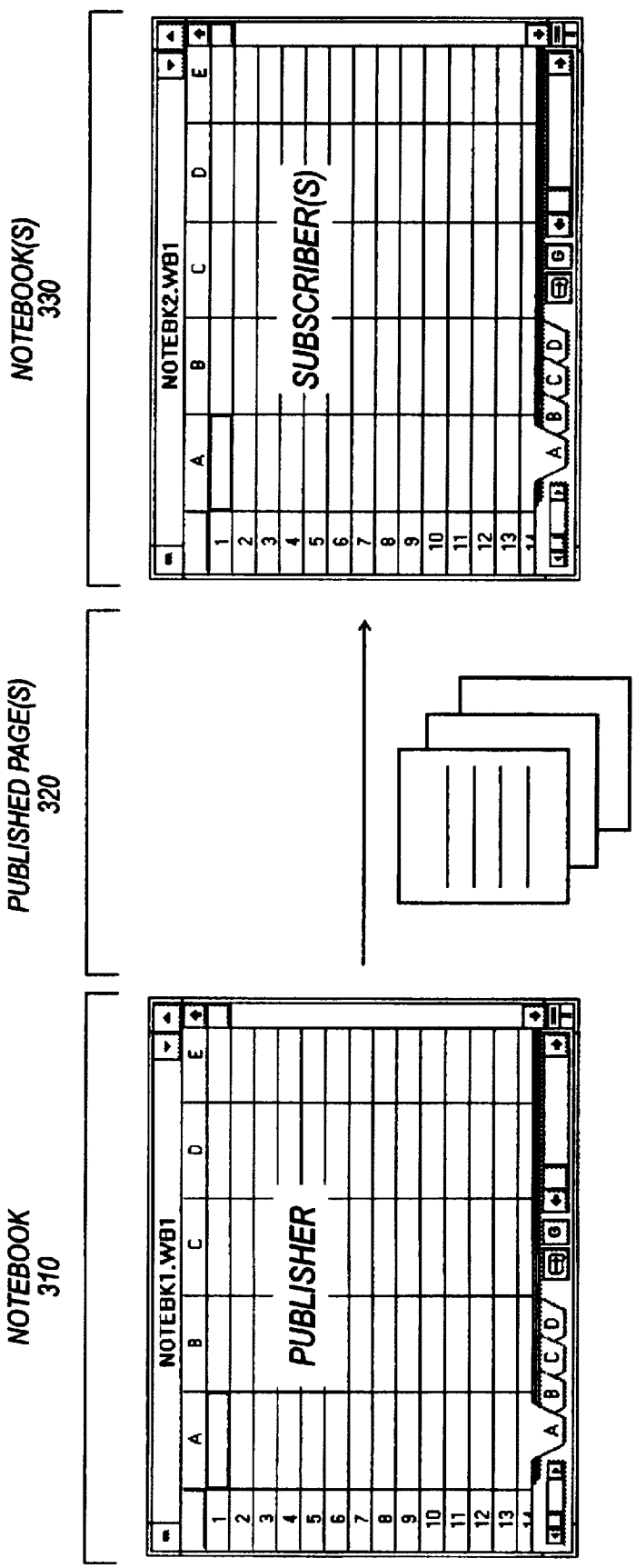
FIG. 3A is a diagram illustrating information (data object) flow according to the present invention.

The system of the present invention employs an object exchange architecture, which may be viewed from two perspectives. From the user's perspective, the Object Exchange is a publish-and-subscribe facility, as shown in FIG. 3A, which facilitates sharing among workgroups. When a data object, such as one or more spreadsheet pages from notebook 310, is "published," it is sent from a desktop computer to other computer users specified by the publisher. Those interested in the published data object (published pages 320) may elect to receive or "subscribe" to that data. From that point on, the publisher can choose to update the data, such as whenever the published version changes. The "subscribers" of the published pages 320 automatically get updates. For this example, the spreadsheet notebook of each subscriber (e.g., notebook 330) would automatically receive pages as they are published.

The publish/subscription model is well suited for solving real-world data processing needs. Consider, for instance, a hypothetical company having four sales districts, each having a manager responsible for reporting sales activities. These four managers report to a country manager, who in turn presents a summary report every week to the vice president of Sales for the company. Restated in terms of a publish/subscribe model, the job of all four district managers is to publish their sales reports at the end of the week. The sales director subscribes to these reports, thereby receiving an update automatically (e.g., upon polling by the system). With each new instance or versions of previously subscribed objects, the system automatically updates the sales director's summary sheet. The director then sends the updated summary report, via publication, to the VP of Sales (and any other interested subscribers).

Employing this model, the system of the present invention enables users to add as much or as little structure to workgroups as is necessary for the task at hand. A group may choose to poll published media every morning, or implement automatic polling, or use lists of subscribers so that published data is distributed in an organized manner. Thus, the system's publish-and-subscribe facility works the way users do.

B. Tools

Figure 3B:
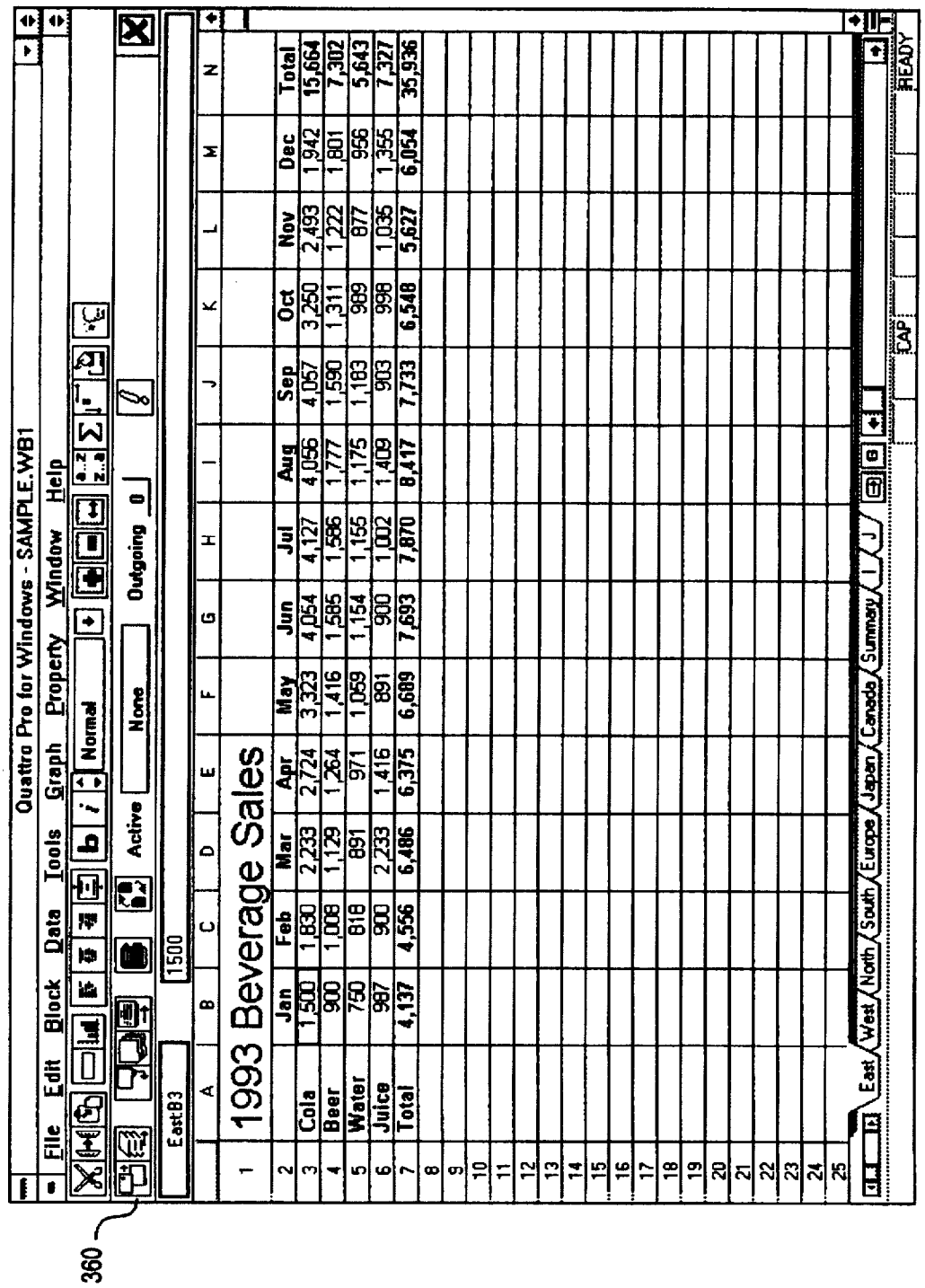
FIG. 3B is a bitmap screenshot illustrating an Object Exchange interface of the present invention; a sample model (worksheet) has been loaded into the system.

As shown in FIG. 3B, the system of the present invention includes workgroup tools. The figure shows a spreadsheet notebook 350 displaying a first page ("East"). The page or spread includes a hypothetical model for monthly sales of a beverage company. Upon invocation of a Workgroup Desktop command (Data|Workgroup Desktop, from the main menu), the system displays a Workgroup Desktop Toolbar 360, which includes preferred tools of the present invention for effecting workgroup management.

Shown in further detail in FIG. 3C, these tools will now be described. Mail button 361 allows a user to mail a data object, such as a page, a set of pages, an entire spreadsheet notebook, or other data object, to selected other users. Publish button 362 lets the user publish a data object to selected other users, set a version depth, issue new versions of published data objects, manage a subscriber list, and clear any current publication from the active notebook. Use button 363 lets the user insert mailed or published data objects into his or her own notebooks, use mailed notebooks, and delete objects from the Object Exchange module. Manage Pages button 364 lets the user see information on mailed and published pages inserted into the active notebook; rename, update, and change the update method of mailed and published pages individually; change the version of published pages individually, and remove mailed and published pages from the active notebook. Index button 365 displays a "workgroup index" (a special notebook page named "Workgroup") that contains information on the active notebook's current publication and all shared pages currently inserted into it. Address button 366 lets the user create and select address books, create and manage address groups, and manage addresses of workgroup desktop users contained in the address books and groups. The Poll button 367 instructs the Object Exchange module of the system to poll one or more (primary) messaging accounts.

Active Account box 368 functions to display the name of the primary account that the Object Exchange module is currently polling. Outgoing box 369 indicates how many items in the Object Exchange module are waiting to be sent. Finally, an Alerts button 370 is provided for allowing the user to view, delete, and clear any alerts (e.g., error messages) from the Object Exchange module.

C. User configuration

The system of the present invention includes a preferred interface for creating, configuring, modifying, and deleting messaging accounts, for creating and selecting address books, and for creating and managing address groups. With reference to FIGS. 3D–G, the preferred interface will now be described.

Figure 3C:
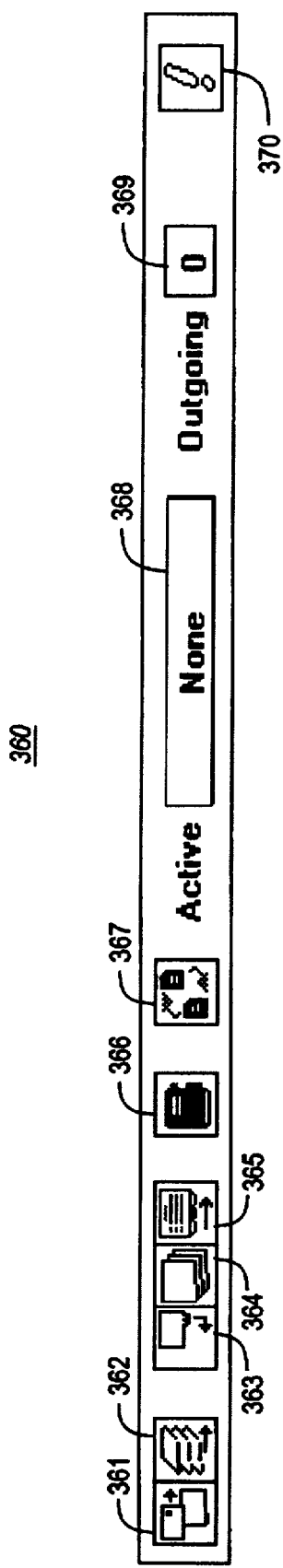
FIG. 3C is a bitmap screenshot of a toolbar component of the interface of FIG. 3B.
Figure 3D:
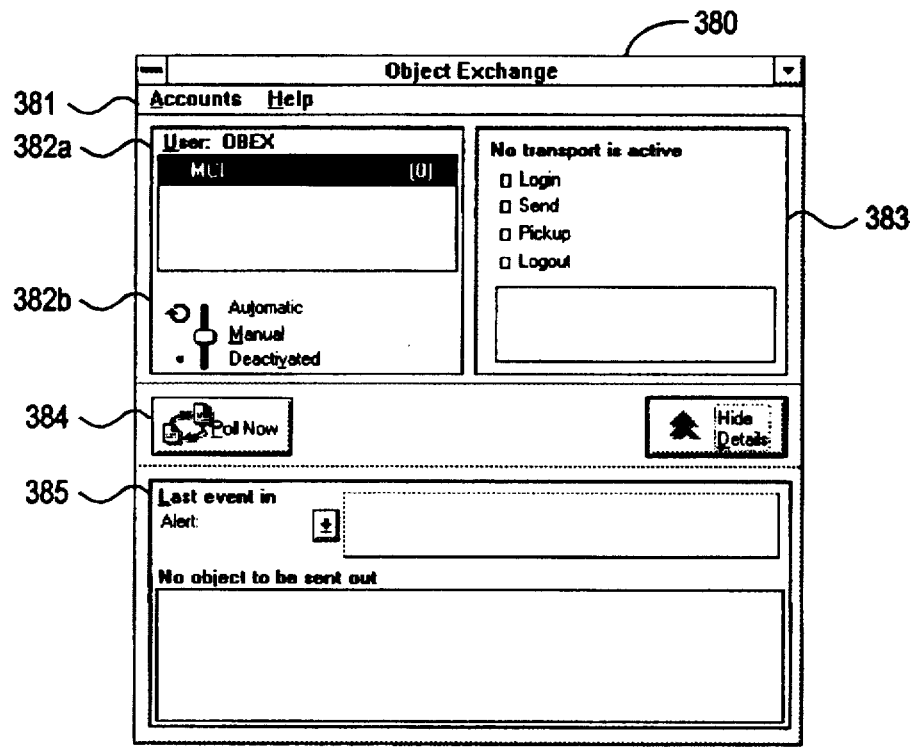
FIG. 3D is a bitmap screenshot illustrating a configuration dialog for receiving user input specifying configuration for object exchanging.

The user interface for the Object Exchange module is shown in FIG. 3D. Object Exchange window 380 includes a menu bar 381, Account Status indicator 382a, Polling Mode indicator 382b, Active Transport indicator 383, Poll Now button 384, and Object Exchange Detail (status) area 385.

Menu bar 381 includes an Accounts submenu (submenu 386 of FIG. 3E) for adding, deleting, and configuring messaging or transport accounts. The Account Status indicator 382a tells the user how many objects are waiting to be sent through each account. As shown, for instance, the Object Exchange dialog 380 of FIG. 3D has no (zero) objects waiting to be sent via MCI Mail. Polling Mode indicator 382b allows the user to specify a polling mode (e.g., automatic or manual) for each messaging account; if desired, polling may also be deactivated for particular accounts. The right side of the Object Exchange window 380—the Active Transport indicator 383—displays each step of the polling process. Screen indicators are provided for telling the user when the Object Exchange module is logging into an account, querying an account for objects to transmit or pick up, sending objects, or logging out of an account. Indicator 383 includes a message box beneath the polling indicators for displaying screen messages of activity when the Object Exchange module polls an account. The Poll Now button 384, when activated by the user, instructs the Object Exchange module to poll the currently selected messaging account (as highlighted in 382a).

Object Exchange detail area 385 provides a list of all outgoing objects waiting to be sent by the Object Exchange. Alerts (system messages) are displayed in a drop-down list box. The bottom box shows the status of the Object Exchange outgoing queue and provides details about each object waiting to be sent out; details include the sender's user name and messaging service that the object is being sent through.

The first time a user invokes the Object Exchange module, the Accounts list (as displayed in indicator region 382a) is empty. Therefore, an interface is provided for configuring new accounts. Each account created by the user includes a descriptive name for the account, which will appear in the Accounts list 382a. Each account corresponds to a messaging service account or LAN mailbox. The user can create as many accounts as are needed for each messaging service. When configuring an account, the user simply supplies information needed to connect with his or her messaging service accounts or mailboxes. Also at this time, the user can set a polling frequency for each messaging account, telling the system how often and between what hours to poll.

Figure 3E:
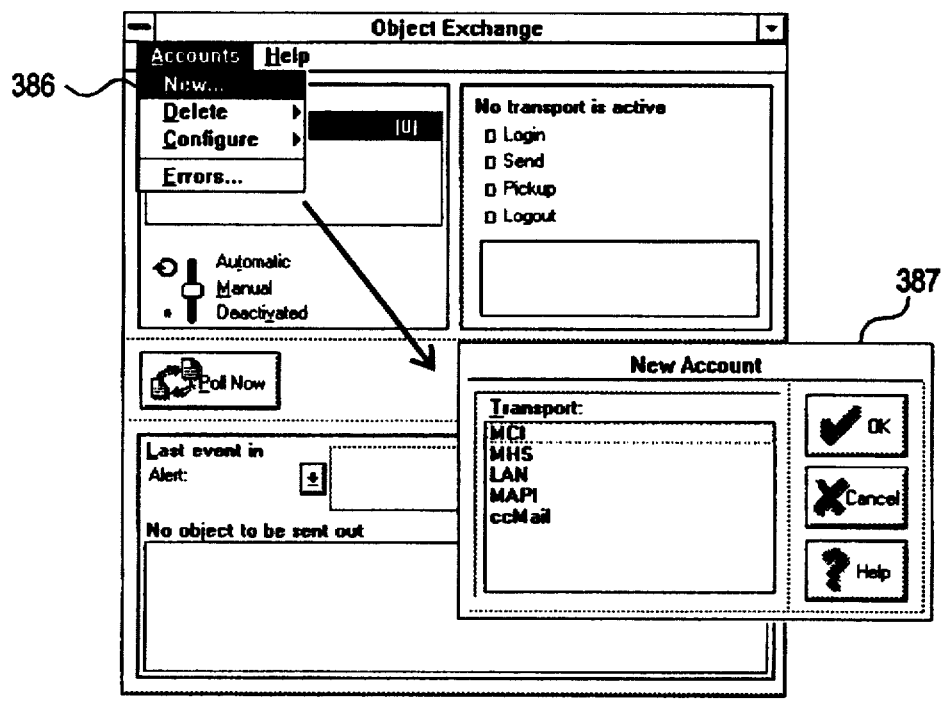
FIG. 3E is a bitmap screenshot illustrating creation of new Object Exchange accounts, using the dialog of FIG. 3D.

As shown in FIG. 3E, the user defines a new account by selecting New from the account's submenu 386. In response, the system displays the New Account dialog box 387. From the dialog 387, the user selects a desired messaging service (e.g., MCI, MHS, LAN, MAPI, and the like) from the Transport list. Upon selection of a particular messaging service, the system displays a Configuration Dialog box for receiving user-supplied account information. Exemplary configuration dialog boxes for MCI and LAN accounts will be illustrated.

Figure 3F:
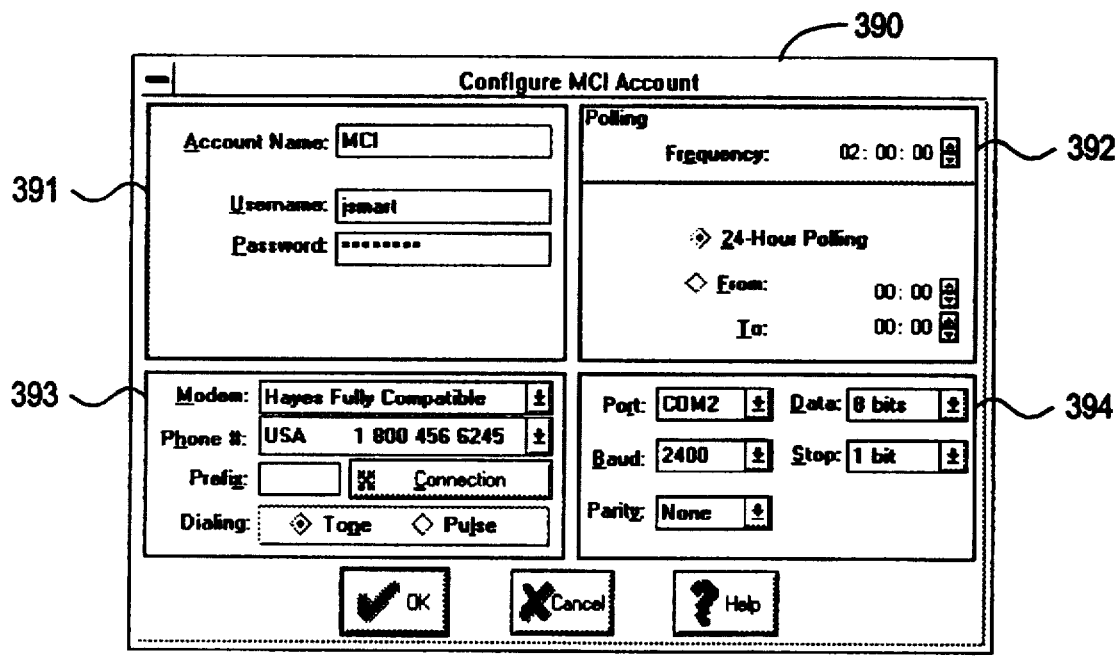
FIGS. 3F–G are bitmap screenshots illustrating exemplary dialogs for configuring messaging (transport) accounts.

FIG. 3F illustrates an MCI Configuration Dialog 390 which is displayed when the user selects MCI from the Transport list (of dialog 387). The user is required to supply his or her MCI user name and password in Account Information region 391. Modem Configuration region 393 and Communication region 394 receive user input for specifying a modem type and communication port/protocol.

Polling Input region 392 allows the user to specify that the messaging account is to be polled automatically. Here the user indicates a frequency: how often the Object Exchange module is to poll the account. The user may also specify 24-hour polling, for round-the-clock polling. Alternatively, the user may select "from" and "to" for restricting polling to certain hours.

Figure 3G:
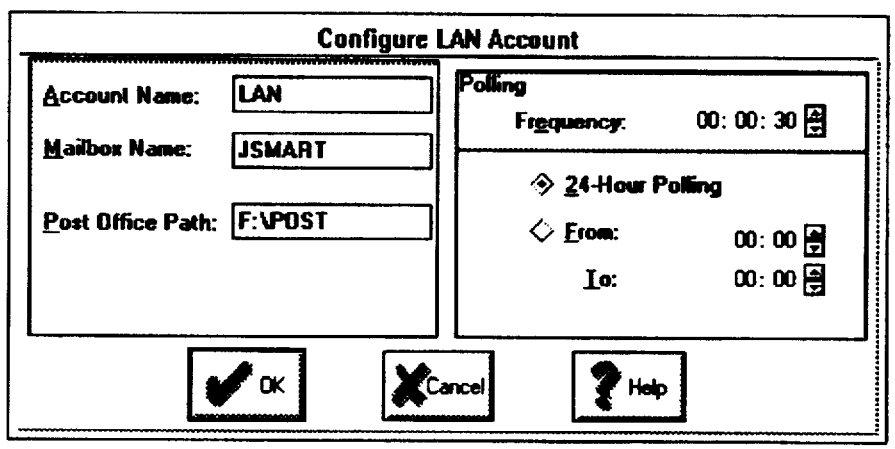

FIG. 3G illustrates a Configuration dialog for configuring a LAN account. The dialog receives user input specifying an account name, a mailbox name, and a post office path (the location of the drive and directory that contains the LAN mailbox). In a similar manner, configuration dialogs may be provided for receiving the particulars of other messaging accounts.

F. Address Book

The system of the present invention includes electronic address books, in the form of spreadsheet notebooks, for storing addresses of workgroup desktop users. Although one does not have to use an address book to mail or publish, address books greatly simplify the process of managing mailing and subscriber lists. Address books can reside either on a shared computer for use by all workgroup members (who have access rights to it), or on any user's local computer. For shared address books created and maintained by a system administrator, each workgroup user need only select a particular address book to gain access to all of the addresses contained in it. The user is given the option of creating his or her own local or private address books, organized in a fashion that is convenient for the user.

Each address book includes entries having an alias—a unique user name that can be used in place of a full address—and a delivery address. If a user has more than one address (e.g., has both MHS and LAN addresses), the address book can contain both addresses, with a different alias for each.

Every address book contains one default group (named "Everybody"), which includes every address entered into that address book. The user can create additional address groups comprising addresses from the Everybody group. In this manner, the groups can function as distribution lists for addressing mail or publications to many workgroup desktop users at once. For instance, an address book might include one address group for a company, department, project, or the like. Address groups can share addresses with other groups, and the user can modify a group membership at any time.

Figure 4A:
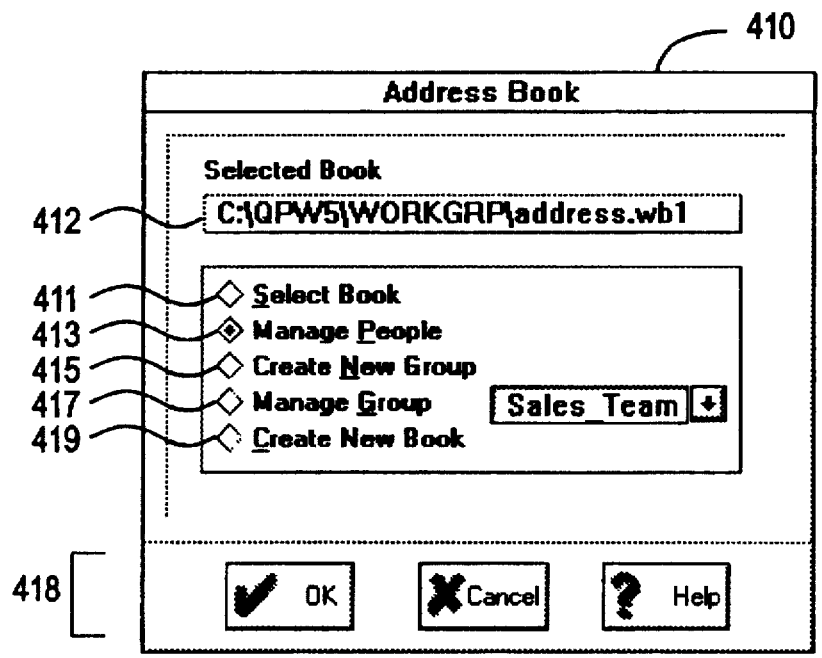
FIGS. 4A–D are bitmap screenshots illustrating exemplary dialogs for creating address books and grouping addresses within those books.

Referring now to FIGS. 4A–D, a preferred interface for managing workgroup addresses will be illustrated. Upon selecting the Workgroup Address button (button 366 from FIG. 3C), the system displays an Address Book dialog box 410, as shown in FIG. 4A. The path and name of the currently selected address book appears in Selected Book edit field 412. To select a different address book, the user chooses Select Book radio button 411, and then chooses "Ok" (from buttons 418); in response, the system displays a filename dialog box for selecting a new address book.

To create a new address book the user chooses the Create New Book radio button 419 and selects "Ok". The user can now enter aliases, addresses, and groups into the new address book. After naming the address book (e.g., with a descriptive title), the user proceeds to enter names and addresses.

Figure 4B:
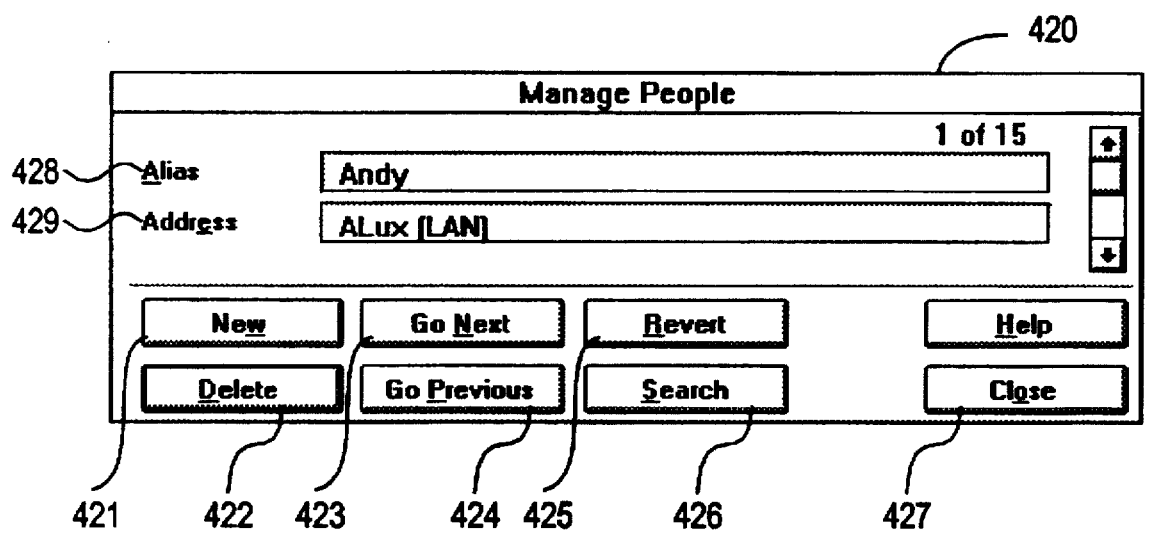

As shown in FIG. 4B, the system provides a Manage People dialog 420 for receiving the alias (name) and address for each address book entry. As shown, the dialog includes an Alias edit field 428 and an Address edit field 429; these receive alias and address information, respectively. To assist with data entry, the dialog 420 includes button tools 421–427. New button 421 creates a new, blank entry, which is added after the last (previous) entry. Delete button 422 erases the active entry. Go Next button 423 displays the next entry. Go Previous button 424 displays the previous entry. Revert button 425 cancels edits to the current entry, thus restoring original data. Search button 426 turns on a search mode which allows the user to search for entries in the address book. When the user has completed address book data entry, Close button 427 is selected.

In a preferred embodiment, the user can create groups for selected address books at any time. Groups serve as distribution lists to use when one is building mailing and subscriber lists. The user can populate groups with addresses from the Everybody group. The user can create as many groups as desired in an address book.

Figure 4C:
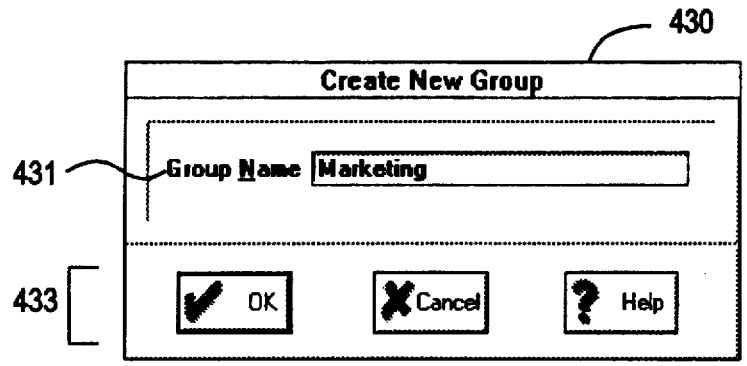

From the Address Book dialog 410 (of FIG. 4A), the user selects Create New Group radio button 415 and chooses "Ok." In response, the system displays Create New Group dialog box 430, as shown in FIG. 4C. Dialog 430 includes a Group Name edit field 431, for receiving a user-specified name. Buttons 433 allow the user to accept or cancel the new group name.

Figure 4D:
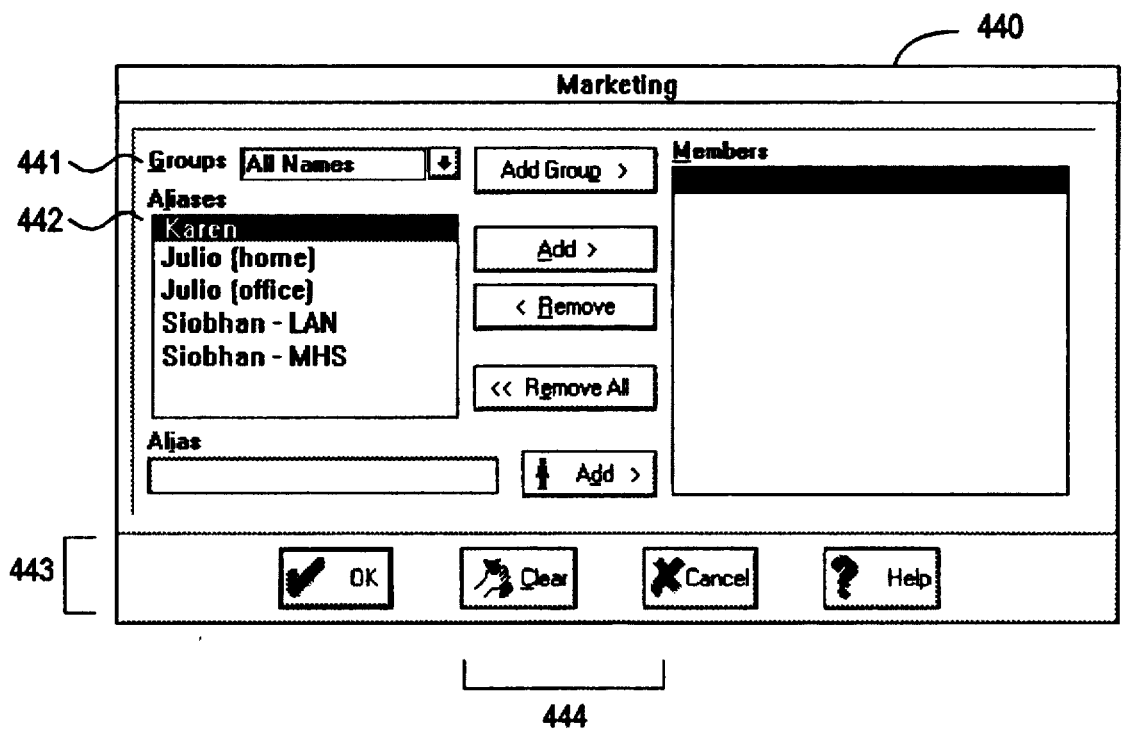

After specifying a name for the new group (e.g., selecting "Ok" button 433), the system displays Group Management dialog box 440 for the user-specified group, as shown in FIG. 4D. The dialog 440 includes an Aliases box 442 listing all of the addresses (by alias), and includes a Group list box 441 for listing all of the groups in the current address book. To add an address to the group, the user selects an alias from the Alias box 442 (or types an alias in the Alias text box) and then chooses Add button (from buttons 444). To add all members of any existing group to a new group, the user selects the group from the Groups List 441 and then chooses the Add Group button (from buttons 444). To remove addresses from the group, the user selects the address desired to be removed in the Members box (right-hand side) and chooses Remove button (from buttons 444). Remove All button removes all addresses from the group. To save a new group with addresses added, the user chooses "Ok" from buttons 443. To save the new group without entering any addresses into it, the user chooses Cancel. To delete a new group, the user chooses Clear.

E. Sharing data objects: Pages and Notebooks

Once an Object Exchange account has been created, the system is ready to begin publishing and mailing data objects. Publishing and subscribing of data objects, such as spreadsheet notebook pages, establishes ongoing data-sharing relationships between one's own data objects and those of remote users. When a user publishes notebook pages and other workgroup members subscribe to them, the data in those pages appear in the subscriber notebooks exactly as it appears in the user's own notebook. After establishing a publication for a notebook, one can change the data in his or her pages or the set of pages he or she is publishing and issue new versions of the publication to subscribers. The subscribers in turn can decide to have those changes appear automatically in their notebooks, or to appear only when they request an update.

The user can set a "version depth" for each publication. The version depth determines how many versions of a publication will be available to subscribers at any given time. If a user wants subscribers to have access to the last twelve months of a monthly sales report, for instance, he or she would set the version depth to twelve. This gives subscribers access to the most recent version as well as to the eleven previous versions. Similarly, if one wanted to publish a scenario page with six pages of variables serving as input, the user would create a single publication with a version depth of six and issue each variables page as a version of that publication. Since subscribers can use any available version, they can insert each version of the variables page in a separate notebook page, or insert the variables page once and simply change the version number to see how many different sets of data affect the scenario.

In a preferred embodiment, published pages are read-only pages. In other words, the published pages are "owned" by the publisher. Subscribers can copy the published data, refer to it in spreadsheet formulas, and redistribute it.

1. Establishing a publication

Figure 5A:
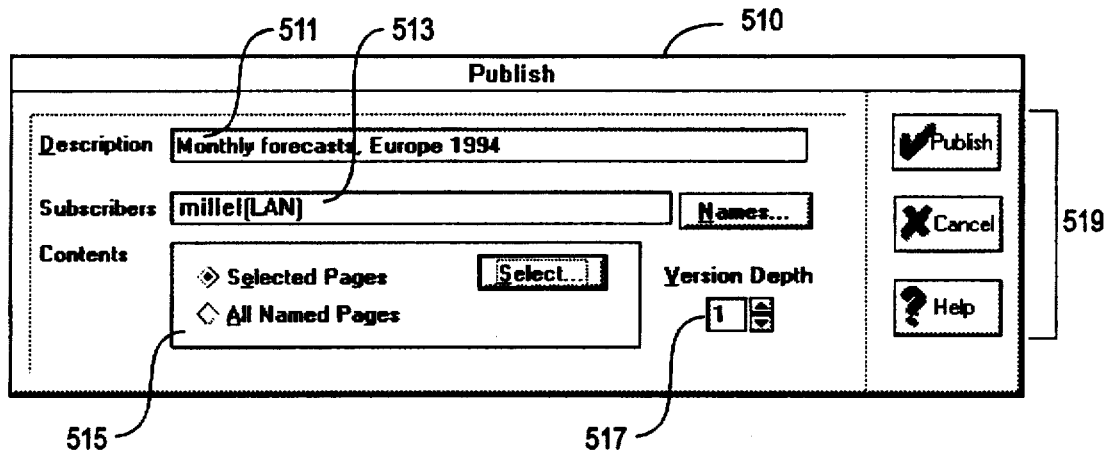
FIG. 5A is a bitmap screenshot illustrating an exemplary dialog for publishing a data object of interest.

Referring now to FIG. 5A, a preferred method and interface for publishing a data object will now be described. The first time a user publishes one or more pages from a notebook, he or she establishes the publication for that notebook by making it available to one or more workgroup members. After establishing a publication for a notebook, one can then issue new versions of the publication whenever desired. The user can also clear the current publication from the active notebook and then establish a new publication, or change the subscriber list at any time.

To establish a publication, the user selects the Publish button 362 (from FIG. 3C). In response, the system displays Publish dialog box 510, as shown in FIG. 5A. The user enters a description for the publication in Description edit field 511. As subscribers will see available publications listed by description, users will typically include descriptive text here. Next, subscribers are specified in the Subscribers edit field 513. By selecting the accompanying Names button, the user may display a dialog for selecting subscribers. Contents field 515 allows the user to specify data objects of the notebook to be published. Version Depth edit field 517 allows the user to in enter a value of version depth; the default is 1. Finally, the user may proceed to publication by selecting the Publish button (from buttons 519). Alternatively, the user may abort the process by selecting the Cancel button.

Figure 5B:
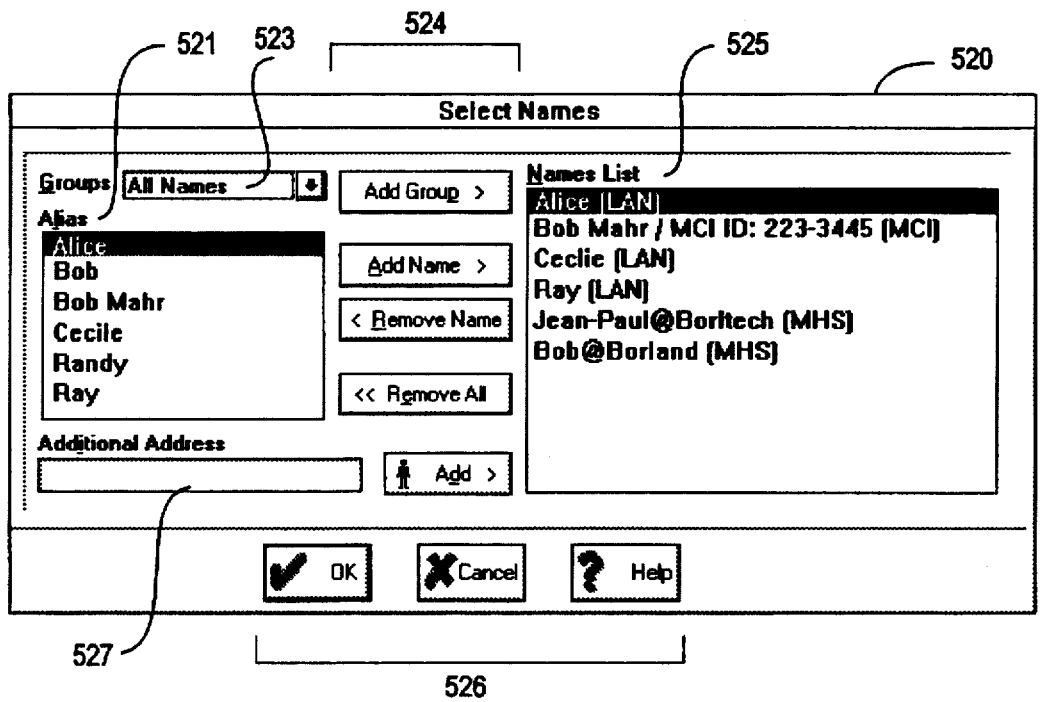
FIG. 5B is a bitmap screenshot illustrating selection of recipients (subscribers) for the published object.

FIG. 5B shows a Select Names dialog box 520 which is displayed upon selection of the Names button (from the dialog 510 of FIG. 5A). The Alias box 521 lists all of the addresses (by alias) and Groups box 523 lists all of the groups, in the current address book. Complete addresses appear in Names list 525 when the user chooses Add Name button (from buttons 524). To add a subscriber to the list, one selects an alias and then chooses Add Name. To add a group of subscribers to the list, one selects the group name from the Groups drop-down list 523, and selects Add Group. The user selects Everybody to publish to all subscribers listed in the address book. To add a subscriber who does not appear in the Alias box, the user types the subscriber's complete address in Additional Address edit field 527. To remove subscribers from the subscriber list, one selects the name desired to be removed in the Names List box 525, and then chooses Remove Name. Remove All removes all subscribers from the subscriber list. After creating the subscriber list, the user may close the dialog by selecting "Ok" button (from buttons 526); this returns the user to the Publish dialog box 510 (of FIG. 5A). Alternatively, the user may cancel the dialog by selecting Cancel.

Figure 5C:
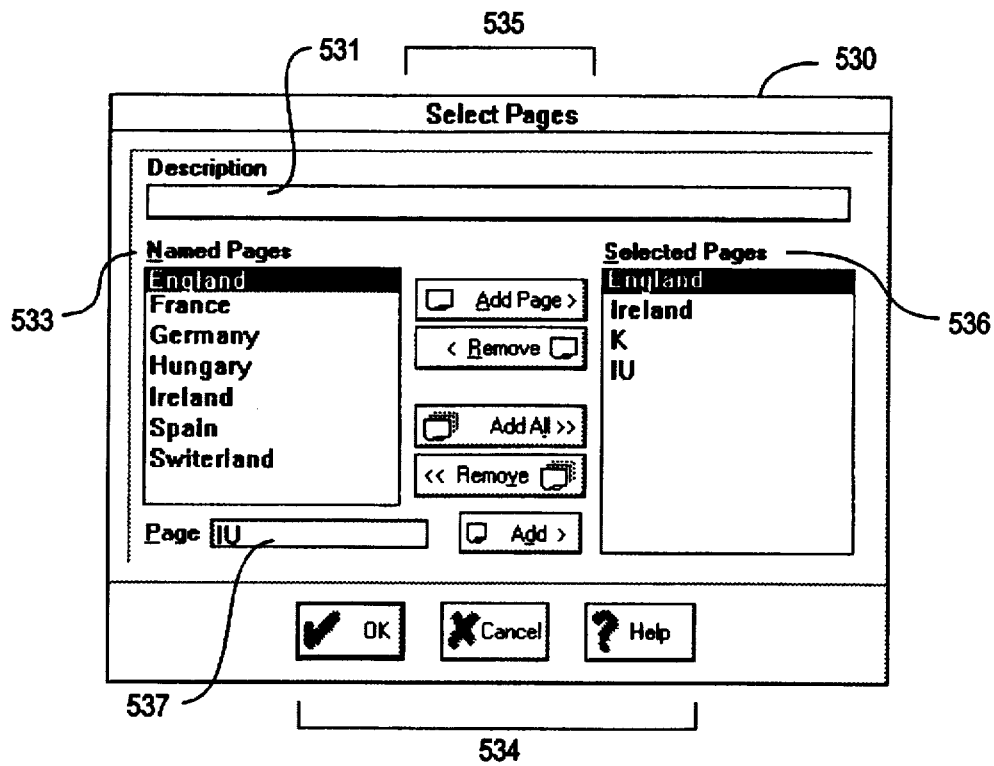
FIG. 5C is a bitmap screenshot illustrating selection of a data object (e.g., spreadsheet notebook pages) for publication.

Upon selection of the Select button of the contents field 515 (of FIG. 5A), the system displays Select Pages dialog box 530 as shown in FIG. 5C. Here, the user selects the contents of the publication. The Named Pages box 533 lists all of the named pages in the active notebook (except for the Graphs and Workgroup pages). Description field 531 displays the descriptive text (which the user had previously entered). To add a page to the selected set, one selects the page and chooses Add Page (from buttons 535), or enters the page letter in Page edit field 537; the user then chooses Add. To publish all listed pages, one chooses Add All. To add an unnamed page to the selected set, one enters the page's letter in the Page edit field 537 and chooses Add. To remove a page from the selected set, one selects the page desired to be removed in the Selected Pages list 536 and chooses Remove. A Remove All button is provided for removing all pages from the selected set. After completion of data entry, the user concludes the dialog by selecting "Ok" or Cancel (from buttons 534). Closing the dialog 530 returns the user back to the Publish dialog box 510. At this point, the Object Exchange stores the publication in its outgoing queues until the next time it polls the messaging services.

2. Issuing new version of a publication

After establishing a publication for a notebook, the user can issue new versions of that publication at any time. When one issues a new version, he or she can change the publication's contents, subscriber list, or both. One can also change the subscriber list without issuing a new version.

Figure 5D:
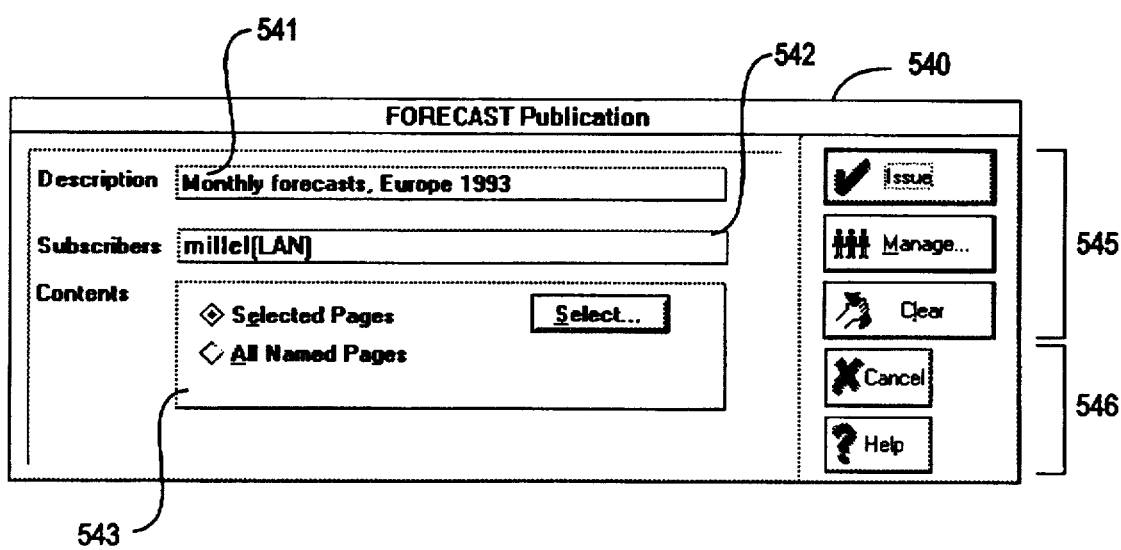
FIG. 5D is a bitmap screenshot illustrating a dialog for issuing versions of a publication.

Referring now to FIG. 5D, an interface and method for issuing a new version of a publication will be illustrated. First, the user opens a notebook in which he or she established the original publication. Next, the user selects the Publish button 362 (of FIG. 3C). In response, the system displays Publication dialog 540 for the active publication. Description field 541 displays the previously-entered descriptive text for the publication. Subscribers field 542 displays the subscribers for the publication. If one desires to modify the publication's contents, new information would be entered into the Contents field 543. If one wants to modify the subscriber list, Manage button (from buttons 545) is selected. The Select Names dialog 520 (of FIG. 5B) is redisplayed for editing the subscriber list for this publication. Finally, the user issues the new version by choosing Issue (from buttons 545).

The user can clear a publication from a notebook at any time. Clearing a publication removes that publication's settings from the active notebook. (It does not delete the corresponding spreadsheet data.) In a preferred embodiment, published pages that subscribers have already inserted into their notebooks remain as they are, until those subscribers delete them. Once a publication is cleared from the active notebook, the user can establish a new publication at any time. To clear the publication from the notebook, the user selects Clear from the Publication dialog box 540.

3. Mailing notebooks and pages

The user may "mail" a notebook, sending the entire notebook and all of its properties. Recipients receive all data values, cell formats, formulas, graphs, graphics, and the like. Mailing a notebook is useful when one wants to distribute a model or template, such as a form that should be filled out a certain way, to a number of users. The user can also mail selected pages from a notebook. This is done when one wants to send a set of data or a report to a group of users once, but does not need to update them later. As with publishing, mailing pages sends the data values and cell formats from the original notebook pages (but in a preferred embodiment does not send formulas, graphs, or graphics). Recipients can copy mailed data, referred to at end formulas, and redistribute it. Preferably, however, they cannot change it and save the changes, because mailed pages are read-only pages "owned" by the sender.

Figure 5E:
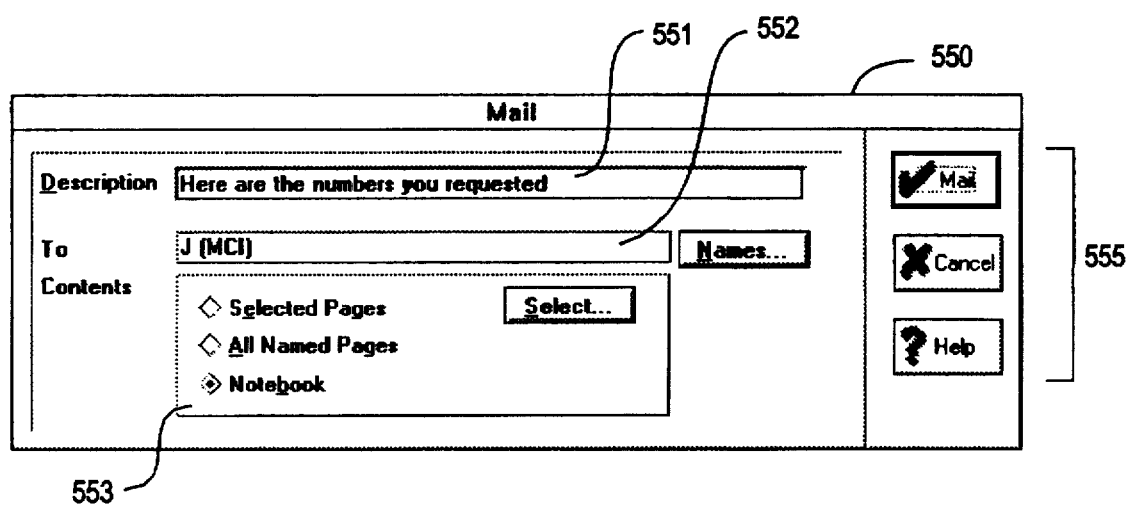
FIG. 5E is a bitmap screenshot illustrating a dialog for "mailing" a data object.

Referring now to FIG. 5E, an interface and method for mailing data objects will now be illustrated. Upon the user selecting the Mail button 361 (of FIG. 3C), the system displays Mail dialog 550, as shown in FIG. 5E. In Description edit field 551, the user enters a description of the notebook or sets of pages. In To edit field 552, the user creates a mailing list (in the same manner as was done for creating the above-described subscriber list). The user selects contents from Contents field 553, in the same manner as was done above. Upon completion of data entry, the user selects Mail (from buttons 555); the process may be cancelled if desired. Upon receiving the instruction to mail a data object, the Object Exchange holds the notebooks or pages desired to be sent in its outgoing queue until the next time it polls the messaging services.

When a user publishes, issues versions, or mails data objects, the system submits the published or mailed objects to the Object Exchange, for holding them in its outgoing queues. When the Object Exchange polls an account, it transmits all the objects—notebooks, sets of pages, or individual pages—that the user has sent to that account, and picks up all the objects that the user has received to that account since the Object Exchange last polled it. The Object Exchange holds incoming objects in the user's Object Store, ready for use. Thus the Object Store holds copies of share data objects and, thus, behaves like a database of the shared objects sent to the user. The Object Store makes all of the user's shared objects continuously available for use in any notebook, whether or not the user is currently connected to messaging services. In a preferred embodiment, shared objects remain in the Object Exchange until deleted.

F. Using shared pages and notebooks

Pages published and mailed to a user as a set are grouped together under one description. To use mailed pages or subscribe to published pages, the user inserts them into a notebook of his or her choice. In this manner, the user can insert mailed and published pages from a variety of sources into a single notebook, limited only by the number of available blank pages. The user can insert the set of pages into a notebook, or can insert selected pages from the set. The user can also insert the same page or set of pages simultaneously into many notebooks.

When a user inserts published pages, he or she becomes a subscriber. Subscribing establishes remote, dynamic links with the publisher's notebook. When the publisher issues new versions of the published pages, the user's Object Exchange automatically receives them and responds accordingly to the update method specified by the user (i.e., automatic or manual updating).

Automatic updating automatically inserts new versions of published pages into the user's notebooks when his or her Object Exchange receives them. Manual updating, on the other hand, inserts new versions only when the user requests an update.

The version depth (set by the publisher in a preferred embodiment) determines how many versions of a set of published pages the Object Exchange can store at any one time. If the publisher sets the version depth to 12, the object store of the subscriber holds the 12 most recent versions that the publisher has issued. The subscriber can use any available version of a publication at any time.

Unlike published pages, mailed pages are single-issue only. The user inserts mailed and published pages into his or her notebooks in the same way, but mailed pages cannot be updated. Mailed pages are useful when a workgroup member wants to send a set of data or a report once, but does not need to issue new versions of it later.

Figure 6A:
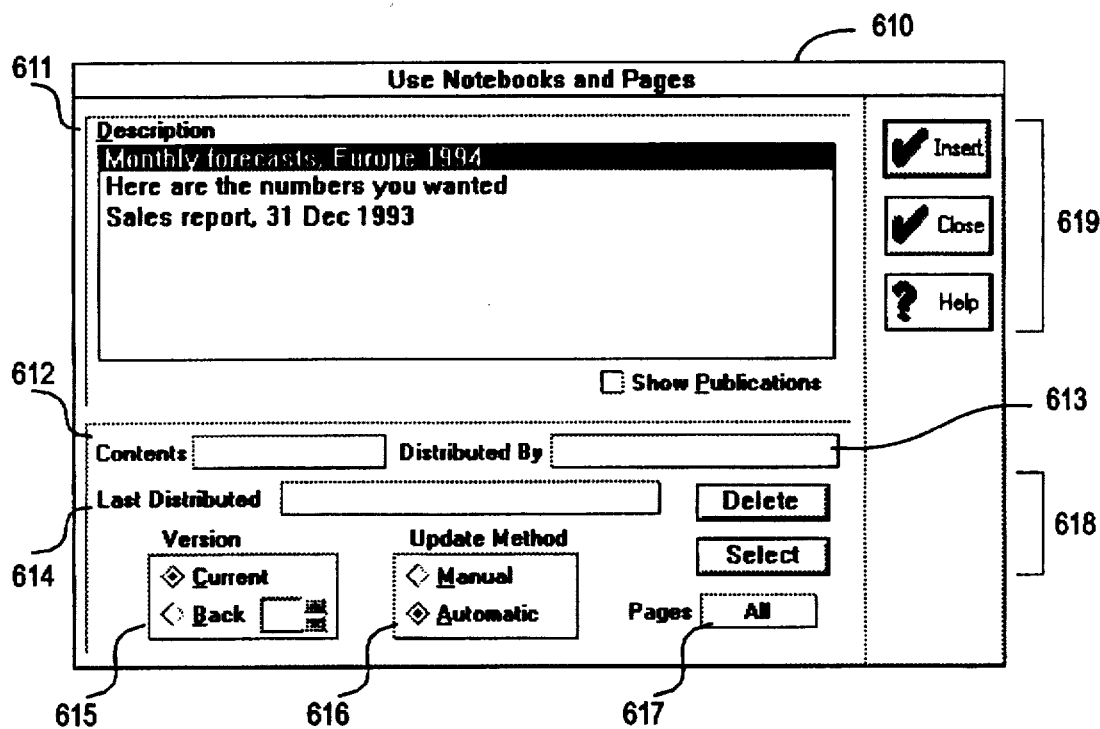
FIG. 6A is a bitmap screenshot illustrating an exemplary interface for using data objects (e.g., notebooks and pages) which a user has received (in his or her role as a subscriber).

Referring now to FIG. 6A, a preferred interface and method for using published or mailed objects will now be illustrated. Initially, the user selects the Workgroup Use button 363 (from FIG. 3C). In response, the system displays Use Notebooks and Pages dialog box 610. The dialog 610 includes a Description list 611 describing all objects —pages, sets of pages, and notebooks—currently stored in the user's Object Exchange. As the user scrolls through the list, the bottom part of the dialog changes to show information on the selected object. The Contents field 612 shows the selected object's type (e.g., mailed pages, published pages, mailed notebook, or the like). Distributed By field 613 includes the address of the user who mailed or published the selected object. If the selected object is one of the user's own publication, "OBEX" (for Object Exchange) appears here. Last Distributed field 614 displays the data and time the last version of the selected object was published, or when it was mailed. For published pages having more than one version (i.e., the publisher has specified a version depth greater than 1), the user can select a particular version to insert through Version box 615. Update Method box 616, on the other hand, allows the user to select an update method (manual or automatic). Pages field 617 allows the user to select only some of the pages into the notebook. By default, all of the pages in a selected set are inserted into the notebook. The user selects or deletes objects using the buttons 618. Selected pages are inserted into the active notebook, using the first available empty, unnamed pages.

Figure 6B:
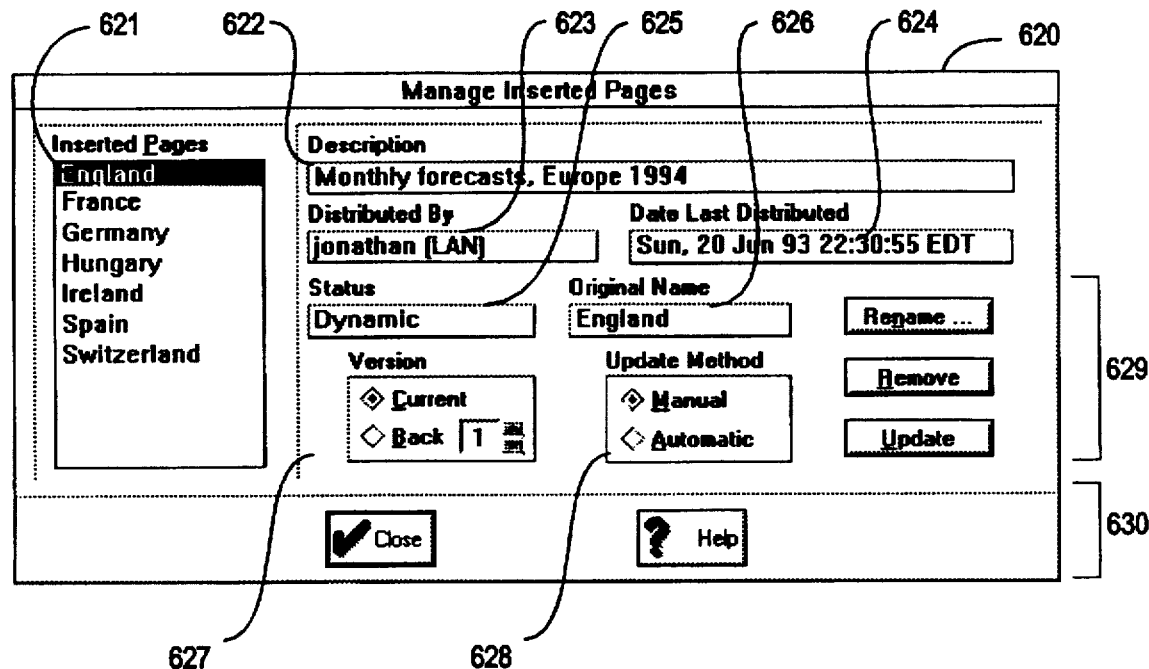
FIG. 6B is a bitmap screenshot illustrating insertion of a data object (e.g., page) into one's current data (e.g., spreadsheet notebook).
Figure 7:
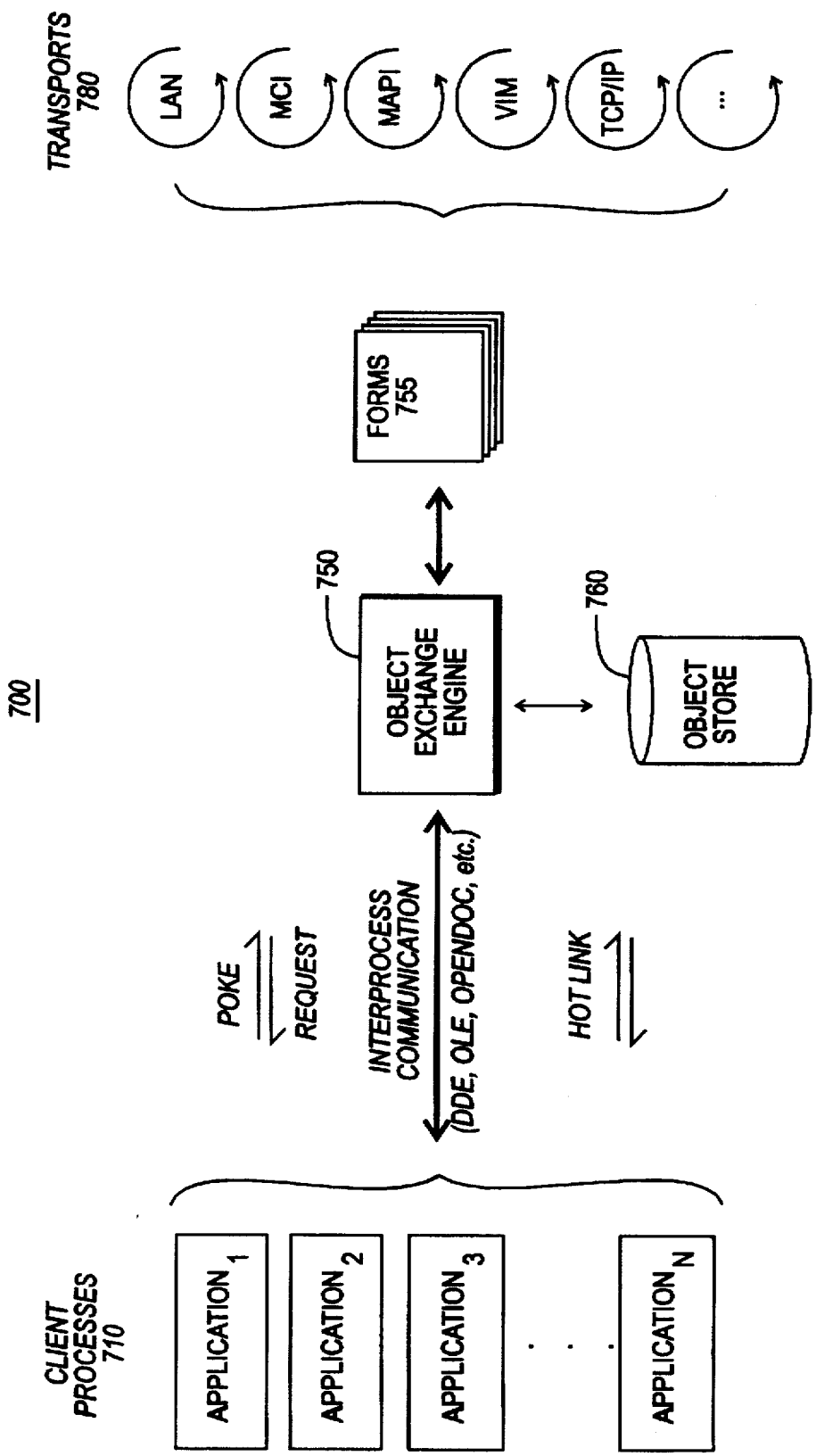
FIG. 7 is a block diagram illustrating an Object Exchange Engine of the present invention, and its relation to client processes (applications) and messaging services (transports).

Referring now to FIG. 6B, a preferred interface and method for managing inserted pages will now be described. After the user has opened the notebook that contains the inserted pages, he or she selects the Manage Pages button 364 (from FIG. 3C). In response, the system displays Manage Inserted Pages dialog box 620. The dialog box 620 lists in Inserted Pages box 620, although the mailed and published page is inserted in the active notebook. As the user scrolls through the list, the right side of the dialog box changes to show information about each selected page. Description field 622 shows a description of the object the page came from. Distributed By field 623 shows the address of the person who mailed or published the page. Date Last Distributed field 624 shows the date the last version of the page was mailed or published. Status field 625 shows the update status of the selected page: "Dynamic" means the selected page uses automatic updating; "Current" means the selected page uses manual updating, with the latest version being inserted into the notebook; and "Out of date" means the selected page uses manual updating, and the latest version has not yet been inserted into the notebook. Original Name field 626 keeps track of the original name of the selected page. Version box 627 shows the version of the in selected page. By default, Current is the most recent version. To insert a previous version, the user selects Back. To enter the change, the user selects Update from buttons 629.

Update Method box 628 shows whether the selected page is set to automatic or manual updating. This may be changed by the user as desired. To rename an inserted page, the user selects Rename from buttons 629. Likewise, to remove an inserted page, the user selects Remove from buttons 629. The user concludes the dialog by selecting Close from buttons 630.

Internal Operation

A. Introduction

The Object Exchange lets users share information (objects) between different applications and different users of the same application. As previously described, a user can share notebooks, notebook pages, or sets of notebook pages from a spreadsheet. As another example, in a database environment users can share tables, query results, folders, and the like. The Object Exchange is preferably implemented not as an application in itself, but as a middle link between applications and the outside world. In other words, it interacts with the operating system and messaging services to provide workgroup and communication services to applications. The Object Exchange maintains a store of shared objects on a user's local computer, which makes shared data continuously available to the user without requiring that user to be continuously connected to a communications network. This object store lets a user use shared pages and notebooks even if a local area network is inaccessible.

Workgroup applications use a publish and subscribe model for describing ongoing data-sharing relationships. Publishing means making a data object available to other workgroup members. Subscribing means using that published data object remotely in another application or in another file of the same application. The Object Exchange is the agent that enables users to establish and manage ongoing publication relationships among workgroup members and applications. Sending an object to other workgroup members one time only—in other words, without establishing ongoing sharing relationships—is sometimes called mailing. Any workgroup member can establish a publication by defining a distribution list from a list of addressees connected to that user by any available communication service. When a recipient of a publication subscribes to the publication, the published data appears in the subscriber's application exactly as it appears in the publisher's application. Publishers can make changes to the source data and issue new versions of it to subscribers. When a publisher issues a new version, it is sent out over the appropriate messaging services and automatically stored in each subscriber's Object Exchange. Once an object is stored in the Object Exchange, that object is available to any file in any application that interacts with the Object Exchange.

The Object Exchange also supports version depth for publications. The version depth determines how many versions of a publication the Object Exchange holds for subscribers at any given time. Through dynamic links with objects stored in the Object Exchange, subscriber applications can support both manual and automatic updating. With automatic updating, changes to the original data that publishers make and issue appear automatically in the subscriber application. With manual updating, those changes appear in the subscriber application only when the subscriber requests them.

B. Object Management

1. Objects

The Object Exchange stores information as objects. These objects have properties: System properties and User-defined properties. System properties are defined and assigned by the Object Exchange. User-defined properties, on the other hand, are created by the application. The user or application is responsible for assigning and interpreting these properties.

The Object Exchange supports simple structured property definition, for example name: Simon address: Santa Cruz telephone: 12345

The Object Exchange also supports typed properties. Any Windows clipboard data can be passed to the Object Exchange as a typed property, for example Type of my_picture: bitmap picture: clipboard Type of my_file: file my_file: <my path to the file>

When an object is created, the Object Exchange assigns it a unique ID. In addition, the user or application can add a key, which is just an alias for the object. Either the ID or the key can be used to access the object.

2. Areas

The Object Exchange areas provide a way to classify objects with "areas." An Object Exchange area typically does not correspond to a physical area or directory on disk; it is instead a way to group objects. However, one may think of objects as being stored in areas. For example, the Object Exchange stores publications, in a Publications area, suscriptions in a Subscriptions area, alerts in an Alerts area, and the like. Objects can be put into areas at object storage time, they can be forced into a different area on the subscriber side, and the subscriber can also have "filters" on the areas which decide whether an object will get automatically filed in that area.

3. Addresses

Objects are addressed to recipients. An address is a unique communication or system address for publishing or mailing objects to other members of a workgroup. In a preferred address format (i.e., one employed by the preferred embodiment), addresses are not case-sensitive and are followed with the messaging service name, enclosed in parentheses, as shown below.

LAN

Syntax: mailbox(LAN)

Description: mailbox=LAN mailbox

Example: SKing(LAN)

MHS

Syntax: user@workgroup(MHS)

Description: user=MHS user workgroup=MHS workgroup

Example: JHass@Tech(MHS)

MCI

Syntax: name/MCI ID: number(MCI)

Description: name=MCI username number=MCI account number

Example: Aphra Behn/MCI ID: 123-4567(MCI)

MAPI

Syntax: username(MAPI)

Description: username=MAPI services username for Workgroups alias or short name

Example: Simon King(MAPI)

MHS to MCI Via Gateway

Syntax: user@mcimail(MHS)

Description: user=MHS username mcimail=MHS name for MCI

Example: JHaas@mcimail(MHS)
NGM
 Syntax: user@workgroup(MHS)
 Description: user=NGM username workgroup=NGM workgroup hierarchy
 Example: JHaas@Tech.Admin.Holt(MHS)
cc:Mail
 Syntax: username(CCMAIL)
 Description: username=cc:Mail user name
 Example: foxglove(CCMAIL)
WordPerfect Office
 Syntax: username(WPO)
 Description: username=network user name
 Example: SKing(WPO)
Lotus Notes
 Syntax: userID/domain(NOTES)
 Description: userID=Notes user ID domain=Notes domain
 Example: SKing/Borland(NOTES)
Multiline Addresses
 To enter multiline addresses, separate each line of the address with a vertical bar character (|). For example, to send mail from MCI Mail to MHS:
 JDixon|ems:fortune|mbx:Jdixon.obex@fortune(mci)

4. Transports (Messaging Services)

Transports or messaging services are the means by which a user's computer communicates with the outside world. Messaging services are employed to send and receive electronic mail, and to establish workgroup relationships with remote users. The Object Exchange lets the user use multiple messaging services simultaneously, and automatically manages the connections to them. The user can use the Object Exchange to configure one or more messaging accounts for each installed messaging service. In a preferred embodiment, the following messaging services are supported:

(1) MCI: MCI Mail, a global electronic mail service.
(2) MHS: Novell's NetWare Message Handling Service (MHS), or its upgrade, NetWare Global Messaging (NGM), mail systems for local area networks.
(3) LAN: Local area networks such as Novell NetWare, Banyan 5.0, Microsoft LAN Manager 2.1, AT&T StarGroup 3.5.1, IBM LAN Server 2.0, and 3Com 3+ and 3Com 3+ Open, or the like.
(4) MAPI: Microsoft's Mail Application Programming Interface, such as in Windows for Workgroups, as well as with other MAPI-compliant messaging services such as Microsoft Mail.
(5) ccMAIL: Lotus cc:Mail, an electronic mail program. The Object Exchange also supports other VIM-compliant messaging services, such as Lotus Notes. VIM is Vendor Independent Messaging, a messaging protocol supported by many major software vendors.
(6) WPO: WordPerfect Office, a popular electronic mail program.

Specifications describing the protocol of the above messaging services are available from the respective vendors.

5. Accounts

The Object Exchange interacts with the various messaging services through one or more "accounts." Each Object Exchange account corresponds to a messaging service account or LAN mailbox. The user can create as many Object Exchange accounts as needed for each messaging service. When configuring Object Exchange accounts, the user supplies them with the information they need to connect with his or her messaging service accounts or mailboxes. The Object Exchange in turn polls, or contacts, messaging services to transmit outgoing objects and to pick up incoming objects. As previously described, the user can set an automatic polling frequency for each messaging account, and tell it how often and between what hours to poll.

C. Object Exchange API

Construction and operation of the Object Exchange is perhaps best described by examining its functionality, which is serviced through an OBEX™ API (Application Programming Interface). The API may be divided into the following functional groupings:

Account: Functions for managing OBEX accounts and transports
Address Book: Functions for managing address books and groups in an address book
Area: Functions for requesting properties and contents of a specified OBEX area
AreasInfo: Functions for requesting information about all OBEX areas
Declaration: Functions for creating and configuring declarations
Entry: Functions for managing the entries in an address book group and the addresses the entry contains
Mail: Functions for creating and managing mail objects
OBEX: Functions for managing and connecting with OBEX
Object: Functions for creating and managing objects
Publish/Subscriber: Functions for managing subscriber lists and publication forms Each of these will be examined in turn.

1. Account

Account functions, which are provided for creating, configuring, and managing accounts, include the following:

| | |
|---|---|
| ObxAccountGetName: | gets the name of an account. |
| ObxAccountGetPollFrequencyHours | gets the hours in an account's poll frequency. |
| ObxAccountGetPollFrequencyMinutes: | gets the minutes in an account's poll frequency. |
| ObxAccountGetPollFrequencySeconds: | gets the seconds in an account's poll frequency. |
| ObxAccountGetPollFromHours: | gets the hour of the time an account starts polling automatically. |
| ObxAccountGetPollFromMinutes: | gets the minute of the time an account starts polling automatically. |
| ObxAccountGetPollFromSeconds: | gets the second of the time an account starts polling automatically. |
| ObxAccountGetPollToHours: | gets the hour of the time an account stops polling automatically. |
| ObxAccountGetPollToMinutes: | gets the minute of the time an account stops polling automatically. |
| ObxAccountGetPollToSeconds: | gets the second of the time an account stops polling automatically. |
| ObxAccountGetTransportName: | gets the name of the transport (e.g., LAN, MCI, cc:MAIL) associated with an account. |
| ObxAccountGetTransportParam: | gets a parameter setting of an account. |
| ObxAccountSetActive: | enables or disables an account. |
| ObxAccountSetAllDay: | specifies whether an account polls automatically all day. |
| ObxAccountSetAutomatic: | specifies whether an account polls automatically or only when initiated by the OBEX user. |
| ObxAccountSetManual: | specifies whether an account |

| | |
|---|---|
| | polls automatically or only when initiated by the OBEX user. |
| ObxAccountSetPartDay: | specifies whether an account polls automatically only part of the day. |
| ObxAccountSetPollFrequency: | specifies how frequently an account polls automatically. |
| ObxAccountSetPollFrom: | sets the time an account starts polling automatically. |
| ObxAccountSetPollTo: | sets the time an account stops polling automatically. |
| ObxAccountSetPrimary: | specifies whether the account is the primary account. |
| ObxAccountSetTransportParam: | sets a parameter setting of an account. |
| ObxAddAccountToPollQueue: | adds an account to the list of accounts to poll. |
| ObxCancelPoll: | cancels all active polling. |
| ObxGetAccount: | gets a handle to reference an account. |
| ObxGetAccountBeingPolled: | gets the name of the account being polled. |
| ObxGetAccountByName: | gets a handle to reference an account being polled using the account name. |
| ObxGetBlankAccount: | allocates room for a new OBEX account. |
| ObxGetCountOfAccounts: | gets the number of accounts that exist in OBEX. |
| ObxRemoveAccountFromPollQueue: | removes an account from the list of accounts to poll. |
| ObxUpdateAccount: | saves the changes made to an account. |

Each of these will be described in further detail.

```
ObxAccountGetName
const char * _export _pascal ObxAccountGetName (hAccount);
    ADDRESS    hAccount  /* Handle to an OBEX account */
```

The ObxAccountGetName function returns a string containing the name of the account referenced by hAccount. This function returns NULL if it fails.

```
ObxAccountGetPollFrequencyHours
int _export _pascal ObxAccountGetPollFrequencyHours (hAccount);
    ADDRESS    hAccount  /* Handle to an OBEX account */
```

The ObxAccountGetPollFrequencyHours function returns an integer from 0 to 23 representing the number of hours in the polling frequency of the account referenced by hAccount. For example, if the account polls every five hours and twenty minutes, this function returns 5. This function returns −1 if it fails.

```
ObxAccountGetPollFrequencyMinutes
int _export _pascal ObxAccountGetPollFrequencyMinutes (hAccount);
    ADDRESS    hAccount  /* Handle to an OBEX account */
```

The ObxAccountGetPollFrequencyMinutes function returns an integer from 0 to 59 representing the number of minutes in the polling frequency of the account referenced by hAccount. For example, if the account polls every five hours and twenty minutes, this function returns 20. This function returns −1 if it fails.

```
ObxAccountGetPollFrequencySeconds
int _export _pascal ObxAccountGetPollFrequencySeconds (hAccount);
    ADDRESS    hAccount  /* Handle to an OBEX account */
```

The ObxAccountGetPollFrequencySeconds function returns an integer from 0 to 59 representing the number of seconds in the polling frequency of the account referenced by hAccount. For example, if the account polls every minute and a half, this function returns 30. This function returns −1 if it fails.

```
ObxAccountGetPollFromHours
int _export _pascal ObxAccountGetPollFromHours (hAccount);
    ADDRESS    hAccount  /* Handle to an OBEX account */
```

The ObxAccountGetPollFromHours function returns an integer from 0 to 23 representing the hour of the time to start polling the account referenced by hAccount automatically. For example, if the account starts polling at 2:15 PM, this function returns 14. This function returns −1 if it fails.

```
ObxAccountGetPollToMinutes
int _export _pascal ObxAccountGetPollToMinutes (hAccount);
    ADDRESS    hAccount  /* Handle to an OBEX account */
```

The ObxAccountGetPollToMinutes function returns an integer from 0 to 59 representing the minute of the time to stop polling the account referenced by hAccount automatically. For example, if the account stops polling at 2:15 PM, this function returns 15. This function returns −1 if it fails.

```
ObxAccountGetPollToSeconds
int _export _pascal ObxAccountGetPollToSeconds (hAccount);
    ADDRESS    hAccount  /* Handle to an OBEX account */
```

The ObxAccountGetPollToSeconds function returns an integer from 0 to 23 representing the second of the time to stop polling the account referenced by hAccount automatically. For example, if the account stops polling at 2:15:45 PM, this function returns 45. This function returns −1 if it fails.

```
ObxAccountGetTransportName
const char * _export _pascal ObxAccountGetTransportName (hAccount);
    ADDRESS    hAccount  /* Handle to an OBEX account */
```

The ObxAccountGetTransportName function returns the name of the messaging service used by the account hAccount. This function returns NULL if it fails.

```
ObxAccountGetTransportParam
const char * _export _pascal ObxAccountGetTransportParam (hAccount,
szParameter);
    ADDRESS    hAccount    /* Handle to an OBEX account */
    const char *  szParameter /* Name of the parameter to retrieve */
```

The ObxAccountGetTransportParam function returns the setting of the parameter szParameter in the account referenced by hAccount. This function returns NULL if it fails.

```
ObxAccountSetActive
void _export _pascal ObxAccountSetActive(hAccount, nYesorNo);
    ACCOUNT   hAccount   /* Handle to an OBEX account */
    int       hYesorNo   /* 1 to activate account, 0 to deactivate
it */
```

The ObxAccountSetActive function specifies whether the account referenced by hAccount is active or inactive. Inactive accounts cannot be polled.

```
ObxAccountSetAllDay
void _export _pascal ObxAccountSetAllDay(hAccount);
    ACCOUNT   hAccount   /* Handle to an OBEX account */
```

The ObxAccountSetAllDay function specifies that the account referenced by hAccount is polled automatically all day. ObxAccountSetPollFrequency can be used to specify how frequently the account is polled. ObxAccountSetPartDay may be used to specify that the automatic polling occurs only part of the day.

```
ObxAccountSetAutomatic
void _export _pascal ObxAccountSetAutomatic(hAccount);
    ACCOUNT   hAccount   /* Handle to an OBEX account */
```

The ObxAccountSetAutomatic function specifies that the account referenced by hAccount is polled automatically at a frequency specified by ObxAccountSetPollFrequency. ObxAccountSetPartDay may be used to specify that the automatic polling occurs only part of the day. ObxAccountSetAllDay may be used to specify that the automatic polling occurs all day.

```
ObxAccountSetManual
void _export _pascal ObxAccountSetManual(hAccount);
    ACCOUNT   hAccount   /* Handle to an OBEX account */
```

The ObxAccountSetManual function specifies that the account referenced by hAccount is only polled manually. One can use ObxAccountSetAutomatic to specify that an account is polled automatically.

```
ObxAccountSetPartDay
void _export _pascal ObxAccountSetPartDay(hAccount);
    ACCOUNT   hAccount   /* Handle to an OBEX account */
```

The ObxAccountSetPartDay function specifies that the account referenced by hAccount is polled automatically only at a certain part of the day at a frequency specified by ObxAccountSetPollFrequency. ObxAccountSetPollFrom specifies when the account starts polling automatically; ObxAccountSetPollTo specifies when to stop. ObxAccountSetAllDay specifies that the automatic polling occurs all day.

```
ObxAccountSetPollFrequency
void _export _pascal ObxAccountSetPollFrequency(hAccount, nHours,
nMinutes, nSeconds);
    ACCOUNT   hAccount   /* Handle to an OBEX account */
    int       nHours     /* Number from 0 to 23 indicating the
                            number of hours in the polling frequency
                            */
    int       nMinutes   /* Number from 0 to 59 indicating the
                            number of minutes in the polling frequency
                            */
    int       nSeconds   /* Number from 0 to 59 indicating the
                            number of minutes in the polling frequency
                            */
```

The ObxAccountSetPollFrequency function specifies how frequently the account referenced by hAccount is automatically polled (ObxAccountSetAutomatic specifies that an account is polled automatically). nHours, nMinutes, and nSeconds specify the frequency. For example, ObxAccountSetPollFrequency(mciAcct, 1,30,0)

specifies that the account polls every hour and a half, and

ObxAccountSetPollFrequency(lanAcct, 0,0,30)

polls the account every thirty seconds.

```
ObxAccountSetPollFrom
void _export _pascal ObxAccountSetPollFrom(hAccount, nHours,
nMinutes, nSeconds) ;
    ACCOUNT   hAccount   /* Handle to an OBEX account */
    int       nHours     /* Number from 0 to 23 indicating the
                            starting hour to poll */
    int       nMinutes   /* Number from 0 to 59 indicating the
                            starting minute to poll */
    int       nSeconds   /* Number from 0 to 59 indicating the
                            starting second to poll */
```

The ObxAccountSetPollFrom function specifies the the time that the account referenced by hAccount should start polling automatically (ObxAccountSetAutomatic specifies that an account is polled automatically). nHours, nMinutes, and nSeconds specify the time to begin. For example, ObxAccountSetPollFrom(lanAcct,3,0,0)

specifies that automatic polling begins at 3:00 AM.

```
ObxAccountSetPollTo
void _export _pascal ObxAccountSetPollTo(hAccount, nHours,
nMinutes, nSeconds);
    ACCOUNT   hAccount   /* Handle to an OBEX account */
    int       nHours     /* Number from 0 to 23 indicating the hour
                            to stop polling */
    int       nMinutes   /* Number from 0 to 59 indicating the
                            minute to stop polling */
    int       nSeconds   /* Number from 0 to 59 indicating the
                            second to stop polling */
```

The ObxAccountSetPollTo function specifies the the time that the account referenced by hAccount should stop polling (ObxAccountSetAutomatic specifies that an account is polled automatically). nHours, nMinutes, and nSeconds specify the time to end. For example, ObxAccountSetPollFrom (lanAcct, 8,0,0)

specifies that automatic polling ends at 8:00 AM.

```
ObxAccountSetPrimary
void _export _pascal ObxAccountSetAutomatic(hAccount, nYesorNo);
    ACCOUNT   hAccount   /* Handle to an OBEX account */
    int       nYesorNo   /* 1 to make this the primary account */
```

The ObxAccountSetPrimary function specifies that the account referenced by hAccount is the primary account.

```
ObxAccountSetTransportParam
BOOL _export _pascal ObxAccountSetTransportParam(hAccount,
```

-continued

```
szParameter, szSetting);
    ADDRESS    hAccount       /* Handle to an OBEX account */
    const char *  szParameter  /* Name of the parameter to retrieve
*/
    const char *  szSetting    /* New parameter setting */
```

The ObxAccountSetTransportParam function updates the parameter szParameter in the account referenced by hAccount. szSetting specifies the new setting. The following table lists each valid setting for szParameter and szSetting:

| szParameter | Set szSetting to |
|---|---|
| Account Name | account name (LAN, MCI2, and so on) |
| Username | username used to connect to the messaging service. |
| Password | password used to connect to the message service. |
| Modem | modem type used for dial-in messaging services such as MCI. |
| Phone # | phone number dialed to connect to the messaging service. |
| Prefix | number to dial before dialing the phone. |
| Dialing | Tone or Pulse to specify dialing method. |
| Port | name of the COM (serial) port the modem is connected to (COM2, COM3, and so on). |
| Data | length of the data (in bits) transmitted by the modem. |
| Baud | baud rate (bits per second) of the transmission. |
| Stop | stop code of the transmission in bits. |
| Parity | parity rate of the transmission. |
| Script | string representing a connection script used to connect to a messaging service. |
| Allow 8-bit transfers | 1 to allow 8-bit transfers, 0 otherwise. |
| Workgroup | name of the workgroup used by an MHS account. |
| Mailbox Name | name of the mailbox directory used by a LAN account. |
| Post Office Path | name of the post office directory used by all accounts. |

This function returns 1 if it succeeds or 0 if it fails.

```
ObxAddAccountToPollQueue
BOOL _export _pascal ObxAddAccountToPollQueue(szAcctName);
    const char * szAcctName   /* String containing the name of the
                                 account to poll */
```

The ObxAddAccountToPollQueue function adds an account to the list of accounts to poll. The string szAcctName specifies the name of the account. ObxGetAccountByName is used to get account names. This function returns 1 if it succeeds or 0 if it fails.

```
ObxCancelPoll
BOOL _export _pascal ObxCancelPoll( );
```

The ObxCancelPoll function cancels any polling that is occurring in OBEX. This function returns 1 if it succeeds or 0 if it fails.

```
ObxGetAccount
ACCOUNT _export _pascal ObxGetAccount (nIndex);
    int    nIndex  /* Index of the account to retrieve */
```

The ObxGetAccount function returns a handle to an account. nIndex is an integer indicating the placement of the account in the list of accounts. For example, nIndex may be set to 1 to get the first area, 2 for the second, and so on. With the account handle the account's configuration may be changed. This function returns NULL if it fails.

```
ObxGetAccountBeingPolled
int _export _pascal ObxGetAccountBeingPolled(szAccountName,
nIndex);
    char * szAccountName  /* String containing the account being
                             polled */
    int    nIndex         /* Index into a account list
                             */
```

The ObxGetAccountBeingPolled function stores the name of the account being polled in the string szAccountName and the index number of the account in the integer nIndex. If an account is not being polled, this function returns 0. Otherwise, it returns 1. This function returns −1 if it fails.

```
ObxGetAccountByName
ACCOUNT _export _pascal ObxGetAccountByName(szAccountName);
    const char * szAccountName  /* Name of the account to retrieve
*/
```

The ObxGetAccountByName function returns a handle to the account whose name is stored in the string szAccountName. With the account handle the account's configuration may be changed. This function returns NULL if it fails.

```
ObxGetBlankAccount
ACCOUNT _export _pascal ObxGetBlankAccount(szAccountName,
szTransport);
    const char * szAccountName  /* Name of the account to create */
    const char * szTransport    /* Name of transport used by the
                                   account */
```

The ObxGetBlankAccount function allocates room for a new OBEX account and returns a handle to it. The string szAccountName specifies the new account name. The messaging service used by the new account is specified by setting the string szTransport to one of the following:

| String | Messaging service |
|---|---|
| MCI | MCI Mail |
| MHS | Novell's NetWare Message Handling Service (MHS), version 1.5, or its upgrade, NetWare Global Messaging (NGM) |
| LAN | Local area networks such as Novell NetWare, Banyan 5.0, Microsoft LAN Manager 2.1, AT&T StarGroup 3.5.1, IBM LAN Server 2.0, and 3Com 3+ and 3Com 3+ Open. |
| MAPI | Microsoft's Mail Application Programming Interface. |
| ccMAIL | Lotus cc:Mail and other VIM-compliant messaging services. VIM is Vendor Independent Messaging. |
| WPO | WordPerfect Office, version 4.0a or later. |
| NOTES | Lotus Notes, version 3.0 or later. |

This function returns NULL if it fails.

```
ObxGetCountOfAccounts
int _export _pascal ObxGetCountOfAccounts ( );
```

The ObxGetCountOfAccounts function returns an integer representing the number of accounts OBEX contains. This function returns −1 if it fails.

```
ObxRemoveAccountFromPollQueue
BOOL _export _pascal ObxRemoveAccountFromPollQueue
(szAcctName);
    const char * szAcctName    /* String containing the name of the
                                  account to remove */
```

The ObxRemoveAccountFromPollQueue function removes an account from the list of accounts to poll. The string szAcctName specifies the name of the account to remove. This function returns 1 if it succeeds or 0 if it fails.

```
ObxUpdateAccount
BOOL _export _pascal ObxUpdateAccount(hAccount);
    ACCOUNT   hAccount    /* Handle to an OBEX account */
```

The ObxUpdateAccount function updates the account referenced by hAccount. Changes made to an account using function calls (polling frequency, parameter settings, and so on) are not saved until this function is called. This function returns 1 if it succeeds or 0 if it fails.

2. Address Book

Address Book functions, which are for opening and closing address books and managing groups in an address book, include the following:

```
ObxCloseAddressBook
    int _export _pascal ObxCloseAddressBook( );
        AB hAddressBook    /* Handle to an address book */
```

The ObxCloseAddressBook function closes the address book referenced by hAddressBook. This function returns −1 if it fails.

```
ObxOpenAddressBook
AB _export _pascal ObxCloseAddressBook(szBookName);
    const char * szBookName    /* Name of the address book to open
                                  */
```

The ObxCloseAddressBook function returns a handle to an address book. The string szBookName specifies the name of the address book to open. The address book handle may be used to add, view, and remove groups. This function returns NULL if it fails.

```
ObxABAddGroup
GROUP _export _pascal ObxABAddGroup(hAddressBook,
szGroupName);
    AB hAddressBook          /* Handle to an address book */
    const char * szGroupName /* Name of the new group */
```

The ObxABAddGroup function allocates room for a new group in the address book referenced by hAddressBook (ObxOpenAddressBook is used to get hAddressBook) and returns a handle to it. The string szGroupName specifies the name of the new address book. If the group already exists or the group name is invalid, this function returns an error code. This function returns NULL if it fails.

```
ObxABGetCountOfGroups
    int _export _pascal ObxABGetCountOfGroups(hAddressBook);
        AB hAddressBook    /* Handle to an address book */
```

The ObxABGetCountOfGroups function returns an integer representing the number of groups available in the address book referenced by hAddressBook. This function returns −1 if it fails.

```
ObxABGetGroup
GROUP _export _pascal ObxABGetGroup(hAddressBook, nIndex);
    AB hAddressBook    /* Handle to an address book */
    int nIndex         /* Index number of the group to get */
```

The ObxABGetGroup function returns a handle to a group in the address book referenced by hAddressBook. nIndex is an integer indicating the placement of the group in the list of groups. For example, nIndex may be set to 1 to get the first group, 2 for the second, and so on. Group entries may be viewed, added, removed, or updated with the group handle. ObxGetAccountByName may be used to get a group handle using its name. This function returns NULL if it fails.

```
ObxABGetGroupByName
GROUP _export _pascal ObxABGetGroupByName(hAddressBook, szGroupName);
    AB AddressBook           /* Handle to an address book */
    const char * szGroupName /* Name of the group */
```

The ObxABGetGroupByName function returns a handle to a group in the address book referenced by hAddressBook. The string szGroupName specifies the name of the group to find. With the group handle group entries may be viewed, added, removed, or updated. This function returns NULL if it fails.

```
ObxABRemoveGroup
BOOL _export _pascal ObxABRemoveGroup(hAddressBook,
szGroupName);
    AB hAddressBook          /* Handle to an address book */
    const char * szGroupName /* Name of the group to remove */
```

The ObxABRemoveGroup function removes the group szGroupName from the address book referenced by hAddressBook. If the deletion is successful the function returns 1. Otherwise it returns 0. This function returns 1 if it succeeds or 0 if it fails.

3. Area

The Area functions are used for requesting properties and contents of a specific OBEX area. They include:

```
ObxAreaGetDescription
const char * _export _pascal ObxAreaGetDescription(hArea);
    AREA hArea    /* Handle to an AREA */
```

The ObxAreaGetDescription function returns a string containing a description of the OBEX area referenced by hArea. ObxGetAreaByName or ObxGetAreaIndex assigns a value to hArea before calling this function. Every predefined OBEX area has a default description; when an area is created, the description is optional. If a description was not stored with the area, this function returns "No Description Available". This function returns NULL if it fails.

```
ObxAreaGetName
const char * _export _pascal ObxAreaGetName(hArea);
    AREA hArea    /* Handle to an AREA    */
```

The ObxAreaGetName function returns a string containing the name of the area referenced by hArea. ObxGetAreaByName or ObxGetAreaIndex assigns a value to hArea before calling this function. This function returns NULL if it fails.

```
ObxAreaGetTOC
AREATOC _export _pascal ObxAreaGetTOC(hArea);
    AREA hArea    /* Handle to an AREA    */
```

The ObxAreaGetTOC function returns a handle to the table of contents (TOC) of the area referenced by hArea. ObxGetAreaByName or ObxGetAreaIndex assigns a value to hArea before calling this function. The table of contents for a given OBEX area has one row per object, and the first row corresponds to the first object in the area. Within each row, field values are separated by tabs. The TOC has the following fields.

| Field | Description |
|---|---|
| Id | Unique identifier for the object, supplied by OBEX. |
| Key | User-defined identifier. For practical purposes, it should be unique, but OBEX does not require or enforce uniqueness. |
| Description | Text describing the object. |
| Publisher | Publisher's name. It is "obex" for Publications. |
| DateCreated | Date the object was created. |
| DateLastModified | Date of the last version issued. |
| LocalTag | A field for keyword data maintained in the user's object store. This is the only property that is not transmitted with the object. |
| Tag | Application-specific field for keyword data. Unlike LocalTag, this data is transmitted with the object. |
| NumberOfVersions | Number of versions of the object currently in the object store. |

```
ObxAreaTocGetCount
int _export _pascal ObxAreaTocGetCount(hAreaTOC);
    AREATOC hAreaTOC    /* Handle to AREATOC    */
```

The ObxAreaTocGetCount function returns an integer representing the number of OBEX objects in the area TOC referenced by hAreaTOC. ObxAreaGetToc assigns a value to hAreaTOC before calling this function. This function returns −1 if it fails.

```
ObxAreaTocGetDateCreated
long _export _pascal ObxAreaTocGetDateCreated(hAreaTOC,
nRow);
    AREATOC hAreaTOC    /* Handle to AreaTOC    */
    int nRow            /* Row number within the AreaTOC */
```

The ObxAreaTocGetDateCreated function returns a long integer representing the creation date of an object. ObxAreaGetTOC assigns a value to hAreaTOC before calling this function. nRow specifies which object in the TOC is checked (1 for the first, 2 for the second, and so on). If it fails, this function returns an error message. This function returns −1 if it fails.

```
ObxAreaTocGetDateLastModified
long _export _pascal ObxAreaTocGetDateLastModified(hAreaTOC,
nRow);
    AREATOC hAreaTOC    /* Handle to an AreaTOC    */
    int nRow            /* Row number within the AreaTOC */
```

The ObxAreaTocGetDateLastModified function returns a long integer representing the date that an object was last issued. ObxAreaGetTOC assigns a value to hAreaTOC before calling this function. nRow specifies which object in the TOC is checked (1 for the first, 2 for the second, and so on). If it fails, this function returns an error message. This function returns −1 if it fails.

```
ObxAreaTocGetDescription
const char * _export _pascal ObxAreaTocGetDescription(hAreaTOC,
nRow);
    AREATOC hAreaTOC    /* Handle to an AreaTOC    */
    int nRow            /* Row number within the AreaTOC */
```

The ObxAreaTocGetDescription function returns a string containing a description of an object. ObxAreaGetTOC assigns a value to hAreaTOC before calling this function. nRow specifies which object in the TOC is checked (1 for the first, 2 for the second, and so on). If the object has no description, the return value is "Description Not Available". This function returns NULL if it fails.

```
ObxAreaTocGetId
const char * _export _pascal ObxAreaTocGetId(hAreaTOC, nRow);
    AREATOC hAreaTOC    /* Handle to an AreaTOC    */
    int nRow            /* Row number within the AreaTOC */
```

The ObxAreaTocGetId function returns a string containing the object ID of an object. OBEX assigns a unique ID to each object when it is created. An ID is not the same as a key, which can be assigned by a user or an application. ObxAreaGetTOC assigns a value to hAreaTOC before calling this function. nRow specifies which object in the TOC is checked (1 for the first, 2 for the second, and so on). This function returns NULL if it fails.

```
ObxAreaTocGetKey
const char * _export _pascal ObxAreaTocGetKey(hAreaTOC, nRow);
    AREATOC hAreaTOC    /* Handle to an AreaTOC    */
    int nRow            /* Row number within the AreaTOC */
```

The ObxAreaTocGetKey function returns a string containing the object key. An object's key can be assigned by a user or an application. For practical purposes it should be unique, but OBEX does not require uniqueness. A key is not the same as an ID, which is a unique value assigned by OBEX. ObxAreaGetTOC assigns a value to hAreaTOC before calling this function. nRow specifies which object in the TOC is checked (1 for the first, 2 for the second, and so on). This function returns NULL if it fails.

```
ObxAreaTocGetLocalTag
const char * _export _pascal ObxAreaTocGetLocalTag(hAreaTOC,
nRow);
```

```
    AREATOC hAreaTOC       /* Handle to an AreaTOC    */
    int nRow               /* Row number within the AreaTOC  */
```

The ObxAreaTocGetLocalTag function returns a string containing the local tag of an object. A tag is an internal description of an area that OBEX users cannot see when reviewing a list of areas. The tag encodes special instructions for accessing an area or keywords to organize area lists. ObxAreaGetTOC assigns a value to hAreaTOC before calling this function. nRow specifies which object in the TOC is checked (1 for the first, 2 for the second, and so on). This function returns NULL if it fails.

```
ObxAreaTocGetNumberOfVersions
int __export __pascal ObxAreaTocGetNumberOfVersions(hAreaTOC,
nRow);
    AREATOC hAreaTOC       /* Handle to an ObxAreaTOC    */
    int nRow               /* Row number within the ObxAreaTOC */
```

The ObxAreaTocGetNumberOfVersions function returns an integer representing the number of versions of an object currently stored in the object store. ObxAreaGetTOC assigns a value to hAreaTOC before calling this function. nRow specifies which object in the TOC is checked (1 for the first, 2 for the second, and so on). This function returns −1 if it fails.

```
ObxAreaTocGetPublisher
const char * __export __pascal ObxAreaTocGetPublisher(hAreaTOC,
nRow);
    AREATOC hAreaTOC       /* Handle to an AreaTOC    */
    int nRow               /* Row number within the AreaTOC   */
```

The ObxAreaTocGetPublisher function returns a string containing the address of an object's publisher. ObxAreaGetTOC assigns a value to hAreaTOC before calling this function. nRow specifies which object in the TOC is checked (1 for the first, 2 for the second, and so on). If the object is one of the user's publications, this function returns "obex". This function returns NULL if it fails.

```
ObxAreaTocNotifyOnUpdate
NOTE __export __pascal ObxAreaTocNotifyOnUpdate(hAreaTOC, szProc);
    AREATOC hAreaTOC                  /* Handle to an AreaTOC   */
    AREATOCCALLBACKPROC szProc        /* Name of the callback procedure
*/
```

The ObxAreaTocNotifyOnUpdate function lets a user specify a procedure to call when the TOC referenced by hAreaTOC changes. The procedure is called when new objects are inserted into the area, new versions of existing objects are stored in the area, objects are deleted from the area, and any other user action occurs that changes field values in the TOC. ObxAreaGetTOC assigns a value to hAreaTOC before calling this function. This function returns NULL if it fails.

```
ObxCreateArea
AREA __export __pascal ObxCreateArea(szAreaName, szAreaDesc,
szAreaTag);
    const char * szAreaName    /* Name of the new area*/
    const char * szDescription /* Description of the new area */
    const char * szAreaTag     /* Internal description of the new
area */
```

The ObxCreateArea function allocates room for a new area in OBEX and returns a handle to it. The string szAreaName specifies the new area name, szDescription specifies a description of the area, and szAreaTag specifies an internal description of the area. If the area already exists or the arguments are invalid, this function returns NULL.

```
ObxDeleteArea
BOOL __export __pascal ObxDeleteArea(hArea);
    AREA hArea             /* Handle to an OBEX area */
```

The ObxDeleteArea function deletes the OBEX area referenced by hArea. ObxGetArea or ObxGetAreaByName sets hArea before calling this function. This function returns 1 if it succeeds or 0 if it fails.

```
ObxGetArea
AREA __export __pascal ObxGetArea(nAreaIndex);
    int nAreaIndex         /* Index into a list of areas */
```

The ObxGetArea function returns a handle to an OBEX area. nAreaIndex specifies the placement of the area in the area list (ObxAreasInfoGetNames locates the area list). It is set to 1 to get the first area in the list, 2 for the second, and so on. This handle is passed to any of the Area functions. This function returns NULL if it fails.

```
ObxGetAreaByName
AREA __export __pascal ObxGetAreaByName(szAreaName);
    const char* szAreaName  /* Name of an OBEX area */
```

The ObxGetAreaByName function returns a handle to an OBEX area. The string szAreaName specifies the name of the area to find (the string cannot exceed 40 characters). The handle may be passed to any of the Area functions. This function returns NULL if it fails.

```
ObxGetAreaIndex
int __export __pascal ObxGetAreaIndex(szAreaName );
    const char* szAreaName  /* Name of an OBEX area */
```

The ObxGetAreaIndex function returns an integer representing an index number to activate an area handle (with ObxGetArea). The string szAreaName specifies the name of the area to find (the string cannot exceed 40 characters). For example, if szAreaName is "Publications" this function gets the position of Publications area. The first position is 1, the second is 2, and so on. This function returns −1 if it fails.

```
ObxGetCountOfAreas
    int _export _pascal ObxGetCountOfAreas( );
```

The ObxGetCountOfAreas function returns an integer representing the number of OBEX areas in the user's object store. This number can be useful when functions are called that access the list of area names (for example, ObxGetArea). This function returns −1 if it fails.

4. AreasInfo

The AreasInfo functions are for requesting information about all OBEX areas, and include:

```
ObxAreasInfoGetCount
    int _export _pascal ObxAreasInfoGetCount(hAreasInfo);
        AREASINFO hAreasInfo  /* Handle to AREASINFO */
```

The ObxAreasInfoGetCount function returns an integer representing the number of OBEX areas in the user's object store. ObxGetAreasInfo assigns a value to hAreasInfo before calling this function. This function returns −1 if it fails.

```
ObxAreasInfoGetDescriptions
    char ** _export _pascal ObxAreasInfoGetDescriptions(hAreasInfo);
        AREASINFO hAreasInfo  /* Handle to AREASINFO */
```

The ObxAreasInfoGetDescriptions function returns a pointer to an array of strings. This array contains a description of each area in the object store. ObxGetAreasInfo assigns a value to hAreasInfo before calling this function. The order of descriptions in this array corresponds to the order of names in the array returned by ObxAreasInfoGetNames, and the number of elements in this array corresponds to the value returned by ObxAreasInfoGetCount. Each description can contain up to 80 characters. This function returns NULL if it fails.

```
ObxAreasInfoGetNames
    char ** _export _pascal ObxAreasInfoGetNames(hAreasInfo);
        AREASINFO hAreasInfo  /* Handle to AREASINFO */
```

The ObxAreasInfoGetDescriptions function returns a pointer to an array of strings. This array contains the names of all the OBEX areas in the user's object store. ObxGetAreasInfo assigns a value to hAreasInfo before calling this function. The number of elements in this array corresponds to the value returned by ObxAreasInfoGetCount. Each area name can contain up to 80 characters. This function returns NULL if it fails.

```
ObxAreasInfoNotifyOnUpdate
NOTE _export _pascal ObxAreasInfoNotifyOnUpdate(hAreasInfo, szProc);
    AREASINFO hAreasInfo              /* Handle to AREAINFO */
    AREASINFOCALLBACKPROC szProc      /* Name of the callback procedure */
```

The ObxAreasInfoNotifyOnUpdate function specifies a procedure to call when the list of areas referenced by hAreasInfo changes. The callback procedure is called when new areas area are created, areas are deleted, and an area's description is changed. ObxGetAreasInfo assigns a value to hAreasInfo before calling this function. This function returns a NOTE if it succeeds; otherwise, it returns NULL.

```
ObxGetAreasInfo
    AREASINFO _export _pascal ObxGetAreasInfo( );
```

The ObxGetAreasInfo function returns a handle to an AREASINFO structure, which contains information about OBEX areas in the system. This handle may be passed to any of the AreasInfo functions. This function returns NULL if it fails.

5. Declaration

The Declaration functions are for creating and configuring declarations, which define the initial structure of an object. They include:

```
ObxGetBlankObjectDeclaration
    DECLARATION _export _pascal ObxGetBlankObjectDeclaration( );
```

The ObxGetBlankObjectDeclaration function allocates room for a new object declaration and returns a handle to it. Declarations specify the initial structure of a new OBEX object. This handle may be passed to any of the Declaration functions to set the object's properties, then ObxCreateObject actually creates the object. After creating the object, Object functions may be used. This function returns NULL if it fails.

```
ObxDeclareSetArea
    void _export _pascal ObxDeclareSetArea(hDec, szAreaName);
        DECLARATION hDec       /* Handle to a declaration */
        const char* szAreaName /* Name of an area         */
```

The ObxDeclareSetArea function specifies an OBEX area for storing the object represented by hDec. This function does not specify where the store the declaration; it specifies the area where the object being declared by hDec will be stored. ObxGetBlankObjectDeclaration assigns a value to hDec before calling this function. If this function is not called, the declared object is stored in the Publication area.

```
ObxDeclareSetDescription
    void _export _pascal ObxDeclareSetDescription(hDec, szDesc);
        DECLARATION hDec   /* Handle to a declaration            */
        const char* szDesc /* Description of the declared object */
```

The ObxDeclareSetDescription function specifies a description for the object represented by hDec. This function does not specify a description of the declaration; it specifies the description of the object being declared by hDec. A description and a key are required to create an OBEX object.

ObxGetBlankObjectDeclaration assigns a value to hDec before calling this function. The string szDesc specifies the object description.

```
ObxDeclareSetKey
void _export _pascal ObxDeclareSetKey(hDec, szKey);
    DECLARATION hDec    /* Handle to a declaration      */
    const char* szKey   /* Address of a string that describes the area
*/
```

The ObxDeclareSetKey function specifies an object key (identification string) for the object represented by hDec. This function does not specify a key for the declaration; it specifies the object key of the object being declared by hDec. For practical purposes, this key should be unique. However, OBEX does not require uniqueness. ObxGetBlankObjectDeclaration assigns a value to hDec before calling this function. A key and a description are required to create a declaration.

```
ObxDeclareSetLocalTag
void _export _pascal ObxDeclareSetLocalTag(hDec, szLocalTag);
    DECLARATION hDec       /* Handle to a declaration    */
    const char* szLocalTag /* Local tag for the object   */
```

The ObxDeclareSetLocalTag function specifies a local tag for the object represented by hDec. This function does not specify a tag for the declaration; it specifies the local tag of the object being declared by hDec. A local tag is stored with an object the object store, but is not included when the object is published. (ObxDeclareSetTag specifies keyword data that is always included with the object.) A local tag is useful for tracking an object's workstation status. For example, a local tag indicates whether an object has been read, and if it has been read, the local tag could include a date-time stamp. The string szLocalTag cannot exceed 1,024 characters.

```
ObxDeclareSetTag
void _export _pascal ObxDeclareSetTag(hDec, szTag);
    DECLARATION hDec   /* Handle to a declaration   */
    const char* szTag  /* Address of a keyword string   */
```

The ObxDeclareSetTag function specifies a tag for the object represented by hDec. This function does not specify a tag for the declaration; it specifies the tag of the object being declared by hDec. An object's tag is stored with the object in the object store, and is also transmitted with the object when it is published. ObxDeclareSetLocalTag specifies keyword data that is maintained locally and not transmitted with the object. ObxGetBlankObjectDeclaration assigns a value to hDec before calling this function.

```
ObxDeclareSetVersionDepth
void _export _pascal ObxDeclareSetVersionDepth(hDec, nValue);
    DECLARATION hDec   /* Handle to a declaration   */
    int nVersions      /* Number of versions        */
```

The ObxDeclareSetVersionDepth function specifies how many versions of an object to maintain in the object store. nVersions specifies the number of versions and hDec references the declaration associated with the object. ObxGetBlankObjectDeclaration assigns a value to hDec before calling this function.

6. Entry

The Entry functions are for managing entries and addresses in an address book group, and include:

```
ObxAddressGetConcreteAddress
const char * _export _pascal ObxAddressGetConcreteAddress(hAddress);
    ADDRESS  hAddress  /* Handle to an address */
```

The ObxAddressGetConcreteAddress function returns a string containing the user address of the address referenced by hAddress. The user address is the actual user name or ID used to connect to the messaging service. For example, a LAN user address would be NPIERCHE; and an MCI user address would be Aphra Ben/MCI-ID: 123-4567. ObxAddressGetService gets the name of the messaging service an address accesses. ObxEntryGetAddress or ObxEntryGetAddressByDescription sets hAddress before calling this function. This function returns NULL if it fails.

```
ObxAddressGetDescription
const char * _export _pascal ObxAddressGetDescription(hAddress);
    ADDRESS  hAddress  /* Handle to an address */
```

The ObxAddressGetDescription function returns a string containing the description of the address referenced by hAddress. ObxEntryGetAddress or ObxEntryGetAddressByDescription sets hAddress before calling this function. This function returns NULL if it fails.

```
ObxAddressGetService
const char * _export _pascal ObxAddressGetService(hAddress);
    ADDRESS  hAddress  /* Handle to an address */
```

The ObxAddressGetService function returns a string containing the service name (LAN, MCI, and so on) of the address referenced by hAddress. ObxGetBlankAccount is viewed for a list of return values. ObxEntryGetAddress or ObxEntryGetAddressByDescription sets hAddress before calling this function. This function returns NULL if it fails.

```
ObxAddressSetConcreteAddress
void _export _pascal ObxAddressSetConcreteAddress(Address,
szAddress);
    ADDRESS   hAddress  /* Handle to an address */
    const char * szAddress /* String representing an address to add */
```

The ObxAddressSetConcreteAddress function adds the user address specified by szAddress to the address referenced by hAddress. ObxSetService specifies the transport used by the address. The user address is the actual user name or ID used to connect to the messaging service. For example, a LAN user address would be NPIERCHE; and an MCI user address would be Aphra Ben/MCI-ID: 123-4567. ObxEntryGetBlankAddress, ObxEntryGetAddress, or ObxEntryGetAddressByDescription are used to set hAddress before calling this function.

```
ObxAddressSetDescription
void _export _pascal ObxAddressSetDescription(hAddress, szAddress);
    ADDRESS   hAddress  /* Handle to an address */
    const char * szAddress /* String representing a description to add
*/
```

The ObxAddressSetDescription function specifies a description for the address referenced by hAddress. ObxEntryGetBlankAddress, ObxEntryGetAddress, or ObxEntryGetAddressByDescription sets hAddress before calling this function.

ObxAddressSetService
void _export _pascal ObxAddressSetService(hAddress, szAddress);
    ADDRESS   hAddress   /* Handle to an address */
    const char *  szAddress  /* String representing a transport name */

The ObxAddressSetService function specifies the message service used by the address. Once this is set, ObxAddressSetConcreteAddress specifies the user address on the service. bxGetBlankAccount is viewed for a list of return values. ObxEntryGetBlankAddress, ObxEntryGetAddress, or ObxEntryGetAddressByDescription may be viewed to set hAddress before calling this function.

ObxEntryGetAddress
ADDRESS _export _pascal ObxEntryGetAddress(hEntry, nIndex);
    ENTRY hEntry   /* Handle to an address book entry */
    int nIndex      /* Index of the address in the entry */

The ObxEntryGetAddress function returns a handle to an address in the entry referenced by hEntry. nIndex specifies the placement of the address in the entry list. For example, 1 to retrieve the first address, 2 for the second, and so on. ObxEntryGetAddressByDescription is used to get an address handle using the address description. ObxGroupGetEntry or ObxGroupGetEntryByAlias sets hEntry before calling this function. This function returns NULL if it fails.

ObxEntryGetAddressByDescription
ADDRESS _export _pascal ObxEntryGetAddressByDescription(hEntry, szDescription);
    ENTRY hEntry          /* Handle to an address book entry */
    const char * szDescription  /* Description of the address to retrieve */

The ObxEntryGetAddressByDescription function returns a handle to an address in the entry referenced by hEntry. szDescription specifies the description of the address to find. ObxGroupGetEntry or ObxGroupGetEntryByAlias sets hEntry before calling this function. This function returns NULL if it fails.

ObxEntryGetAlias
const char * _export _pascal ObxEntryGetAlias(hEntry);
    ENTRY hEntry   /* Handle to an address book entry */

The ObxEntryGetAlias function returns a string containing the alias of the entry referenced by hEntry. An alias is a concise name used to identify an address book entry. ObxGroupGetEntry or ObxGroupGetEntryByAlias sets hEntry before calling this function. This function returns NULL if it fails.

ObsEntryGetBlankAddress
  ADDRESS _export _pascal ObxEntryGetBlankAddress(hEntry);
    ENTRY hEntry  /* Handle ta an address book entry */

The ObxEntryGetBlankAddress allocates room for a new address in the address book entry referenced by hEntry and returns a handle to it. Addresses may be added to blank entry and set its name fields. This function returns NULL if it fails.

ObxEntryGetCountOfAddresses
  int _export _pascal ObxEntryGetCountOfAddresses(hEntry);
    ENTRY hEntry  /* Handle to an address book entry */

The ObxEntryGetCountOfAddresses function returns an integer representing number of addresses associated with the entry referenced by hEntry. ObxGroupGetEntry or ObxGroupGetEntryByAlias sets hEntry before calling this function. This function returns –1 if it fails.

ObxEntryGetFirstName
  const char * _export _pascal ObxEntryGetFirstName(hEntry);
    ENTRY hEntry  /* Handle to an address book entry */

The ObxEntryGetFirstName function returns a string containing the first name of the entry referenced by hEntry. ObxGroupGetEntry or ObxGroupGetEntryByAlias sets hEntry before calling this function. This function returns NULL if it fails.

ObxEntryGetLastName
  const char * _export _pascal ObxEntryGetLastName(hEntry);
    ENTRY hEntry  /* Handle to an address book entry */

The ObxEntryGetLastName function returns a string containing the last name of the entry referenced by hEntry. ObxGroupGetEntry or ObxGroupGetEntryByAlias sets hEntry before calling this function. This function returns NULL if it fails.

ObxEntryGetMiddleInitial
  const char * _export _pascal ObxEntryGetMiddleInitial(hEntry);
    ENTRY hEntry  /* Handle to an address book entry */

The ObxEntryGetMiddleInitial function returns a string containing the middle initial of the entry referenced by hEntry. ObxGroupGetEntry or ObxGroupGetEntryByAlias sets hEntry before calling this function. This function returns NULL if it fails.

ObxEntryGetOrganization
  const char * _export _pascal ObxEntryGetOrganization(hEntry);
    ENTRY hEntry  /* Handle to an address book entry */

The ObxEntryGetOrganization function returns a string containing the organization name of the entry referenced by hEntry. ObxGroupGetEntry or ObxGroupGetEntryByAlias sets hEntry before calling this function. This function returns NULL if it fails.

ObxEntrySetAlias
void _export _pascal ObxEntrySetAlias(hEntry, szAlias);
    ENTRY hEntry      /* Handle to an address book entry */
    const char * szAlias  /* String containing the new alias to use */

The ObxEntrySetAlias function specifies an alias for the address book entry referenced by hEntry. An alias is a concise name used to easily locate the entry. ObxGroupGetBlankEntry, ObxGroupGetEntry, or ObxGroupGetEntryByAlias sets hEntry before calling this function.

```
ObxEntrySetFirstName
void _export _pascal ObxEntrySetFirstName(hEntry, szName);
    ENTRY hEntry       /* Handle to an address book entry */
    const char * szName /* String containing the new first name to
                          use    */
```

The ObxEntrySetFirstName function specifies a first name for the address book entry referenced by hEntry. ObxGroupGetBlankEntry, ObxGroupGetEntry, or ObxGroupGetEntryByAlias sets hEntry before calling this function.

```
ObxEntrySetLastName
void _export _pascal ObxEntrySetLastName(hEntry, szName);
    ENTRY hEntry       /* Handle to an address book entry */
    const char * szName /* String containing the new last name to use
                          */
```

The ObxEntrySetLastName function specifies a last name for the address book entry referenced by hEntry. ObxGroupGetBlankEntry, ObxGroupGetEntry, or ObxGroupGetEntryByAlias sets hEntry before calling this function.

```
ObxEntrySetMiddleInitial
void _export _pascal ObxEntrySetMiddleInitial(hEntry, szInitial);
    ENTRY hEntry       /* Handle to an address book entry */
    const char * szInitial /* String containing the new middle initial
                             to use    */
```

The ObxEntrySetMiddleInitial function specifies a middle initial for the address book entry referenced by hEntry. ObxGroupGetBlankEntry, ObxGroupGetEntry, or ObxGroupGetEntryByAlias sets hEntry before calling this function.

```
ObxEntrySetOrganization
void _export _pascal ObxEntrySetOrganization(hEntry, szOrganization);
    ENTRY hEntry       /* Handle to an address book entry */
    const char * szOrganization /* String containing the new
                                  organization to use   */
```

The ObxEntrySetOrganization function specifies an organization for the address book entry referenced by hEntry. ObxGroupGetBlankEntry, ObxGroupGetEntry, or ObxGroupGetEntryByAlias sets hEntry before calling this function.

```
ObxEntryUpdateAddress
BOOL _export _pascal ObxEntryUpdateAddress(hEntry, hAddress);
    ENTRY hEntry       /* Handle to an address book entry */
    ADDRESS hAddress   /* Handle to an address   */
```

The ObxEntryUpdateAddress function updates the address referenced by hAddress in the address book entry referenced by hEntry. Changes made to an address using function calls are not saved until this function is called. ObxGroupGetBlankEntry, ObxGroupGetEntry, or ObxGroupGetEntryByAlias sets hEntry and ObxEntryGetBlankAddress, ObxEntryGetAddress, or ObxEntryGetAddressByDescription to set hAddress before calling this function. This function returns 1 if it succeeds or 0 if it fails.

```
ObxGroupGetBlankEntry
ENTRY _export _pascal ObxGroupGetBlankEntry(hGroup);
    GROUP hGroup   /* Handle to a group in an address book */
```

The ObxGroupGetBlankEntry function allocates room for a new entry in the group referenced by hGroup and returns a handle to it. The handle adds addresses to the entry. This function returns NULL if it fails.

```
ObxGroupGetCountOfEntries
int _export _pascal ObxGroupGetCountOfEntries(hGroup);
    GROUP hGroup   /* Handle to a group in an address book */
```

The ObxGroupGetCountOfEntries function returns an integer representing the number of entries in the group referenced by hGroup. This function returns −1 if it fails.

```
ObxGroupGetEntry
ENTRY _export _pascal ObxGroupGetEntry(hGroup, nIndex);
    GROUP hGroup   /* Handle to a group in an address book */
    int nIndex     /* Index of the entry to retrieve */
```

The ObxGroupGetEntry function returns a handle to an entry in the address book group referenced by hGroup. nIndex is an integer indicating the placement of the entry in the list of groups. For example, nIndex to 1 to gets the first entry, 2 for the second, and so on. With the entry handle one can view, add, remove, or update addresses in the entry. ObxGroupGetEntryByAlias is used to get an entry handle using its alias. This function returns NULL if it fails.

```
ObxGroupGetEntryByAlias
ENTRY _export _pascal ObxGroupGetEntryByAlias(hGroup, szAlias);
    GROUP hGroup   /* Handle to a group in an address book */
    const char * szAlias /* Alias of the entry to retrieve */
```

The ObxGroupGetEntryByAlias function returns a handle to an entry in the address book group referenced by hGroup. The string szAlias specifies the alias to be used by the entry. With the entry handle one can view, add, remove, or update addresses in the entry. This function returns NULL if it fails.

```
ObxGroupUpdateEntry
BOOL _export _pascal ObxGroupUpdateEntry(hGroup, hEntry);
    GROUP hGroup   /* Handle to a group in an address book */
    ENTRY hGroup   /* Handle to an entry in a group */
```

The ObxGroupUpdateEntry function updates the entry referenced by hEntry in the group referenced by hGroup. Changes made to an entry using function calls are not saved until this function is called. This function returns 1 if it succeeds or 0 if it fails.

7. Mail

The Mail functions are for creating and managing mail. They include:

```
ObxGetBlankMail
MAIL _export _pascal ObxGetBlankMail( );
```

The ObxGetBlankMail function allocates room for a new mail object and returns a handle to it. This function returns NULL if it fails.

```
ObxGetMail
    MAIL _export _pascal ObxGetMail(szMailID);
        const char * szMailID   /* ID or key of the mail to retrieve */
```

The ObxGetMail function returns a handle of an existing mail object. The string szMailID specifies the object ID or key of the mail object to find. The mail handle retrieves attachments and other mail information. This function returns NULL if it fails.

```
ObxMailAddAttachment
BOOL _export _pascal ObxMailAddAttachment(hMail, szFilename);
    MAIL hMail              /* Handle to a sail object */
    const char * szFilename /* Name of the file to attach */
```

The ObxMailAddAttachment function attaches a file to the mail referenced by hMail. The string szFilename specifies the name of the file to attach. ObxGetBlankMail or ObxGetMail is used to set hMail before calling this function. This function returns 1 if it succeeds or 0 if it fails.

```
ObxMailAddAttachmentWithName
BOOL _export _pascal ObxMailAddAttachmentWithName(hMail,
szFilename, szAttachName);
    MAIL hMail                /* Handle to a mail object */
    const char * szFilename   /* Name of the file to attach */
    const char * szAttachName /* Name to assign to the attachment */
```

The ObxMailAddAttachmentWithName function attaches a file to the mail referenced by hMail and assigns it a unique name. The string szFilename specifies the name of the file to attach and szAttachName specifies the attachment name. ObxGetBlankMail or ObxGetMail sets hMail before calling this function. This function returns 1 if it succeeds or 0 if it fails.

```
ObxMailAddCc
BOOL _export _pascal ObxMailAddCc(hMail, szAddress);
    MAIL hMail              /* Handle to a mail object */
    const char * szAddress  /* Address to add */
```

The ObxMailAddCc function adds the address stored in the string szAddress to the list of addresses receiving courtesy copies of the mail referenced by hMail. ObxGetBlankMail or ObxGetMail sets hMail before calling this function. ObxGetBlankMail or ObxGetMail sets hMail before calling this function. This function returns 1 if it succeeds or 0 if it fails.

```
ObxMailAddTo
BOOL_export _pascal ObxMailAddTo(hMail, szAddress);
    MAIL hMail              /* Handle to a mail object */
    const char * szFilename /* Address to add */
```

The ObxMailAddTo function adds the address stored in the string szAddress to the list of addresses receiving the mail referenced by hMail. ObxGetBlankMail or ObxGetMail sets hMail before calling this function. This function returns 1 if it succeeds or 0 if it fails.

```
ObxMailGetAttachment
const char * _export _pascal ObxMailGetAttachment(hMail, nIndex);
    MAIL hMail   /* Handle to a mail object */
    int nIndex   /* Index representing an entry in the attachment list */
```

The ObxMailGetAttachment function returns a string containing the filename of an attachment in the mail referenced by hMail. The integer nIndex indicates the placement of the attachment in the attachment list. For example, nIndex is set to 1 to retrieve the first attachment's filename, 2 for the second, and so on. ObxGetMail sets hMail before calling this function. This function returns NULL if it fails.

```
ObxMailGetAttachmentCount
int _export _pascal ObxMailGetAttachmentCount(hMail);
    MAIL hMail  /* Handle to a mail object */
```

The ObxMailGetAttachmentCount function returns an integer representing the number of attachments assigned to the mail referenced by hMail. ObxGetMail sets hMail before calling this function. This function returns −1 if it fails.

```
ObxMailGetAttachmentName
const char * _export _pascal ObxMailGetAttachmentName(hMail,
nIndex);
    MAIL hMail   /* Handle to a mail object */
    int nIndex   /* Index representing an entry in the attachment list */
```

The ObxMailGetAttachmentName function returns a string containing the name of an attachment in the mail referenced by hMail. The integer nIndex indicates the placement of the attachment in the attachment list. For example, nIndex is set to 1 to retrieve the first attachment's name, 2 for the second, and so on. ObxGetMail sets hMail before calling this function. This function returns NULL if it fails.

```
ObxMailGetCc
const char * _export _pascal ObxMailGetCc(hMail, nIndex);
    MAIL hMail   /* Handle to a mail object */
    int nIndex   /* Index representing an entry in the CC list */
```

The ObxMailGetCc function returns a string containing the address of a user receiving a courtesy copy of the mail referenced by hMail. The integer nIndex indicates the placement of the address in the CC list. For example, nIndex is set to 1 to retrieve the first address, 2 for the second, and so on. ObxGetMail sets hMail before calling this function. This function returns NULL if it fails.

```
ObxMailGetCcCount
int _export _pascal ObxMailGetCcCount(hMail);
    MAIL hMail  /* Handle to a mail object */
```

The ObxMailGetCcCount function returns an integer representing the number of users receiving a courtesy copy of the mail referenced by hMail (add the value returned by ObxMailAddTo to this value to determine the total number of users receiving the mail). ObxGetMail sets hMail before calling this function. This function returns −1 if it fails.

```
ObxMailGetCoverLetter
    const char * _export _pascal ObxMailGetCoverLetter(hMail);
        MAIL hMail   /* Handle to a mail object */
```

The ObxMailGetCoverLetter function returns a string containing the cover letter text associated with the mail referenced by hMail. ObxGetMail sets hMail before calling this function. This function returns NULL if it fails.

```
ObxMailGetFrom
    const char * _export _pascal ObxMailGetFrom(hMail);
        MAIL hMail   /* Handle to a mail object */
```

The ObxMailGetFrom function returns a string containing the sender address of the mail referenced by hMail. ObxGetMail sets hMail before calling this function. This function returns NULL if it fails.

```
ObxMailGetSubject
    const char * _export _pascal ObxMailGetSubject(hMail);
        MAIL hMail   /* Handle to a mail object */
```

The ObxMailGetSubject function returns a string containing the subject of the mail referenced by hMail. One can use ObxGetMail to set hMail before calling this function. This function returns NULL if it fails.

```
ObxMailGetTo
    const char * _export _pascal ObxMailGetTo(hMail, nIndex);
        MAIL hMail   /* Handle to a mail object */
        int nIndex   /* Index representing an entry in the TO list */
```

The ObxMailGetTo function returns a string containing the address of a user receiving a copy of the mail referenced by hmail. The integer nIndex indicates the placement of the address in the recipient list. For example, nIndex is set to 1 to retrieve the first address, 2 for the second, and so on. ObxGetMail sets hMail before calling this function. This function returns NULL if it fails.

```
ObxMailGetToCount
    int _export _pascal ObxMailGetToCount(hMail);
        MAIL hMail   /* Handle to a mail object */
```

The ObxMailGetToCount function returns an integer representing the number of users receiving a copy of the mail referenced by hMail (not including courtesy copies—add the value returned by ObxMailAddCc to this value to determine the total number of users receiving the mail). ObxGetMail sets hMail before calling this function. This function returns −1 if it fails.

```
ObxMailSend
    BOOL _export _pascal ObxMailSend(hMail);
        MAIL hMail   /* Handle to a mail object */
```

The ObxMailSend function sends the mail referenced by hmail. ObxMailAddTo and ObxMailAddCc specify the users receiving the mail. ObxGetBlankMail sets hMail before calling this function. This function returns 1 if it succeeds or 0 if it fails.

```
ObxMailSetCoverLetter
    BOOL _export _pascal ObxMailSetCoverLetter(hMail, szCoverLetter);
        MAIL hMail          /* Handle to a mail object */
        const char *
        szCoverLetter       /* Text to add as a cover letter to the mail */
```

The ObxMailSetCoverLetter function adds a cover letter to the mail referenced by hMail. The string szCoverLetter specifies the text of the cover letter. bxGetBlankMail sets hMail before calling this function. This function returns 1 if it succeeds or 0 if it fails.

```
ObxMailSetSubject
    BOOL _export _pascal ObxMailSetSubject(hMail, szSubject);
        MAIL hMail              /* Handle to a mail object */
        const char * szSubject  /* Text to add as a subject to the mail */
```

The ObxMailSetSubject function adds a subject to the mail referenced by hMail. The string szSubject specifies the subject of the mail. ObxGetBlankMail sets hMail before calling this function. This function returns 1 if it succeeds or 0 if it fails.

8. Object Exchange (OBEX)

OBEX functions are for managing OBEX, and they include:

```
ObxDisableConnection
    int _export _pascal ObxDisableConnection( );
```

The ObxDisableConnection function ends the DDE link between a client application and OBEX. It also frees any resources allocated when the DDE link was created. This function returns −1 if it fails.

```
ObxEnableConnection
    int _export _pascal ObxEnableConnection(hLink);
        HANDLE hLink   /* Handle to the DDE link   */
```

The ObxEnableConnection function initiates a DDE link between a client application and OBEX. This function is called before calling any other function in the API. This function returns −1 if it fails.

```
ObxEnableDefaultConnection
    int _export _pascal ObxEnableDefaultConnection( );
```

The ObxEnableConnection function initiates a default DDE link between a client application and OBEX. This function returns −1 if it fails.

```
ObxFreeResource
    void _export _pascal ObxFreeResource( );
```

The ObxFreeResource function frees all resources currently allocated to the API.

```
ObxGetErrorCode
    int _export _pascal ObxGetErrorCode( );
```

The ObxGetErrorCode function returns an integer representing the error code of the last OBEX error that occurred.

Exemplary error codes include:

| Code | Description |
| --- | --- |
| 1101 | reserved |
| 1103 | API could not connect to OBEX |
| 1105 | property specified is invalid |
| 1501 | reserved |
| 1503 | reserved |
| 1505 | access to the object cannot be located |
| 1507 | version number specified exceeds the version depth |
| 1509 | cannot create an area which already exists |
| 1511 | cannot access an area which does not exist |
| 1513 | cannot create an account which already exists |
| 1515 | cannot access an account which does not exist |
| 1517 | invalid transport specified |
| 1519 | setting was not 1 or 0 |
| 1521 | a time to start polling was expected |
| 1523 | the polling method was expected |
| 1525 | a value from 0 to 23 was expected |
| 1527 | a value from 0 to 59 was expected |
| 1529 | a value from 0 to 59 was expected |
| 1531 | cannot open the specified address book |
| 1533 | invalid password specified |
| 1535 | the group specified already exists |
| 1537 | the entry specified already exists |
| 1539 | the name specified already exists |
| 1541 | the address specified already exists |
| 1543 | the group specified does not exist |
| 1545 | the entry specified does not exist |
| 1547 | the name specified does not exist |
| 1549 | the address specified does not exist |
| 1551 | OBEX could not create an address book |
| 1553 | attempt to create an address book which already exists |
| 1555 | the area index specified is invalid |

This function returns −1 if it fails.

```
ObxGetErrorText
void __export __pascal ObxGetErrorText(szErrorText, nErrorCode);
    char * szErrorText   /* String containing the error text */
    int nErrorCode       /* Number representing the error code */
```

The ObxGetErrorText function retrieves the last error generated by OBEX. The text of the error is stored in the string szErrorText and the error code is stored in the integer szErrorCode. ObxGetErrorCode includes a list of error codes.

```
ObxGetTotalOutgoing
int __export __pascal ObxGetTotalOutgoing( );
```

The ObxGetTotalOutgoing function returns the number of outgoing objects (announcements, offers, mailed objects) currently waiting to be sent by OBEX. This function returns −1 if it fails.

```
ObxIsPolling
int __export __pascal ObxIsPolling( );
```

The ObxIsPolling function returns 1 if OBEX is currently polling. Otherwise, it returns 0. This function returns −1 if it fails.

9. Object

The Object functions are for creating and managing objects. They include:

```
ObxCreateObject
OBJECT __export __pascal ObxCreateObject(hDec);
    DECLARATION hDec   /* Handle to a declaration
                          DECLARATION */
```

The ObxCreateObject function returns a handle to a new OBEX object. The object's initial structure and properties are specified in the declaration referenced by hDec. ObxGetBlankObjectDeclaration shows a handle to a blank object declaration and then Declaration functions are used to set object properties before calling ObxCreateObject. After a successful call to ObxCreateObject, the handle is passed to any of the Object functions. This function returns NULL if it fails.

```
ObxDeleteObject
BOOL __export __pascal ObxDeleteObject(szObjectID);
    const char * szObjectID   /* Object key or ID
                                  of the object to delete */
```

The ObxDeleteObject function deletes the object specified by szObjectID from the object store. The string szObjectID contains an object ID or key. bxObjectGetId or ObxObjectGetKey is used to find a value for szObjectID. This function returns 1 if it succeeds or 0 if it fails.

```
ObxGetObject
OBJECT __export __pascal ObxGetObject(szObjectId, nVersion);
    const char* szObjectId   /* Object ID or key           */
    int nVersion             /* Object version (1 = most recent version) */
```

The ObxGetObject function returns a handle to an existing OBEX object. The handle is passed to any of the Object functions. The string is used szObjectId to specify the value of the object's ID property or the object's Key property. OBEX searches both fields for the specified value, and stops when it finds a match. An object's ID is guaranteed to be unique, because OBEX generates it. An object's key is generated by the user or the application and might not be unique. nVersion specifies which version of an object to get. A value of 1 gets the most recent version, a value of 2 gets the version prior to that, and so on. ObxObjectGetId or ObxObjectGetKey may be used to locate a value for szObjectID. This function returns NULL if it fails.

```
ObxObjectAcceptSubscription
BOOL __export __pascal ObxObjectAcceptSubscription (hObject);
    OBJECT hObject   /* Handle to an OBEX object   */
```

When a publisher offers a publication, the publication may be accepted using ObxObjectAcceptSubscription. hObject is a pointer to the offer (this may be set using ObxObjectGetDeclaration). This function returns 1 if it succeeds or 0 if it fails.

```
ObxObjectAddToArea
BOOL __export __pascal ObxObjectAddToArea(hObject, hArea);
    OBJECT hObject   /* Handle to an OBEX object   */
    AREA hArea       /* Handle to an OBEX area     */
```

The ObxObjectAddToArea function stores the object referenced by hObject in the area referenced by hArea. This function returns 1 if it succeeds or 0 if it fails.

```
ObxObjectCreateVersion
  VERSION _export _pascal ObxObjectCreateVersion(hObject);
    OBJECT hObject    /* Handle to an OBEX object */
```

The ObxObjectCreateVersion function creates a new version of the object referenced by hObject (it is also needed to create the first version). Properties added in previous versions of the object are not retained. Data may be added to the object using ObxVersionAdd and ObxVersionAddWithType. To save the new version, ObxObjectIssue is called. This function returns NULL if it fails.

```
ObxObjectDeleteVersion
  BOOL _export _pascal ObxObjectDeleteVersion(hObject, nVersion);
    OBJECT hObject      /* Handle to an OBEX object   */
    int nVersion        /* Object version (1 = most recent version) */
```

The ObxObjectDeleteVersion function deletes one version of the object referenced by hObject. nversion specifies which version of an object to delete. A value of 1 deletes the most recent version, a value of 2 deletes the version prior to that, and so on. This function returns 1 if it succeeds or 0 if it fails.

```
ObxObjectGetArea
  const char *_export_pascal ObxObjectGetArea (hObject);
    OBJECT hObject    /* Handle to an OBEX object */
```

The ObxObjectGetArea function returns a string containing the name of the area in which the object referenced by hObject is stored. This function returns NULL if it fails.

```
ObxObjectGetDeclaration
  const char *_export_pascal ObxObjectGetDeclaration (hObject);
    OBJECT hObject    /* Handle to an OBEX object */
```

The ObxObjectGetDeclaration function returns a string describing the published object (indicated by hObject) being offered to a subscriber. This function returns NULL if it fails.

```
ObxObjectGetCountOfUserProperties
  int _export _pascal ObxObjectGetCountOfUserProperties(hObject);
    OBJECT hObject    /* Handle to an OBEX object */
```

The ObxObjectGetGetCountOfUserProperties function returns the number of user-defined properties added to the object referenced by hObject. This function returns −1 if it fails.

```
ObxObjectGetCountOfUserProperty
  int _export _pascal ObxObjectGetCountOfUserProperty(hObject, nIndex);
    OBJECT hObject    /* Handle to an OBEX object */
    int nIndex        /* Index number of the user-defined property to check */
```

The ObxObjectGetCountOfUserProperty function returns an integer representing the number of values in a user-defined property. Set hObject to the object to check. nIndex specifies the placement of the property in the user-defined property list. For example, nIndex is set to 1 to check the first user-defined property, 2 for the second, and so on. This function returns −1 if it fails.

```
ObxObjectGetDateCreated7
  long _export _pascal ObxObjectGetDateCreated(hObject);
    OBJECT hObject    /* Handle to an OBEX object */
```

The ObxObjectGetDateCreated function returns a long integer representing the date the object referenced by hObject was created. This function returns −1 if it fails.

```
ObxObjectGetDateLastModified
  long _export _pascal ObxObjectGetDateLastModified(hObject);
    OBJECT hObject    /* Handle to an OBEX object */
```

The ObxObjectGetDateLastModified function returns a long integer representing the date the object referenced by hObject was last revised. This function returns −1 if it fails.

```
ObxObjectGetDescription
  const char * _export _pascal ObxObjectGetDescription(hObject);
    OBJECT hObject    /* Handle to an OBEX object */
```

The ObxObjectGetDescription function returns a string containing the description of the object referenced by hObject. This function returns NULL if it fails.

```
ObxObjectGetId
  const char * _export _pascal ObxObjectGetId(hObject);
    OBJECT hObject    /* Handle to an OBEX object */
```

The ObxObjectGetId function returns the default identification string of the object referenced by hObject. The object ID is assigned by OBEX when the object is created. The object ID quickly connects to the object. This function returns NULL if it fails.

```
ObxObjectGetKey
  const char * export _pascal ObxObjectGetKey(hObject);
    OBJECT hObject    /* Handle to an OBEX object */
```

The ObxObjectGetKey function returns the identification string of the object referenced by hObject. An object key may be assigned to the object when it is created and used as an alias to refer to the object, retrieve its properties, and so on. This function returns NULL if it fails.

```
ObxObjectGetNumberOfVersions
  int _export _pascal ObxObjectGetNumberOfVersions(hObject);
    OBJECT hObject    /* Handle to an OBEX object */
```

The ObxObjectGetNumberOfVersions function returns an integer representing the number of versions contained in the published object referenced by hObject. This function returns −1 if it fails.

```
ObxObjectGetPublishArea
  const char * _export _pascal ObxObjectGetPublishArea(hObject);
    OBJECT hObject    /* Handle to an OBEX object */
```

The ObxObjectGetPublishArea function returns a string containing the name of the area the object referenced by hObject is stored in. This function returns NULL if it fails.

```
ObxObjectGetPublisher
   const char * _export _pascal ObxObjectGetPublisher(hObject);
      OBJECT hObject   /* Handle to an OBEX object   */
```

The ObxObjectGetPublisher function returns a string containing the address of the user who published the object referenced by hObject. If the object originated in the current object store, this function returns "obex". This function returns NULL if it fails.

```
ObxObjectGetSubscribers
   SUBSCRIBERS _export _pascal ObxObjectGetSubscribers(hObject);
      OBJECT hObject   /* Handle to an OBEX object */
```

The ObxObjectGetSubscribers function returns a handle to the list of subcribers in the object referenced by hObject. This handle retrieves specific subscriber addresses. This function returns NULL if it fails.

```
ObxObjectGetTypeOfUserProperty
   BOOL _export _pascal ObxObjectGetTypeOfUserProperty(hObject,const.
   char *,char *, int);
      OBJECT hObject         /* Handle to an OBEX object */
      const char * szProperty /* Name of the property to check */
      const char * szType     /* String to store the property type in */
      int nSize               /* Size of the type string in characters */
```

The ObxObjectGetTypeOfUserProperty function checks the typed property specified by szProperty and stores the name of its type in the string szType. The length of szType is stored in nSize. This function returns 1 if it succeeds or 0 if it fails.

```
BOOL _export _pascal ObxObjectGetUserProperty(hObject, nIndex, szPropName,
nSize);
   OBJECT hObject    /* Handle to an OBEX object */
   int nIndex        /* Index number of the user-defined property to check */
   const char * szPropName /* name of the property */
   int nSize         /* Size of szPropName in characters */
```

The ObxObjectGetUserProperty function uses the index nIndex to find a user-defined property and store its name in szPropName. For example, setting nIndex to 1 finds the name of the first user-defined property, 2 for the second, and so on. The length of the property name is stored in nSize. This function returns 1 if it succeeds or 0 if it fails.

```
ObxObjectGetValue
   const char * _export _pascal ObxObjectGetValue(hObject, szPropName,
   nPropValueIndex);
      OBJECT hObject      /* Handle to an OBEX object   */
      const char * szPropName /* Property name          */
      int nPropValueIndex /* Property value index (0 = 1st value) */
```

The ObxObjectGetValue function returns a string containing the value of the property stored in szPropName. If the property contains multiple values, nPropValueIndex specifies an individual entry to request (1 for the first value, 2 for the second, and so on). This function returns NULL if it fails.

```
BOOL _export _pascal ObxObjectGetValueOfUserProperty(hObject,
szProperty, nValueIndex, szValue, nSize);
   OBJECT hObject       /* Handle to an OBEX object */
   const char * szProperty /* Property name */
   int nValueIndex      /* Property value index (0 = 1st value) */
   const char * szValue /* String to store the property value in */
   int nSize            /* Length of szValue in characters */
```

The ObxObjectGetValueOfUserProperty function takes the value of the property specified by szProperty and stores it in szValue. The length of szValue is stored in nSize. If the property contains multiple values, nValueIndex is used to specify the value to get (0 for the first, 1 for the second, and so on). This function returns 1 if it succeeds or 0 if it fails.

```
ObxObjectIsIndividual
   int _export _pascal ObxObjectIsIndividual(hObject);
      OBJECT hObject   /* Handle to an OBEX object   */
```

The ObxObjectIsIndividual function returns 1 if the object referenced by hObject is not a published object or a subscription. OBEX can contain objects that were not created using a declaration. This function checks for them. This function returns −1 if it fails.

```
ObxObjectIsPublication
   int _export _pascal ObxObjectIsPublication(hObject);
      OBJECT hObject   /* Handle to an OBEX object   */
```

The ObxObjectIsPublication function returns 1 if the object referenced by hObject is a published object. This function returns −1 if it fails.

```
ObxObjectIsSubscription
   int _export _pascal ObxObjectIsSubscription(hObject);
      OBJECT hObject   /* Handle to an OBEX object   */
```

The ObxObjectIsSubscription function returns 1 if the object referenced by hObject is an object being subscribed to. This function returns −1 if it fails.

```
ObxObjectIssue
   BOOL _export _pascal ObxObjectIssue(hVersion);
      VERSION hVersion /* Handle to a version of an object */
```

The ObxObjectIssue function issues a new version of an object (created using ObxObjectCreateVersion). This function returns 1 if it succeeds or 0 if it fails.

```
ObxObjectNotifyOnUpdate
NOTE _export _pascal ObxObjectNotifyOnUpdate(hObject, szProcName);
    OBJECT hObject              /* Handle to an OBEX object      */
    OBJECTCALLBACKPROC szProcName  /* Name of callback procedure */
```

The ObxObjectNotifyOnUpdate function specifies a procedure to call whenever the object referenced by hObject is revised. szProcName specifies the name of the procedure to call. This procedure is called when a new version of the object arrives, a version is removed, the object is removed, or the object's properties change. This function returns NULL if it fails.

```
ObxObjectRejectSubscription
BOOL _export _pascal ObxObjectRejectSubscription(hObject);
    OBJECT hObject  /* Handle to an OBEX object  */
```

When a publisher offers a publication, the publication can be rejected using ObxObjectRejectSubscription. hObject is a pointer to the offer. This function returns 1 if it succeeds or 0 if it fails.

```
ObxObjectRemoveFromArea
BOOL _export _pascal ObxObjectRemoveFromArea(hObject, hArea);
    OBJECT hObject  /* Handle to an OBEX object  */
    AREA hArea      /* Handle to an OBEX area   */
```

The ObxObjectRemoveFromArea function removes the object referenced by hObject from the area referenced by hArea. This function returns 1 if it succeeds or 0 if it fails.

```
ObxPublish
BOOL _export _pascal ObxPublish(hPubForm);
    PUBFORM hPubForm  /* Handle to a publication form  */
```

The ObxPublish function uses the publication form referenced by hPubForm to publish an object. It also specifies how accepted subscription offers are handled: the subscribers who accept the offer receive the current version of the object. ObxPublishNextVersion can be used to specify that subscribers receive the next version. This function returns 1 if it succeeds or 0 if it fails.

```
ObxPublishNextVersion
BOOL _export _pascal ObxPublishNextVersion(hPubForm);
    PUBFORM hPubForm  /* Handle to a publication form  */
```

The ObxPublishNextVersion function uses the publication form referenced by hPubForm to publish an object. It also specifies how accepted subscription offers are handled: the subscribers who accept the offer receive the next version of the object. ObxPublish specifies that subscribers receive the current version. This function returns 1 if it succeeds or 0 if it fails.

```
ObxVersionAdd
BOOL _export _pascal ObxVersionAdd(hVersion, szPropName, szPropValue);
    VERSION hVersion      /* Handle to version data  */
```

-continued
```
    const char * szPropName   /* Property name   */
    const char * szPropValue  /* Property value  */
```

The ObxVersionAdd function adds data to the version of an object identified by hVersion. The data is added as a property-value pair specified by szPropName and szPropValue. ObxObjectCreateVersion is called to set hVersion before calling this function.

An OBEX object is modified by issuing a new version of it. User-defined properties do not persist from one version to the next; add user-defined properties are added to each new version of the object. When an object is created in OBEX, it is a blank template that can be filled in by adding new properties to the object. These user-defined properties fall into two categories: basic properties and typed properties. ObxVersionAdd adds basic properties to an object. Basic properties consist of a new property name and value. If a property name is specified in OBEX that does not already exist (for example, WinSettings), OBEX creates the property, adds it to the object, and sets the property to the specified setting. This only occurs when creating an object or issuing a version of an object. For example, ObxVersionAdd (hLatest, "WinSettings", "C:\WIN\WIN.INI") creates property named WinSettings in the version referenced by hLatest and sets it to C:\WIN\WIN.INI.

To add typed properties to an object, ObxVersionAddWithType is used. This function returns 1 if it succeeds or 0 if it fails.

```
ObxVersionAddWithType
BOOL _export _pascal ObxVersionAddWithType(hVersion, szPropName,
szPropValue, szPropType);
    VERSION hVersion          /* Handle to a version data  */
    const char * szPropName   /* Property name   */
    const char * szPropValue  /* Property value  */
    const char * szPropType   /* Property type   */
```

The ObxVersionAddWithType function adds typed data to the version of an object identified by hVersion. The data is added as a property-value pair specified by szPropName and szPropValue. szPropType specifies the data type. ObxObjectCreateVersion is called to get a handle to an object version before calling this function.

An OBEX object is modified by issuing a new version of it. User-defined properties do not persist from one version to the next; user-defined properties must be added to each new version of the object. When an object is created in OBEX, it is a blank template that is filled in by adding new properties to the object. These user-defined properties fall into two categories: basic properties and typed properties. ObxVersionAddWithType adds typed properties to an object. ObxVersionAdd adds basic properties to an object. Typed properties add more complex data to the object, including files, information from the Windows Clipboard, and user-defined strings. For each piece of data, szPropName is set to the property name, szPropValue to the property value, and szPropType to the property type. For example, to add the file SYSTEM.INI as a property named WinSettings, ObxVersionAddWithType(hLatest, "WinSettings", "C:\WIN\SYSTEM.INI", "file") is used. The following table lists each type of data and the argument settings to add it.

| Procedure | Data Type |
|---|---|
| Clipboard data | Copy the data to add into the Clipboard. Set szPropType to the name of a Windows Clipboard format (such as wb1, bitmap, and so on) and szPropValue to clipboard. This tells OBEX to xpect a property containing a Clipboard data. |
| Text file contents | Set szPropType to text and szPropValue to the name of a text file. |
| File | Set szPropType to file and szPropValue to the name of a file. |
| Custom property | Set szPropType to a unique name. The subscriber's OBEX application must be designed to read the custom format and interpret the string. |

10. Publish and Subscriber list

The Publish and Subscriber List functions are for managing subscriber lists and publication forms, and include:

ObxObjectGetBlankPubForm
PUBFORM _export _pascal ObxObjectGetBlankPubForm(hObject);
   OBJECT hObject   /* Handle to an OBEX object  */

The ObxObjectGetGetBlankPubForm function allocates room for a new publication form and returns a handle to it. This handle is used to publish the object referenced by hObject. This function returns NULL if it fails.

ObxObjectUpdateSubscribers
BOOL _export _pascal ObxObjectUpdateSubscribers(hObject, hSubscribers);
   OBJECT hObject   /* Handle to an OBEX object  */
   SUBSCRIBERS hSubscribers  /* Handle to a subscribers list  */

The ObxObjectUpdateSubscribers function saves the changes made to the subscriber list referenced by hSubscribers. New subscribers are sent the current version of the object (referenced by hObject). ObxObjectUpdateSubscribersNextVersion specifies that new subscribers receive the next version. This function returns 1 if it succeeds or 0 if it fails.

ObxObjectUpdateSubscribersNextVersion
BOOL _export _pascal ObxObjectUpdateSubscribersNextVersion(hObject, hSubscribers);
   OBJECT hObject   /* Handle to an OBEX object  */
   SUBSCRIBERS hSubscribers  /* Handle to a subscribers list  */

The ObxObjectUpdateSubscribersNextVersion function saves the changes made to the subscriber list referenced by hSubscribers (see Publish and Subscriber list functions for more information on changing the subscriber list). New subscribers are sent the next version of the object (referenced by hObject). ObxObjectUpdateSubscribers specifies that new subscribers receive the current version. This function returns 1 if it succeeds or 0 if it fails.

ObxPubFormGetBlankSubscribers
SUBSCRIBERS _export _pascal ObxPubFormGetBlankSubscribers(hPubForm);
   PUBFORM hPubForm  /* Handle to a publication form  */

The ObxPubFormGetBlankSubscribers function gets a new (empty) subscriber list for a publication. ObxObjectGetBlankPubForm sets hPubForm before calling this function. This function returns NULL if it fails.

ObxPubFormSetAnnouncement
BOOL _export _pascal ObxPubFormSetAnnouncement(hPubForm, szAnncText);
   PUBFORM hPubForm  /* Handle to a publication form  */
   const char * szAnncText  /* String containing announcement text  */

The ObxPubFormSetAnnouncement function specifies the text of an announcement for a new publication. The string szAnncText contains the announcement text. ObxObjectGetBlankPubForm sets hPubForm before calling this function. This function returns 1 if it succeeds or 0 if it fails.

ObxPubFormSetArea
BOOL _export _pascal ObxPubFormSetArea(hPubForm, szAreaName);
   PUBFORM hPubForm  /* Handle to a publication form  */
   const char * szAreaName  /* String containing the area to publish to  */

The ObxPubFormSetArea function specifies the area a published object is stored in. If this function is not called, the published object is stored in the Subscription area. ObxObjectGetBlankPubForm sets hPubForm before calling this function. This function returns 1 if it succeeds or 0 if it fails.

ObxPubFormSetSubscribers
BOOL _export _pascal ObxPubFormSetSubscribers(hPubForm, hSubscribers);
   PUBFORM hPubForm  /* Handle to a publication form  */
   SUBSCRIBERS hSubscribers  /* Handle to a subscribers list  */

The ObxPubFormSetSubscribers function attaches the subscriber list referenced by hSubscribers to the publication form referenced by hPubForm. ObxPubFormGetBlankSubscribers and ObxSubscribersAdd are used to create a subscriber list. ObxObjectGetBlankPubForm is used to set hPubForm before calling this function. This function returns 1 if it succeeds or 0 if it fails.

```
ObxSubscribersAdd
BOOL _export _pascal ObxSubscribersAdd(hSubscribers, szAddr, hSubOffer);
    SUBSCRIBERS hSubscribers    /* Handle to a subscriber list    */
    const char * szAddr         /* Subscriber address             */
    SUBOFFER eSubOffer          /* 1 for automatic subscriptions, 0 for offers */
```

The ObxSubscribersAdd function adds a subscriber address to the subscriber list referenced by hSubscribers. The string szAddr contains the address to add. eSubOffer is set to 0 to specify that the subscription is only offered to the subscriber. Otherwise, eSubOffer is set to 1 to automatically send the published object to the subscriber. ObxObjectGetBlankPubForm is used to set hPubForm before calling this function. This function returns 1 if it succeeds or 0 if it fails.

```
ObxSubscribersEmpty
BOOL _export _pascal ObxSubscribersEmpty(hSubscribers);
    SUBSCRIBERS hSubscribers    /* Handle to subscriber data     */
```

The ObxSubscribersEmpty function removes all addresses from the subscriber list referenced by hSubscribers. This function returns 1 if it succeeds or 0 if it fails.

```
ObxSubscribersGetAddress
const char * _export _pascal ObxSubscribersGetAddress(hSubscribers, nAddrIndex);
    SUBSCRIBERS hSubscribers    /* Handle to subscriber data     */
    int nAddrIndex              /* Position of address in list   */
```

The ObxSubscribersGetAddress function gets the address stored at a specified position in the subscriber list referenced by hSubscribers. nAddrIndex specifies the placement of the address in the list. For example, nAddrIndex is set to 1 to get the first address, 2 for the second, and so on. This function returns NULL if it fails.

```
ObxSubscribersGetCountOf
int _export _pascal ObxSubscribersGetCountOf(hSubscribers);
    SUBSCRIBERS hSubscribers    /* Handle to subscriber data     */
```

The ObxSubscribersGetCountOf function returns an integer representing the number of addresses stored in the subscriber list referenced by hSubscribers. This function returns −1 if it fails.

```
ObxSubscribersGetOffer
SUBOFFER _export _pascal ObxSubscribersGetOffer(hSubscribers, nOfferIndex);
    SUBSCRIBERS hSubscribers    /* Handle to subscriber data     */
    int nOfferIndex             /* Position of offer in list     */
```

The ObxSubscribersGetOffer function returns 1 if an address in the subscriber list referenced by hSubscribers is automatically receiving the published object or 0 if the published object is only being offered. nOfferIndex specifies the placement of the address in the subscriber list. For example, nOfferIndex is set to 1 to get the offer status of the first address, 2 for the second, and so on. ObxSubscribersGetOfferFromName is used to get the offer status of a specific address using its name. This function returns −1 if it fails.

```
ObxSubscribersGetOfferFromName
SUBOFFER _export _pascal ObxSubscribersGetOfferFromName (hSubscribers, szName);
    SUBSCRIBERS hSubscribers    /* Handle to subscriber data     */
    const char * szName         /* Subscriber name               */
```

The ObxSubscribersGetOfferFromName function returns 1 if an address in the subscriber list referenced by hSubscribers is automatically receiving the published object or 0 if the published object is only being offered. The string szName is used to specify the name of the address to check. This function returns NULL if it fails.

```
ObxSubscribersGetStatus
SUBSTATUS _export _pascal ObxSubscribersGetStatus (hSubscribers, nSubIndex);
    SUBSCRIBERS hSubscribers    /* Handle to subscriber data     */
    int nSubIndex               /* Position of subscriber in list */
```

The ObxSubscribersGetStatus function gets the status of a subscriber stored at a specified position in the subscription list referenced by hSubscribers. nOfferIndex specifies the position of the address in the subscriber list. For example, nOfferIndex is set to 1 to get the status of the first address, 2 for the second, and so on. ObxSubscribersGetStatusFromName is used to get the status of an address using its name. The function returns the values in the following table.

| Code | Description |
| --- | --- |
| −1 | the address being checked does not exist or is invalid |
| 0 | the subscription status has not been set yet |
| 1 | the address is actively subscribing to the object |
| 2 | OBEX is waiting for confirmation of a subscription offer |

```
ObxSubscribersGetStatusFromName
SUBSTATUS _export _pascal ObxSubscribersGetStatusFromName (hSubscribers, szName);
    SUBSCRIBERS hSubscribers    /* Handle to subscriber data     */
    const char * szName         /* Subscriber name               */
```

The ObxSubscribersGetStatusFromName function gets the status of a subscriber stored in the subscription list referenced by hSubscribers. szName specifies the name of the address to check. ObxSubscribersGetStatusFromName displays the values this function can return. This function returns NULL if it fails.

```
ObxSubscribersNotifyOnUpdate
NOTE _export _pascal ObxSubscribersNotifyOnUpdate (hSubscribers, szProcName);
    SUBSCRIBERS hSubscribers    /* Handle to subscriber data     */
```

-continued

```
SUBSCRIBERSCALLBACKPROC szProcName    /* Callback
procedure    */
```

The ObxSubscribersNotifyOnUpdate function specifies a procedure to call when the subscriber list referenced by hSubcribers changes. The callback procedure is called when a subscriber is added, a subscriber is deleted, and a subscriber's status changes. This function returns NULL if it fails.

```
ObxSubscribersRemove
BOOL _export _pascal ObxSubscribersRemove (hSubscribers, szAddr);
    SUBSCRIBERS hSubscribers        /* Handle to subscriber data */
const char * szAddr        /* Subscriber address    */
```

The ObxSubscribersRemove function removes the address indicated by szAddr from the subscriber list referenced by hSubscriber. This function returns 1 if it succeeds or 0 if it fails.

D. API Forms

The OBEX API uses a set of custom structures called "forms" to perform OBEX tasks. Performing OBEX operations using this call-level interface is basically a three-step process.

First, a data structure called a form is allocated using a function call, such as ObxGetBlankObjectDeclaration. The memory for the form is allocated automatically, and the function returns a handle to the form. Next, the form is filled out using other function calls, such as ObxDeclareSetKey. Each function is passed a reference to the form (created in step 1) as an argument. Finally, a function is invoked to process the form and perform the operation, such as ObxCreateObject( ). The memory assigned to the form is deallocated and the reference becomes invalid. For example, the following code announces an object:

```
            ANNOUNCEMENT AnnHandle
            OBJECT  ObjHandle;
            // asks OBEX for an announcement form
            AnnHandle = ObxGetBlankObjectAnnouncement ();
            // fills out the form
            ObxAnnounceSetKey (AnnHandle,
                "Worldwide Sales Representatives");
            ObxAnnounceSetDescription(AnnHandle,
                "Sales Rep Listing");
            ObxAnnounceSetArea(AnnHandle, "Global");
            // files the form and retrieves a handle
            // to the object created by the announcement
            // At this point, the announcement referenced
            // by AnnHandle becomes invalid.
            ObjHandle = ObxCreateObject (AnnHandle);
```

Any forms still allocated when an OBEX session terminates can be cleared using ObxFreeResource( ).

E. API Tasks

The OBEX API provides commands that can be issued to OBEX to add workgroup capabilities to an existing application that supports DLL function calls. To perform any OBEX tasks a connection is first established using ObxEnableConnection. This establishes a DDE link between an application (client) and OBEX. When the application is finished, the connection is closed using ObxDisableConnection. This also frees up any resources still allocated to the API.

1. Task: Managing Objects

OBEX exchanges data with other OBEX users through objects. The task of managing objects includes creating an object, declaring an object, opening an object, deleting an object, and retrieving object properties.

(a) Declaring/Creating objects

An object must be declared before it can be published. Declarations define the structure and placement of the object in OBEX. An object is declared as follows. First, a blank declaration form is created using ObxGetBlankObjectDeclaration. A description of the new object is specified using ObxDeclareSetDescription. A key (name used to identify the object) is specified for the new object using ObxDeclareSetKey. The area in which the new object is to be stored is specified using ObxDeclareSetArea; if no area is specified, OBEX stores the object in the Publication area by default. The object may now be created using the declaration. ObxCreateObject creates the object using the declaration to create the object and returns a handle to it. The object is now created and ready to be published.

(b) Opening objects

To retrieve properties from mail or a published object a handle to the object is obtained by opening it. To open an object, the object ID or key of the object to open is first determined. Identification strings may be found by opening the area containing the object and reviewing its table of contents. Next, a handle to the object is obtained by using ObxGetObject (which finds the object using its object ID or key).

(c) Deleting objects

To delete an object from OBEX, the object ID or key of the object to delete is located. As with opening, the identification strings can be determined by opening the area containing the object and reviewing its table of contents. ObxObjectDeleteVersion is used to delete a specific version of the object. ObxDeleteObject is used to delete all versions of the object.

(d) Retrieving object properties

OBEX client information is sent to other OBEX users by adding user-defined properties to an object. User-defined properties can contain strings, files, clipboard data, or the like. To view an object's user-defined properties, the object is first opened. Next, the number of user-defined properties is determined using ObxObjectGetCountOfUserProperties. Property names for each property attached to the object may by determined by calling ObxObjectGetUserProperty. ObxObjectGetValueOfUserProperty is called for each property attached to the object to retrieve the property value. For instance, the following functions retrieve property values common to every OBEX object: ObxObjectGetArea, ObxObjectGetDateCreated, ObxObjectGetDateLastModified, ObxObjectGetDeclaration, ObxObjectGetDescription, ObxObjectGetId, ObxObjectGetKey, ObxObjectGetNumberOfVersions, ObxObjectGetPublishArea, ObxObjectGetPublisher, ObxObjectGetSubscribers, ObxObjectGetValue, ObxObjectIsIndividual, ObxObjectIsPublication, and ObxObjectIsSubscription.

2. Task: Mailing and Publishing

Publishing provides an easy way to send data while maintaining control over its modification and revisions. Mailing is a one-time transmission of an object.

(a) Adding addresses to subscriber lists

A subscriber list is attached to a publication form to specify a publication has been received. To add an address to a subscriber list, first, either a new subscriber list must be created using ObxPubFormGetBlankSubscribers, or a handle to an existing subscriber list is acquired using ObxObjectGetSubscribers.

Next, an address is added from an address book entry or the address is specified using OBEX addressing guidelines. Then the subscriber is added using ObxSubscribersAdd. It must also be specified whether the subscriber is to receive the published object automatically or is only offered the subscription. This step and the previous one is repeated for each address to add.

ObxObjectUpdateSubscribers is used to update the list and to send new subscribers the current version of the publication. ObxObjectUpdateSubscribersNextVersion is used instead when sending the next version of the publication to new subscribers. Finally, ObxPubFormSetSubscribers saves the subscriber list.

(b) Creating Mail

Mail is a special type of OBEX object that is not published. Mail is sent to another OBEX user without version control or the need to subscribe. ObxGetBlankMail is used to create a blank mail form. ObxMailSetSubject specifies the subject of the mail. ObxMailSetCoverLetter attaches text to the mail that describes it in further detail than the subject. If desired, ObxMailAddAttachment or ObxMailAddAttachmentWithName may be used to include files with the mail.

Next, the list of addresses is created to track receipt of the mail. An address is needed to add from an address book entry or the address may be specified using OBEX addressing guidelines. ObxMailAddTo adds information to the mail's TO list. ObxMailAddCc sends the object to the address as a courtesy copy. This step is repeated for each address to add. ObxMailSend sends the mail.

(c) Issuing a new version

After an object is created, a version must be issued before publication. To issue a version of an object, a handle to the object is created or opened. ObxObjectCreateVersion creates a new version. ObxVersionAdd or ObxVersionAddWithType adds data to the object. These functions can add text, files, or clipboard data to the object. ObxObjectIssue saves the new version and issues it.

(d) Monitoring a subscriber list

When a subscription is cancelled or a subscription offer is rejected, the subscriber list is automatically updated in the publisher's object stores. When this occurs, ObxSubscribersNotifyOnUpdate specifies a procedure to call. The callback procedure specified can then get the subscriber list and check it for changes.

(e) Getting a subscriber list

Subscriber lists store addresses and information on the status of each subscriber (whether or not an offer has been accepted or rejected, whether or not the subscription has been cancelled). To get the subscriber list, a handle to the object containing the subscriber list is opened. Next, ObxObjectGetSubscribers gets a handle to the subscriber list. The following functions may be used to review subscriber information: ObxSubscribersGetAddress, ObxSubscribersGetCountOf, ObxSubscribersGetOffer, ObxSubscriberGetOfferFromName, ObxSubscribersGetStatus, and ObxSubscribersGetStatusFromName.

(f) Opening Mail

To open mail, the ID or key of the mail to open must first be located. These identification strings may be found by opening the area containing the mail and reviewing its table of contents. ObxGetMail gets a handle to the mail. The following functions may be used to review mail information: ObxMailGetAttachment, ObxMailGetAttachmentCount, ObxMailGetAttachmentName, ObxMailGetCc, ObxMailGetCcCount, ObxMailGetCoverLetter, ObxMailGetFrom, ObxMailGetSubject, ObxMailGetTo, and ObxMailGetToCount.

(g) Publishing an object

Publishing enables an object to be sent to other OBEX users so they can incorporate the object's data into their applications. To publish a new object, the new object is created which is a base on which the other versions of the object are built.

Next, the first version of the object is issued. This is the step where data is added to the object using user-defined properties. Then a blank publication form is created using ObxObjectGetBlankPubForm. If desired, the area to store the published object may be specified (in the subscriber's object store) using ObxPubFormSetArea. Published objects are stored in the Subscription area by default.

ObxPubFormSetAnnouncement specifies a description of the new publication. If only a publication is being offered to the subscriber, this text appears with the offer to help the subscriber decide whether to accept it or not. Next, ObxPubFormGetBlankSubscribers creates a subscriber list for the publication then adds addresses to it. The subscription list also specifies whether users automatically receive the publication or are only sent an offer to subscribe.

Finally, the publication form publishes the version. Two functions can publish an object; the function to use depends on how OBEX will handle accepted subscription offers. ObxPublish sends the current version to subscribers that accept; ObxPublishNextVersion sends the next version.

(h) Removing a subscriber address

Subscribers who decline a subscription offer or cancel their subscription are automatically removed from the subsciber list. ObxObjectGetSubscribers gets a handle to a sub to remove subscribers from a list manually. ObxSubscribersEmpty removes all addresses from the list. ObxSubscribersGetAddress removes individual addresses then ObxSubscribersRemove removes the address. This step is repeated for each address to remove. ObxObjectUpdateSubscribers updates the subscriber list, and ObxPubFormSetSubscribers saves the revised subscriber list.

3. Task: Subscribing

Subscribing lets one user use another OBEX user's data without the worry of not receiving updates. Subscription offers are available, eliminating the need to subscribe to unwanted data.

(a) Accepting/rejecting a subscription offer

Offers are useful when the published object is large or not required. To accept an offer, the offer is opened, then accepted using ObxObjectAcceptSubscription. A message is sent to the publisher's OBEX on the next poll. To reject an offer, the offer is opened, then rejected using ObxObjectRejectSubscription. A message is sent to the publisher's OBEX on the next poll. If an object is sent without an offer, the subscription may be cancelled so that no new versions will be received.

(b) Retrieving object properties

Information may be sent to other OBEX users by adding user-defined properties to an object. User-defined properties can contain strings, files, or clipboard data. To view an object's user-defined properties, the object is first opened, then ObxObjectGetCountOfUserProperties determines the number of user-defined properties. ObxObjectGetUserProperty is called for each property attached to the object. This retrieves the property names. ObxObjectGetValueOfUserProperty is called for each property attached to the object. This retrieves the property value.

The following functions retrieve property values common to every OBEX object: ObxObjectGetArea, ObxObjectGetDateCreated, ObxObjectGetDateLastModified, ObxObjectGetDeclaration, ObxObjectGetDescription, ObxObjectGetId, ObxObjectGetKey, ObxObjectGetNumberOfVersions, ObxObjectGetPublishArea, ObxObjectGetPublisher, ObxObjectGetSubscribers, ObxObjectGetValue, ObxObjectIsIndividual, ObxObjectIsPublication, and ObxObjectIsSubscription.

(c) Monitoring an object for changes

When OBEX creates a new version of an existing object in the object store, or an object is removed, ObxObjectNotifyOnUpdate specifies a procedure to call. The callback procedure specified can then open the object and check it for changes.

4. Task: Managing Accounts

OBEX uses accounts to send and receive objects. Accounts provide information that OBEX uses to access messaging services such as MCI Mail.

(a) Creating an account

A blank account form is created using ObxGetBlankAccount. This step specifies a name for the account along with what messaging service it uses. Next ObxAccountSetTransportParam specifies information that OBEX uses to access the messaging service. For example, LAN accounts need a post office directory and mailbox name. ObxAccountSetManual is used if the account is polled manually. ObxAccountSetAutomatic is used if the account is polled automatically, and ObxAccountSetPollFrequency specifies how frequently the account is polled and specifies whether it's polled all day or only part of the day, as follows: ObxAccountSetAllDay is used for all day polling. ObxAccountSetPartDayFor is used for polling only part of the day. ObxAccountSetPollFrom and ObxAccountSetPollTo specify when to start and stop polling. ObxAccountSetPrimary makes this account the primary account. ObxAccountSetActive makes the account active. Finally, ObxUpdateAccount saves the account.

(b) Configuring an account

To configure an existing account, the account is first opened. Then the following functions are used to change account settings: ObxAccountSetActive, ObxAccountSetAllDay, ObxAccountSetAutomatic, ObxAccountSetManual, ObxAccountSetPartDay, ObxAccountSetPollFrequency, ObxAccountSetPollFrom, ObxAccountSetPollTo, ObxAccountSetPrimary, ObxAccountSetTransportParam. ObxUpdateAccount saves the account changes.

(c) Opening an account

To open an account, either ObxGetAccount or ObxGetAccountByName may be used to get a handle to the account. The following functions are used to review account settings: ObxAccountGetName, ObxAccountGetPollFrequencyHours, ObxAccountGetPollFrequencyMinutes, ObxAccountGetPollFrequencySeconds, ObxAccountGetPollFromHours, ObxAccountGetPollFromMinutes, ObxAccountGetPollFromSeconds, ObxAccountGetPollToHours, ObxAccountGetPollToMinutes, ObxAccountGetPollToSeconds, ObxAccountGetTransportName, ObxAccountGetTransportParam (d) Polling an account OBEX maintains a list of accounts to poll. ObxAddAccountToPollQueue adds accounts to this list. Only active accounts may be polled (which are activated using ObxAccountSetActive).

5. Task: Managing Addresses

OBEX provides address books for keeping track of OBEX users. Users may be organized into groups within the address book to simplify mailing and publishing.

(a) Adding an address book entry

At the top level of every address book is a list of groups. Each group contains entries that correspond to one OBEX user. Each entry can contain multiple addresses, and represent the recipient of the objects. When creating an entry, ObxOpenAddressBook is used to open an address book. Either ObxABGetGroup or ObxABGetGroupByName is used to get the group to which the entry is added. ObxGroupGetBlankEntry creates a blank entry form. Next, addresses are added to the entry using ObxEntrySetAlias, ObxEntrySetFirstName, ObxEntrySetLastName, ObxEntrySetMiddleInitial, and ObxEntrySetOrganization. Finally, ObxGroupUpdateEntry saves the entry.

(b) Adding a group

At the top level of every address book is a list of groups. Each group contains entries that correspond to one OBEX user. Groups represent lists of users to which objects are commonly sent. To create a group, ObxOpenAddressBook first opens an address book. ObxABAddGroup opens a blank group form, then entries to group are added, one for each group member.

(c) Adding an address

At the top level of every address book is a list of groups. Each group contains entries that correspond to one OBEX user. Entries represent the person to which the objects are sent; each entry can contain multiple addresses. To add addresses to an entry, ObxOpenAddressBook first opens an address book. ObxABGetGroup or ObxABGetGroupByName gets a handle to the group. Next, either a handle is created, or ObxGroupGetEntry or ObxGroupGetEntryByAlias is used to get a handle to the entry. Then, ObxEntryGetBlankAddress creates a blank address form. The address is specified using the following functions: ObxAddressSetService, ObxAddressSetDescription, or ObxAddressSetConcreteAddress. ObxEntryUpdateAddress saves the address.

(d) Getting an address

To get addresses from an address book, ObxOpenAddressBook is first used to open the address book. Next, ObxABGetGroup or ObxABGetGroupByName is used get a handle to the group, then ObxGroupGetEntry or ObxGroupGetEntryByAlias is used to get a handle to the entry. Next, ObxEntryGetAddress or ObxEntryGetAddressByDescription is used to get the address. The following functions may be used to review the address: ObxAddressGetService, ObxAddressGetDescription, or ObxAddressGetConcreteAddress.

(e) Editing an address

To edit addresses in an address book entry, the ObxOpenAddressBook function first opens an address book, then ObxABGetGroup or ObxABGetGroupByName get a handle to the group. Next, ObxGroupGetEntry or ObxGroupGetEntryByAlias get a handle to the entry, and ObxEntryGetAddress ObxEntryGetAddressByDescription get the address. Next, ObxAddressSetService, ObxAddressSetDescription, or ObxAddressSetConcreteAddress specify the address using the following functions: ObxEntryUpdateAddress saves the address, then steps 4 through 6 for each address to edit are repeated, and ObxGroupUpdateEntry saves the entry.

(f) Removing a group

To remove a group from an address book, first ObxOpenAddressBook opens the address book, then ObxABRemoveGroup removes the group.

6. Task: Managing OBEX Areas

Areas in OBEX let object stores be organized and sorted objects by application or purpose.

(a) Creating an area

Areas in OBEX help organize objects and store and sort objects by application or purpose. ObxCreateArea creates an area in OBEX.

(b) Opening an area

An area may be monitored for changes or OBEX monitored to see if areas are removed or added. ObxGetArea or ObxGetAreaByName open an area definition for editing. ObxAreaGetDescription or ObxAreaGetName review area settings. A group may also be opened to list its contents.

(c) Listing an area's contents

Every OBEX area has a table of contents (or TOC) associated with it that provides easy access to the contents in the area. To list an area's TOC, ObxGetArea or ObxGetAreaByName open the area. ObxAreaGetTOC gets a handle to the area TOC. The area TOC contains an entry for each object in the area. ObxAreaTocGetCount finds the total number of objects in an area. The following functions review a specific object in the area. Each function uses the TOC handle and an index into the TOC. For example, to retrieve information about the first object in the area, the TOC handle and the index number 1 are passed to one or more of the following functions: ObxAreaTocGetDateCreated, ObxAreaTocGetDateLastModified, ObxAreaTocGetDescription, ObxAreaTocGetId, ObxAreaTocGetKey, ObxAreaTocGetLocalTag, ObxAreaTocGetNumberOfVersions, ObxAreaTocGetPublisher.

(d) Deleting an area

To remove an area from OBEX, ObxGetArea or ObxGetAreaByName opens the area, then ObxDeleteArea deletes it.

(e) Monitoring an area for changes

There are two functions which can specify procedures to call when an area changes. First, the area is opened before using either of the following functions: (1) ObxAreaTocNotifyOnUpdate calls a procedure when objects are removed, added, or changed in an area; and (2) ObxAreasInfoNotifyOnUpdate calls a procedure when the OBEX list of areas changes (new areas may be added, removed, and so on).

7. Task: Managing OBEX (a) Connecting to OBEX

To perform any OBEX tasks a connection must first be established using ObxEnableConnection. This establishes a DDE link between the application and OBEX. When the application is finished, ObxDisableConnection closes the connection. This also frees up any resources still allocated to the API.

(b) Getting information from OBEX

Once a connection is established with OBEX the following functions are used to check its status: ObxAreasInfoGetCount gets the number of OBEX areas in the user's object store. ObxAreasInfoGetDescriptions gets the descriptions of all the OBEX areas in the user's object store. ObxAreasInfoGetNames gets the names of all the OBEX areas in the user's object store. ObxAreasInfoNotifyOnUpdate specifies a callback procedure to call when the specified AREASINFO changes. ObxGetAccountBeingPolled gets the name of the account being polled. ObxGetAreasInfo gets a handle used to reference information about all OBEX areas. ObxGetCountOfAccounts gets the number of accounts that exist in OBEX. ObxGetCountOfAreas gets the number of areas in OBEX. ObxGetErrorCode gets the error code of the last error that occurred in OBEX. ObxGetErrorText gets text describing the last error that occurred in OBEX. ObxGetTotalOutgoing gets the total number of outgoing objects (declarations, mailed objects, published objects). ObxIsPolling checks if OBEX is currently polling accounts. The following functions specify procedures to call when an aspect of OBEX changes: ObxAreaTocNotifyOnUpdate specifies a callback procedure to call when the specified AREATOC changes. ObxAreasInfoNotifyOnUpdate specifies a callback procedure to call when the specified AREASINFO changes. ObxObjectNotifyOnUpdate specifies a procedure to call when an object is updated. ObxSubscribersNotifyOnUpdate sets a procedure to call when a subscriber list is updated.

(c) Checking polling status

ObxIsPolling checks whether OBEX is polling. ObxGetAccountBeingPolled gets the name of the account being polled.

(d) Cancelling a poll

ObxCancelPoll cancels all polling. ObxRemoveAccountFromPollQueue removes a specific account from the list of accounts to poll.

F. Form Negotiation Protocol

Figure 8:
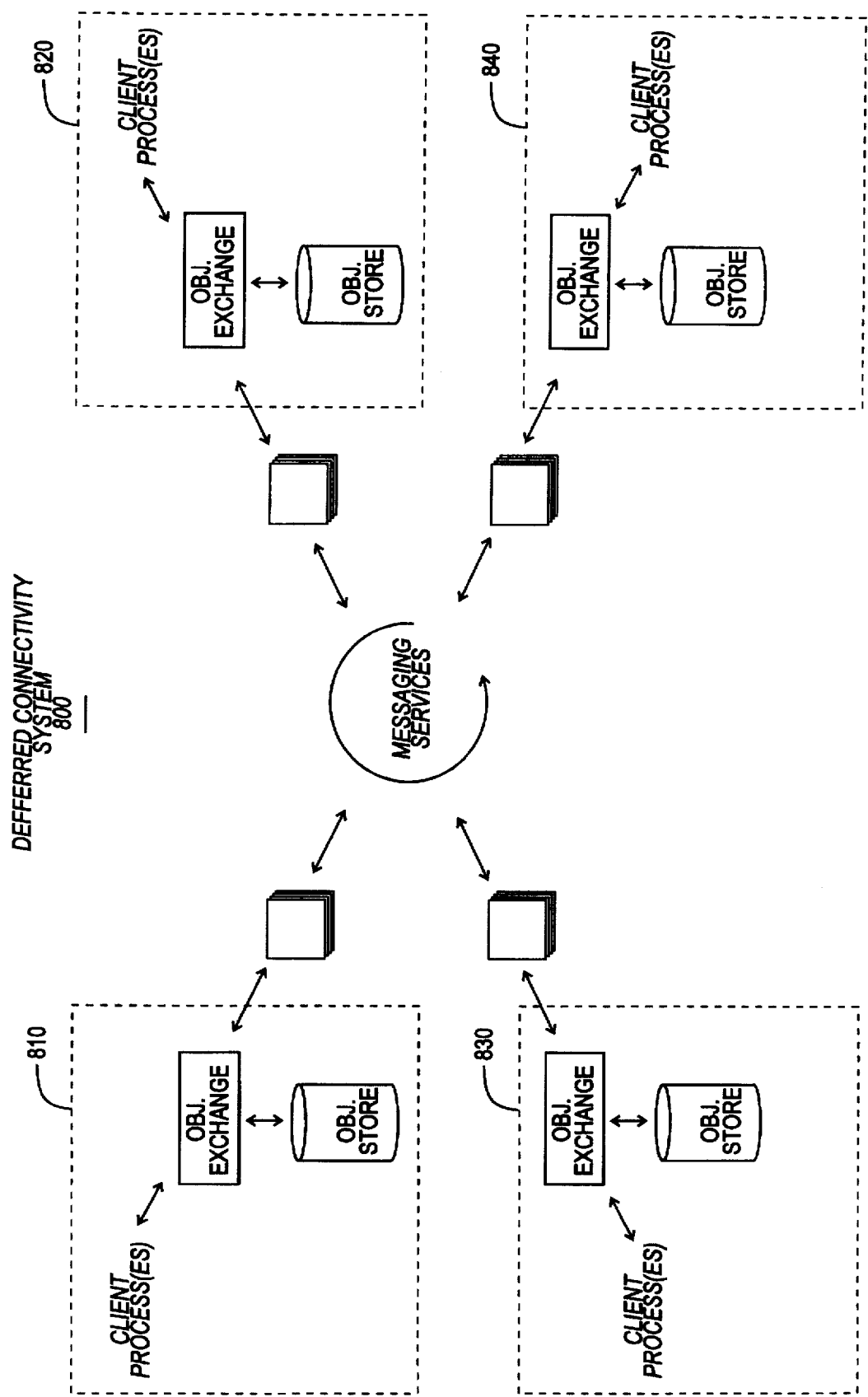
FIG. 8 is a block diagram illustrating connecting remote object exchanges through one or more messaging services in accordance with the present invention, thereby establishing a deferred connectivity workgroup system.

FIG. 8 summarizes a workgroup system 800 of the present invention. The system comprises a plurality of workgroup members 810, 820, 830, 840 connected together through any convenient messaging system. Each member has his/her own (private) Object Exchange with an Object Manager which effects actions by posting messages or "forms" to either the local Object Exchange (assuming one is the publisher) or the Object Exchange of others (subscribers). Connectivity for the system is provided by the various Object Exchange engines negotiating forms. Each Object Exchange posts and retrieves forms at polling intervals (which may be set to continuous polling). In this fashion, the system provides "deferred connectivity," allowing members to contribute to the workgroup—freely exchanging data objects—without being constrained in place or time. The protocol of distributing objects is, therefore, one of negotiating forms between various Object Exchange engines.

Figure 9A:
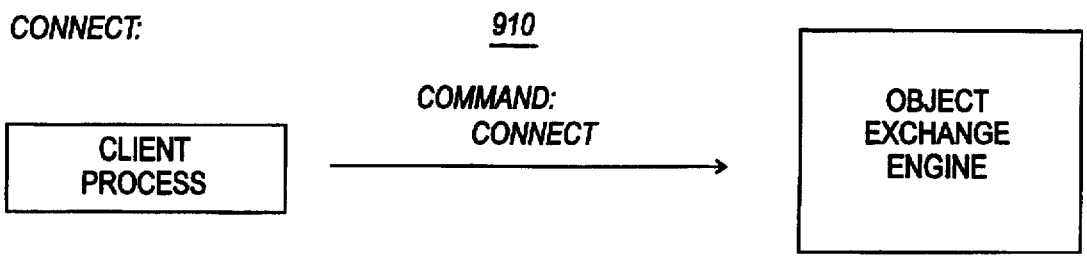
FIGS. 9A–G are block diagrams illustrating a distributed object protocol of the present invention.

The distributed object protocol is illustrated by a series of transactions shown in FIGS. 9A–H. As shown in FIG. 9A, a client process (i.e., application subscribing to the services of the Object Exchange Engine) initiates an Object Exchange session by sending a "Connect" command 910 to the Object Manager as follows:

CT.Connect("Object Exchange", "Object Manager");

Once connected, the application may "poke" commands for requesting services of the Manager. The application may, on the other hand, submit a "request" for information, for getting back information about an object in the Object Exchange.

Figure 9B:
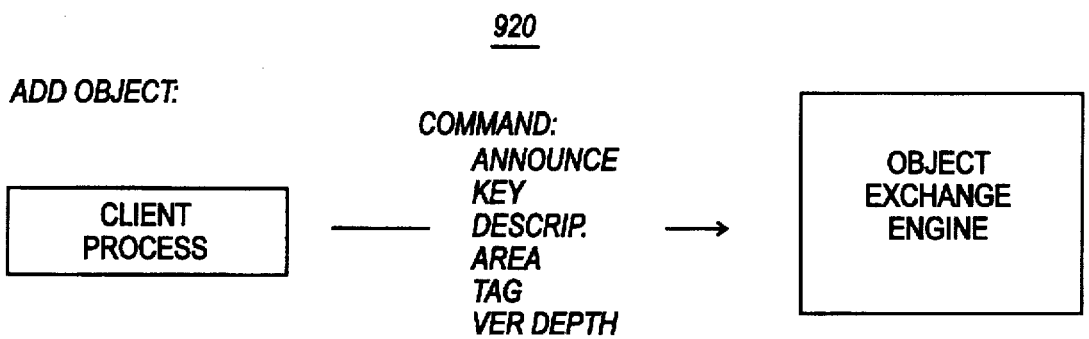

The task of creating and publishing an object proceeds as follows. After establishing a connection, the application inserts a new object in the Object Store. This can be done by issuing an "Object Announce" command 920 to the Object Manager, as shown in FIG. 9B:

---

CT.Poke("Object.Announce", "Yes");
CT.Poke("Object.Key", "Agents Worldwide");
CT.Poke("Object.Description", "Agents Listing.");
CT.Poke("Object.Area", "Spooks");
CT.Poke("Object.Tag", "Notebook, Diplomacy");
CT.Poke("Object.Version Depth", "2");
CT.Poke("Object.Ok", "Yes");

---

Here, the application issues a series of "poke" commands, for poking information about the object in the Object Exchange. As shown, a key, an area (for assisting the recipient in filing), a description (announcement text), and a version depth are poked. Although the announcement includes information about the object, it does not actually issue a version of that object. In other words, the announcement is just a declaration about the object; it is not (a copy of) the object. The object itself is stored in the Object Store 760 when the application issues a "store" command.

As previously described, objects are stored in "areas," such as subdirectories of a file management system (e.g., MS-DOS). Other logical storage schemes may be employed, as desired. Within a storage area, each object is identified by a unique ID and a key. The unique ID is a global identifier which, in a preferred embodiment, includes a time/date stamp (e.g., derived from a system clock). This allows an object to be identified uniquely on a global basis (i.e., among disparate Object Exchange Engines). The key, on the other hand, is a local identifier, typically including descriptive text which is meaningful to the user; in essence, it is a user friendly version of the ID. The key is sent with the announcement, so that the publisher and subscriber can "talk" the same language. In the event that the key is already in use, it will be ignored when processed by the subscriber. As shown above, objects also include a "tag" for storing information, such as key words, which are useful in determining where the object should be stored.

Figure 9C:
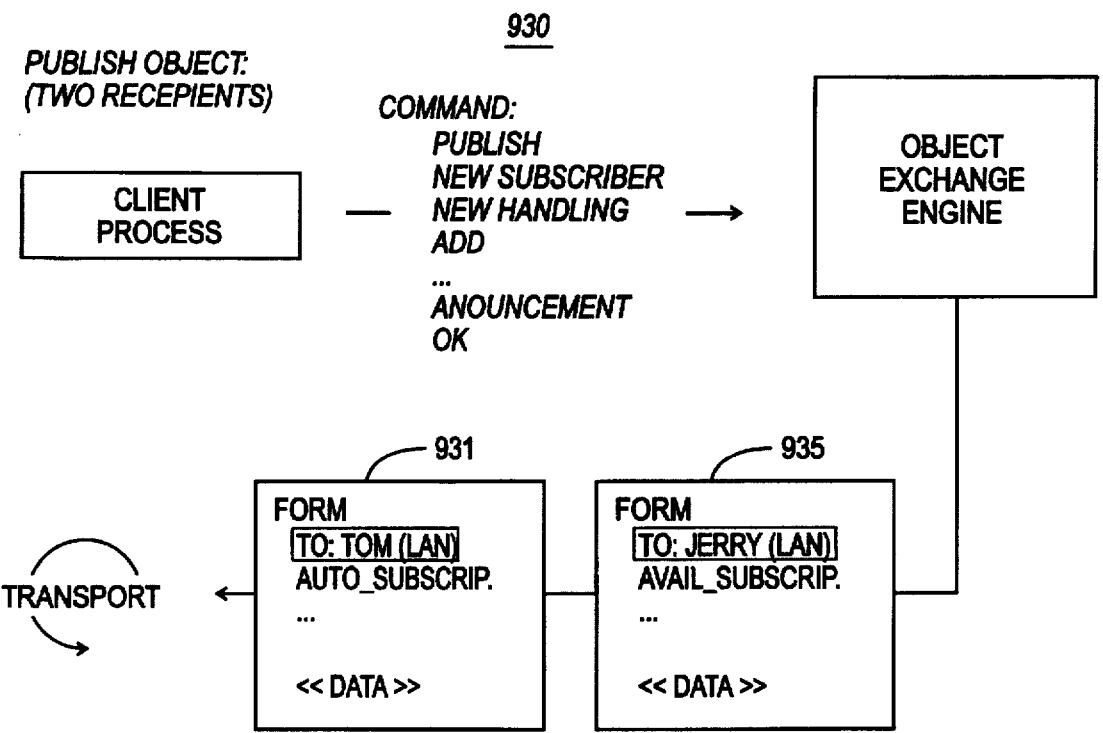

The object is published upon issuing a "publish" command 930, as illustrated in FIG. 9C. This is perhaps best explained by example. Consider, for instance, a data object to be published to two people, Tom (LAN) and Jerry (LAN). Here, "(LAN)" specifies the root for the address, that is where to find the address "Tom" and "Jerry". In this case, the root is just a transport name—the Object Exchange LAN transport.

Publication to these potential subscribers can occur in two forms: available ("ask") subscriptions and automatic ("don't ask") subscriptions. When an object is published on an "ask" basis, announcement of an available subscription is sent to subscribers. Subscribers may "accept" or "reject" the subscription. The former reply makes the subscriber active; the latter reply removes the subscriber from the authorized list. Subscribers who accept the subscription receive versions of the object.

"Don't ask" instructs the Object Exchange to send an "automatic subscription"—that is, one that does not require consent by the subscriber. Objects of this type are announced to users in a manner similar to normal E-mail: announcement (i.e., the declaration part) of the object arrives at the in-boxes of users, without asking those users beforehand. This requires the subscriber to respond by accepting the subscription. Once the reply is processed by the publisher, subsequent issues are automatically sent.

As shown in FIG. 9C, an exemplary publish commands 930, including both automatic and available subscriptions, may be created by the following Object Manager calls:

```
CT.Poke("Object.Publish", "Yes");.
CT.Poke("Publish.New Subscriber", "Tom (lan)");
CT.Poke("Publish.New Handling", "Don't Ask");
CT.Poke("Publish.Add", "yes");
CT.Poke("Publish.New Subscriber", "Jerry (lan)");
CT.Poke("Publish.New Handling", "Ask");
CT.Poke("Publish.Add", "yes");
CT.Poke("Publish.Announcement", "List of agents worldwide.");
CT.Poke("Object.Ok", "Yes");
```

Upon receiving the foregoing form, the Object Manager in turn produces two forms—Auto Subscription forms 931 and Available Subscription form 935. The forms are structured as follows:

First Form:

From: jim (Lan)
    To: Tom (Lan)
    Subject: *Obex Form* - AutomaticSubscription
    Publish.Description: Agents Listing.
    Publish.Version Type: Full
    Publish.Version Order: Date Issued
    Publish.Version Share: Off
    Publish.Tag: Notebook, Diplomacy
    Publish.Version Depth: 2
    Publish.Id: &1118010608081993
    Publish.Key: Agents Worldwide
    Publish.Area: Spooks
    List of agents worldwide.

Second Form:

From: jim (Lan)
    To: Jerry (Lan)
    Subject: *Obex Form* - AvailableSubscription
    Publish.Description: Agents Listing.
    Publish.Version Type: Full
    Publish.Version Order: Date Issued
    Publish.Version Share: Off
    Publish.Tag: Notebook, Diplomacy
    Publish.Version Depth: 2
    Publish.Id: &1118010608081993
    Publish.Key: Agents Worldwide
    Publish.Area: Spooks
    Form-Name: AvailableSubscription
    List of agents worldwide.

Figure 9D:
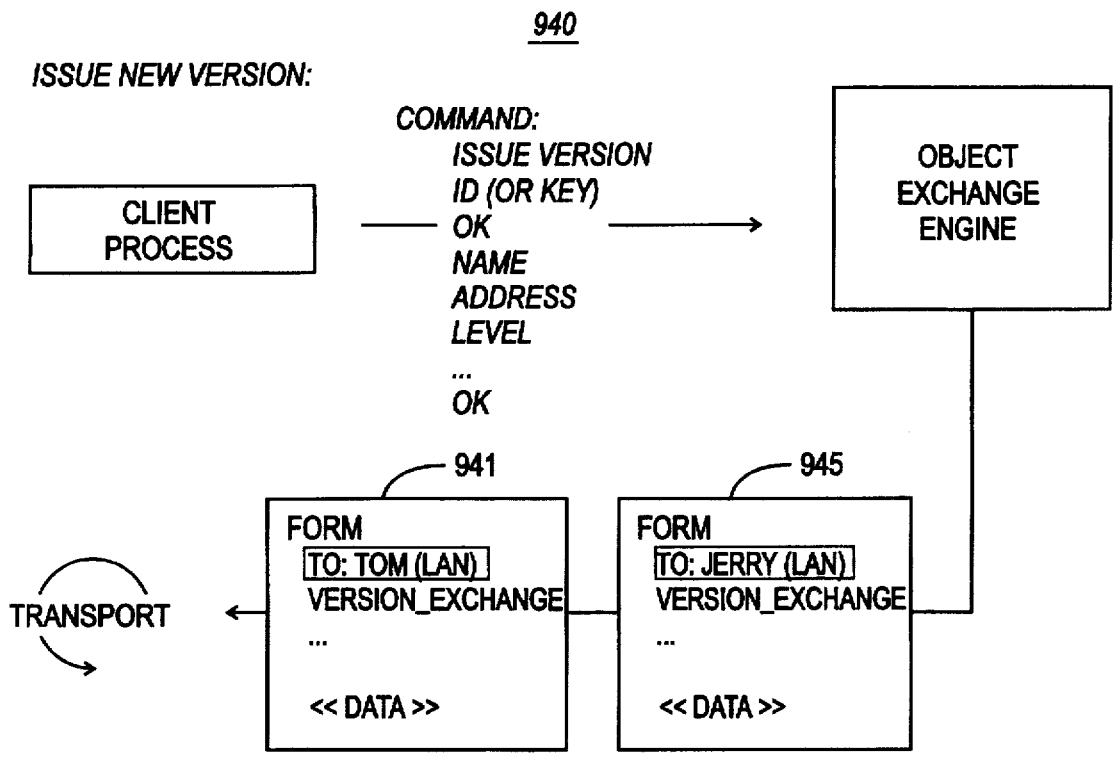

A version of the publication may now be issued. If a subscriber has linked his or her application (client process) to the Object Exchange through a DDE "hot link" (see Petzold supra for detailed description), when a new version is picked up the subscriber will automatically be updated. As shown in FIG. 9D, the Object Exchange receives issue command 940 to issue a new version as follows:

```
CT.Poke("Object.Issue Version", "Yes");
CT.Poke("Open.Id or Key", "Agents Worldwide");
CT.Poke("Object.Ok", "Yes");
```

Recall that forms serve as containers for data objects. Accordingly, data for the object may be inserted in the Object Exchange via poke commands. For the example at hand, text data (sales lists) is inserted by the following commands:

```
CT.Poke ("Name", "Fred Jones");
CT.Poke("Address", "10 Oak St. Somerville, MA");
CT.Poke("Level", "Senior");
CT.Poke ("Name", "Dave Jones") ;
CT.Poke("Address", "375 Main St. Portsmouth, NH");
CT.Poke("Level", "Junior");
CT.Poke("Object.Ok", "Yes");
```

The Object Exchange, in turn, creates two forms: Version Exchange forms 951, 955. Form 951, in this example, includes the following (header followed by data):

From: Jim (Lan)
    To: Tom (Lan)
    Subject: *Obex Form* - Version Exchange
    Version-Of: &1118010608081993
    Object.Description: Agents Listing.

```
Object.DateCreated: Sun, 08 Aug 93 13:27:31.00 WED
Version.Id: &1127310508081993
Version.Date: Sun, 08 Aug 93 13:27:31.00 WED
Name: Fred Jones
Name: Dave Jones
Address: 10 Oak St. Somerville, MA
Address: 375 Main St. Portsmouth, NH
Level: Senior
Level: Junior
```

Figure 9E:
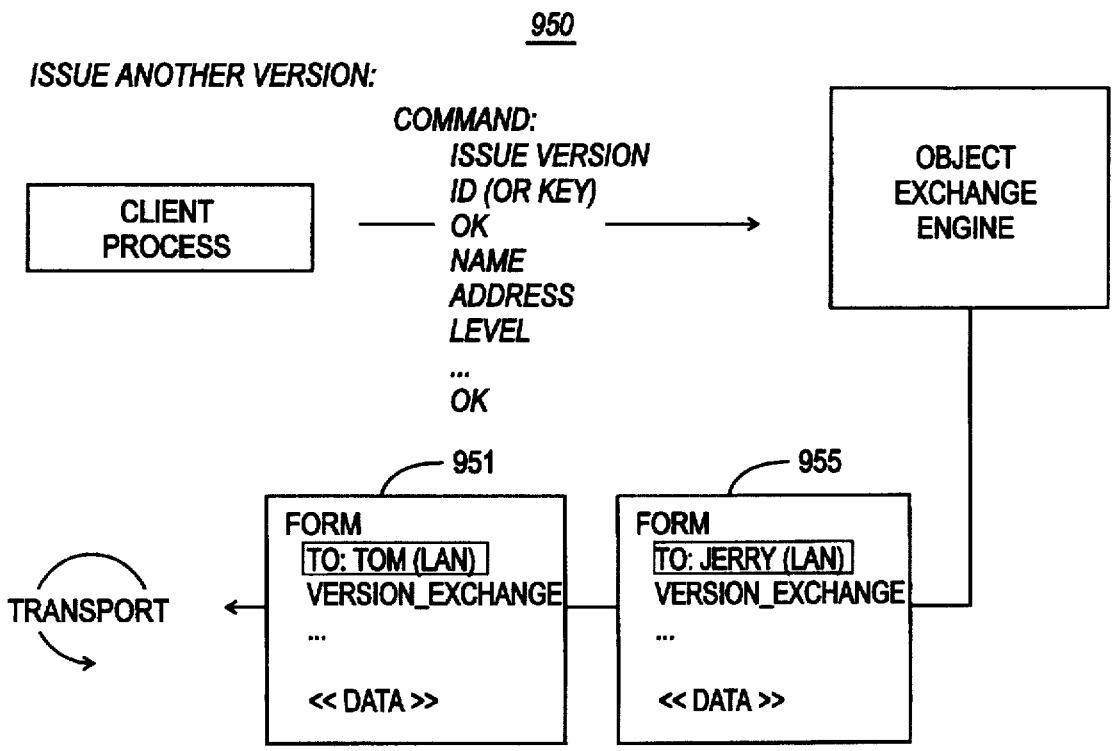

Now, subsequent versions may be issued. (Recall for this example that the publisher set the version depth equal to 2.) The Object Store stores the two most recent versions. When another version is issued, the oldest version is deleted. As shown in FIG. 9E for the present example, a new version may be created by issuing command 950 (followed by data poking commands):

```
CT.Poke("Object.Issue Version", "Yes");
CT.Poke("Open.Id or Key", "Agents Worldwide");
CT.Poke ("Object.Ok", "Yes");
    CT.Poke("Name", "Fred Jones") ;
    CT.Poke("Address", "10 Oak St. Somerville, MA");
    CT.Poke("Level", "Senior");
    CT.Poke("Name", "Dave Jones");
    CT.Poke("Address", "375 Main St. Portsmouth, NH");
    CT.Poke("Level", "Junior");
    CT.Poke("Name", "Zachery Smith");
    CT.Poke("Address", "400 Auburn Rd. Manchester, NH");
    CT.Poke("Level ", "Senior");
CT.Poke("Object.Ok", "Yes");
```

This produces two forms, forms 951, 955. Form 951 (header plus data) is structured as follows:

```
From: Jim (Lan)
To: Tom (Lan)
Subject: *Obex Form* - Version Exchange
Version-Of: &1118010608081993
Object.Description: Agents Listing.
Object.DateCreated: Sun, 08 Aug 93 13:27:31.00 WED
Version.Id: &1134110108081993
Version.Date: Sun, 08 Aug 93 13:34:11.00 WED
Name: Fred Jones
Name: Dave Jones
Name: Zachery Smith
Address: 10 Oak St. Somerville, MA
Address: 375 Main St. Portsmouth, NH
Address: 400 Auburn Rd. Manchester, NH
Level: Senior
Level: Junior
Level: Senior
```

Figure 9F:
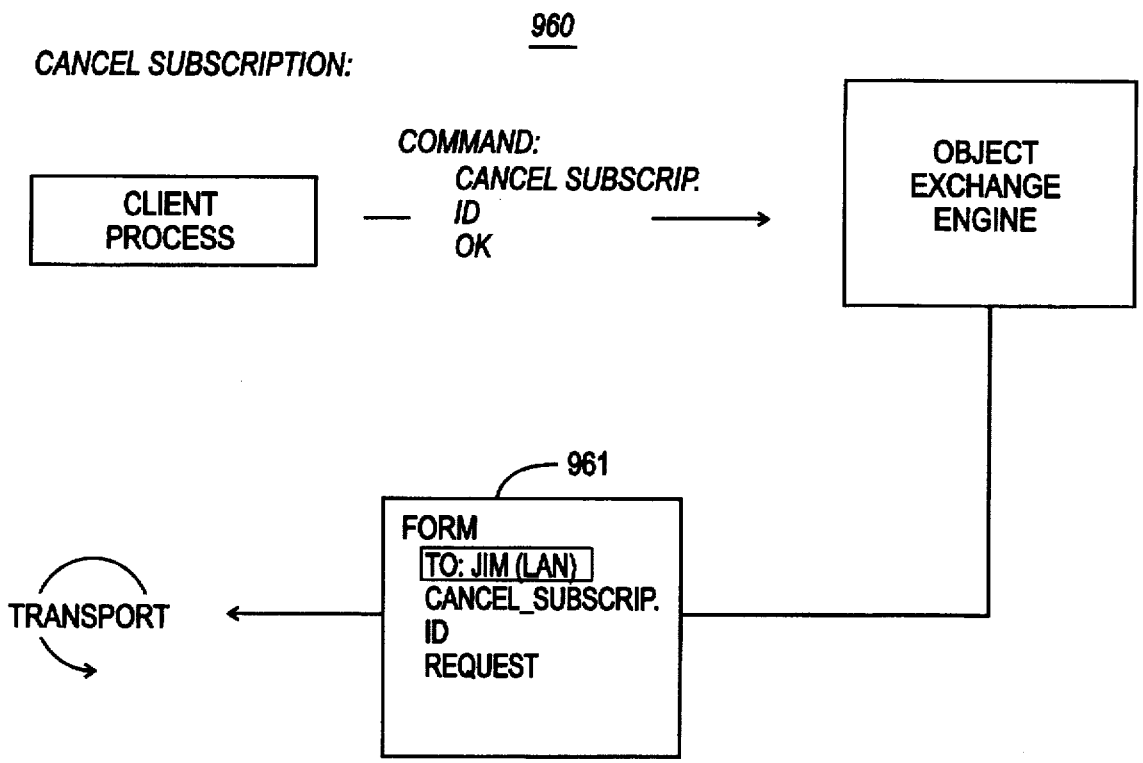

As shown by FIG. 9F, a subscriber can cancel a subscription at any time. A subscriber may request cancellation of a subscription by issuing cancel subscription command 960:

```
CT.Poke("Object.Cancel Subscription", "Yes");
CT.Poke("Open.Id or Key", "Agents Worldwide");
CT.Poke("Object.Ok", "Yes");
```

For the instant example, the Object Exchange Engine generates form 961, which instructs the Object Exchange of Jim that Tom no longer desires to be a subscriber. Form 961 is constructed as:

```
From: tom (Lan)
To: jim (Lan)
Subject: *Obex Form* - CancelSubscription
Cancel.Id: Agents Worldwide
Cancel.Request: Remove
```

The process of form negotiation for the "Ask" subscriber (Jerry) will now be described. When a potential subscriber, such as Jerry in this example, has an "available subscription form", that user can accept or reject. Shown in FIG. 9G, an "accept" command 970 (from subscriber Jerry to his Object Exchange) may be issued as:

```
CT.Poke("Object.Open", "Yes");
CT.Poke("Open. Id or Key", "Announce.Agents Worldwide");
CT.Poke("Object.Ok", "Yes");
CT.Poke("Subscription.Accept", "Yes");
```

This causes Jerry's Object Exchange to in turn produce an acceptance form 975 which it registers with itself. The form includes the following exemplary information:

```
From: jerry
To: Obex
Subject: RE:*Obex Form* - LocalAvailableSubscription
RepId: Sun, 08 Aug 93 23:14:33.00 WED
Subscribe.Response: Accept
```

Jerry's Object Exchange now sets up the subscribed object in its Object Store (effectively, as though Jerry had done an "object.announce"). Jerry's Object Exchange also sends form 971 to Jim accepting his subscription offer:

```
From: jerry (Lan)
To: jim (Lan)
Subject: RE:*Obex Form* - RemoteAvailableSubscription
Subscribe.Locator: &2114300208081993
Subscribe.Response: Accept
```

Finally, Jim's Object Exchange sends out the latest version 977, if any, in response to Jerry accepting his subscription offer:

```
From: Jim (Lan)
To: Jerry (Lan)
Subject: *Obex Form* - Version Exchange
Version-Of: &1118010608081993
Object.Description: Agents Listing.
Object.DateCreated: Sun, 08 Aug 93 13:27:31.00 WED
Version.Id: &1134110108081993
Version.Date: Sun, 08 Aug 93 13:34:11.00 WED
Name: Fred Jones
Name: Dave Jones
Name: Zachery Smith
Address: 10 Oak St. Somerville, MA
Address: 375 Main St. Portsmouth, NH
Address: 400 Auburn Rd. Manchester, NH
Level: Senior
Level: Junior
Level: Senior
```

Figure 9H:
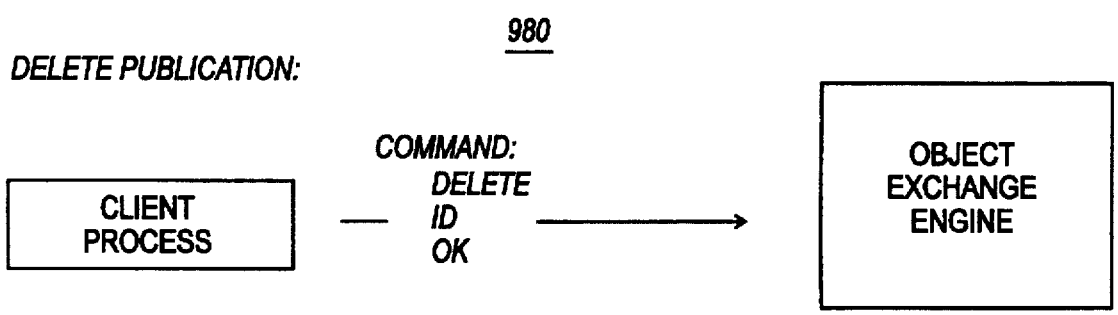
Figure 9G:
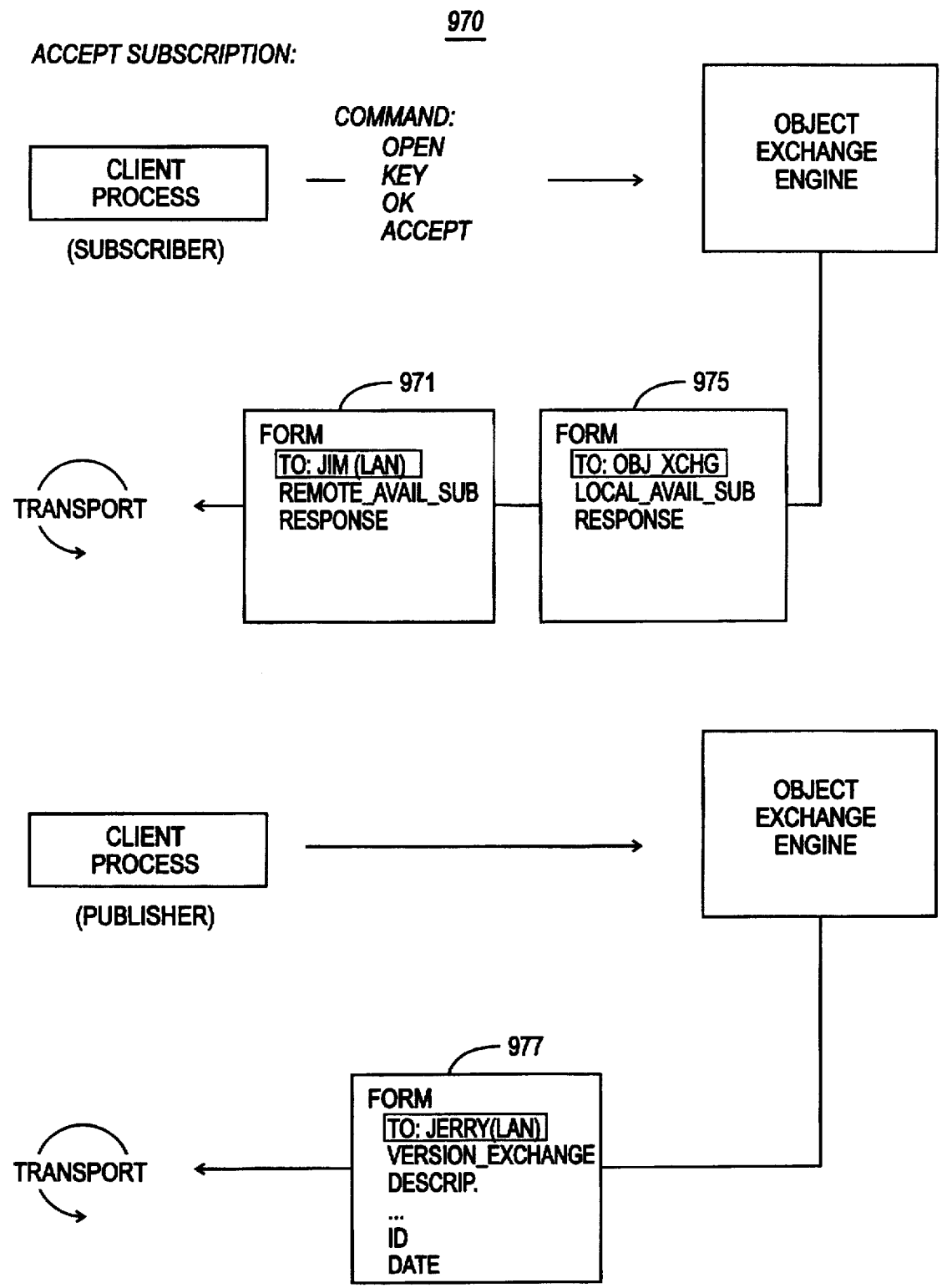

A publisher, such as Jim, can delete a publication at any time. To do so, the delete command 980, shown in FIG. 9H, are issued to the Object Exchange:

```
CT.Poke("Object.Delete", "Yes");
CT.Poke("Open.Id or Key", "Agents Worldwide");
CT.Poke("Object.Ok", "Yes");
```

Attached hereto as an Appendix A are commented source code listings of an exemplary program demonstrating basic features and function calls of the OBEX API of the present invention; the program allows small snippets of text, or sendits, to be published to other users. A suitable compiler for compiling and linking the code is available from several vendors, including Borland International of Scotts Valley, Calif. Also attached hereto is an Appendix B containing additional reference materials providing additional description for the present invention.

While the invention is described in some detail with specific reference to a single preferred embodiment and certain alternatives, there is no intent to limit the invention to that particular embodiment or those specific alternatives. For instance, although the foregoing example has focused on sharing spreadsheet pages, the type of data sent is not restricted to any particular data type. Instead, the present invention may be applied to any desired granularity of data object, including a spreadsheet notebook, a database table, a bitmap graphic, or other data "object." Thus, the true scope of the present invention is not limited to any one of the foregoing exemplary embodiments but is instead defined by the appended claims.

What is claimed is:

1. In a data processing system, a method for sharing data objects among users of a work group according to user-specified criteria, said method comprising:
   (a) receiving a publication request from one user of the work group for establishing a data sharing relationship with other users of the work group, said request identifying a particular data object which is to be shared and further specifying user-specified criteria establishing conditions under which the particular data object may be shared;
   (b) storing a copy of said particular data object locally in an object store;
   (c) based on said user-specified criteria, sending a publication offer as an electronic mail message to a plurality of other users of the work group that said particular data object is available for use;
   (d) receiving from at least one other user a subscription response as an electronic mail message for accepting said publication offer, said at least one other user accepting or rejecting said subscription based on whether the user desires to receive said particular data object; and
   (e) automatically forwarding through electronic mail a copy of said particular data object to each of said at least one other user of the work group from which an acceptance is received.

2. The method of claim 1, further comprising:
   receiving a request from said one user of step (a) for issuing a new version of said particular data object; and
   forwarding through electronic mail a copy of the new version of said particular data object to each of said at least one other user of the work group from which an acceptance has been previously received.

3. The method of claim 1, wherein said publication offer provides descriptive text describing said particular data object.

4. The method of claim 1, wherein said request for establishing a data sharing relationship specifies a version depth that said particular data object is to be maintained in object stores of other users.

5. The method of claim 1, wherein step (b) further comprises:
   assigning a unique system identifier to said copy of said particular data object, so that each particular copy may always be uniquely identified regardless of where it is stored in the system.

6. The method of claim 1, wherein step (b) further comprises:
   assigning a descriptive key to said copy of said particular data object, so that contents of said data object may be identified by a user based on said descriptive key.

7. The method of claim 1, wherein step (c) includes:
   at periodic intervals, connecting the system to a computer having a message transport service and transmitting the publication offer via communication services of said message transport service.

8. The method of claim 7, wherein step (d) includes:
   polling said message transport service for retrieving any subscription responses sent in response to said publication offer.

9. The method of claim 1, wherein step (c) includes:
   retrieving from the message transport service any publication offers proffered by other users of the work group.

10. The method of claim 1, wherein step (a) includes:
    specifying at least one spreadsheet page from a spreadsheet notebook which is to be shared with said at least one other user.

11. The method of claim 10, further comprising:
    said at least one other user retrieving for use said at least one spreadsheet page which has been forwarded as said particular data object to be shared.

12. The method of claim 11, wherein said retrieving step includes placing said at least one spreadsheet page in a spreadsheet notebook of said at least one other user.

13. The method of claim 1, wherein said publication request comprises a listing specifying said plurality of other users of the work group who may receive a copy of said particular data object.

14. The method of claim 13, wherein step (e) includes:
    for each said at least one other user of the work group from which an acceptance is not received, removing the user from the listing.

15. The method of claim 2, further comprising:
    forwarding through electronic mail the copy of the new version of said particular data object to an object store of said at least one other user, whereby said at least one other user retrieves said particular data object from the object store when use of the object is desired.

16. A multi-user computer system comprising:
    a first computer means having a processor and a memory for processing information stored in a storage device local to said first computer means;
    a second computer means having a processor and a memory for processing information stored in a storage device local to said second computer means;
    input means for processing a request from a first user that a particular data object stored in said first computer means be made available, according to user-specified criteria, to a second user on said second computer means for sharing with said first user;
    means for storing an outgoing copy of said particular data object in the storage device of said first computer means;

means for transmitting an offer notification from said first user on said first computer means to said second user on said second computer means, based on said user-specified criteria, said offer notification offering to share said particular data object with said second user;

connectivity means, operably coupled to said transmitting means and said receiving means, for communicating notifications and data objects between said first computer means and said second computer means wherein said connectivity means includes telecommunication means for transporting notifications and data objects across an electronic mail service;

means for receiving a response notification from said second user on said second computer means to said first computer means, said response notification accepting or rejecting said offer notification based on whether said second user desires to receive said particular data object; and means, responsive to said response notification, for forwarding said outgoing copy of said particular data object to said second computer means for storage in the storage device of said second computer for use by said second user, upon acceptance of said offer notification offering to share said particular data object.

17. The system of claim 16, further comprising:

means for retrieving the copy of said particular data object from the storage device of said second computer means and using said particular data object in an application process said second user is operating on said second computer means.

18. The system of claim 16, further comprising:

polling means for polling said connectivity means for posting any offer notifications and for retrieving any response notifications, so that sharing of data objects may be deferred.

19. The system of claim 18, wherein said polling means operates in a selected one of manual polling mode and automatic polling mode.

20. The system of claim 19, wherein said automatic polling mode requires said polling means to poll at a user-specified time interval.

21. The system of claim 16, wherein said connectivity means includes a local are network connecting said first computer means to said second computer means.

22. The system of claim 16, wherein said particular data object includes at least one spreadsheet page from a spreadsheet notebook which is to be shared with the other user.

23. The system of claims 16, further comprising:

means, responsive to input from said one user, for issuing a new version of said particular data object if acceptance of the offer notification has been received.

24. The system of claim 16, further comprising:

versioning means for automatically forwarding new versions of said particular data object to said second computer means for storage in the storage device of said second computer if acceptance of the offer notification has been received.

25. The system of claim 24, wherein said versioning means includes:

means for setting a version depth, said version depth specifying how many versions of said particular data object are to be maintained in the storage device of said second computer means.

26. The system of claim 16, wherein said offer notification includes a descriptive message indicating a nature of said particular data object.

27. In a data processing system, a method for sharing data objects among subscribing users of a work group according to user-specified conditions, the method comprising:

(a) receiving from a publishing user a request for publishing a data object stored in the system to other users of the work group, said request specifying at least one condition by which the data object may be shared by other users;

(b) based on said at least one condition, announcing through electronic mail messages sent to the other users availability of a subscription to said data object;

(c) in response to said electronic mail messages receiving from at least some of the other users a confirmation for subscribing to said data object, each confirmation indicating that a user desires to receive said data object through electronic mail; and (d) automatically providing each user subscribing to said data object with a copy of said data object, said copy being transmitted automatically to each user subscribing to said data object without further input from said publishing user.

28. The method of claim 27, further comprising:

(e) issuing a new version of said data object automatically to each user subscribing to said data object, whereby each user subscribing to said data object is automatically provided with a new version of said data object.

29. The method of claim 28, further comprising:

(f) receiving from at least one subscribing user a cancellation notice, so that the at least one user is no longer automatically provided with a new version of said data object.

30. The method of claim 27, wherein step (b) includes announcing to the other users availability of a subscription to said data object on a "don't ask" basis, so that the other users are automatically provided with a copy of said data object in step (e).

31. The method of claim 27, wherein said request for publishing a data object includes a publication list specifying all users of the work group with whom the data object may be shared.

32. The method of claim 27, wherein steps (b) and (c) are performed at a user-specified time interval, so that sharing of data objects among subscribing users of the work group may be deferred until occurrence of said user-specified time interval.

33. The method of claim 27, wherein the copy of said data object provided to each subscribing user is a read-only copy.

* * * * *